United States Patent [19]

Mitchell

[11] Patent Number: 4,875,154

[45] Date of Patent: Oct. 17, 1989

[54] MICROCOMPUTER WITH DISCONNECTED, OPEN, INDEPENDENT, BIMEMORY ARCHITECTURE, ALLOWING LARGE INTERACTING, INTERCONNECTED MULTI-MICROCOMPUTER PARALLEL SYSTEMS ACCOMODATING MULTIPLE LEVELS OF PROGRAMMER DEFINED HEIRARCHY

[76] Inventor: Maurice E. Mitchell, 601 Terra California, #4, Walnut Creek, Calif. 94595

[21] Appl. No.: 61,338

[22] Filed: Jun. 12, 1987

Related U.S. Application Data

[63] Continuation-in-part of Ser. No. 541,453, Oct. 13, 1983, abandoned.

[51] Int. Cl.[4] .............................................. G06F 13/00
[52] U.S. Cl. .................................................... 364/206
[58] Field of Search ... 364/200 MS File, 900 MS File, 364/200, 900

[56] References Cited

U.S. PATENT DOCUMENTS

| | | | |
|---|---|---|---|
| 3,566,363 | 2/1971 | Driscoll, Jr. | 364/200 |
| 3,771,137 | 11/1973 | Barner et al. | 364/200 |
| 3,970,994 | 7/1976 | Jenny | 364/200 |
| 4,123,794 | 10/1978 | Matsamoto | 364/200 X |
| 4,130,865 | 12/1978 | Heart et al. | 364/200 |
| 4,228,496 | 10/1980 | Katzman et al. | 364/200 |
| 4,434,461 | 2/1981 | Puhl | 364/200 |

OTHER PUBLICATIONS

MOS Technology Manuals–Programming and Hardware, MOS Technology, Inc., Jan. 1976.
"A Heirarchical Restructurable Multi-Microprocessor Architecture", R. G. Arnold and E. W. Page-Proc. 3rd Ann Symp. Computer Architecture, 1976, pp. 40–45.
"A Multicomputer System with Dynamic Architecture"–IEEE Trans. Computers, vol. C-28, No. 10, 10–1979, pp. 704–720, S. I. Karteshev and S. P. Karteshev.
Budzinski R., Linn J., and Thatti S., "A Restructurable Integrated Circuit for Implementing Programmable Digital Systems ", Computer, Mar. 1982, pp. 43–54.

*Primary Examiner*—David L. Clark
*Attorney, Agent, or Firm*—Joseph J. Zito; William D. Hall

[57] ABSTRACT

A Bimemory Independent CPU (BICPU) microcomputer which is comprised of a known CPU chip provided with additional circuitry to enable CPU to interact in a multi BICPU microcomputer system. Each BICPU microcomputer in a system is supplied with an assigned standard memory mechanically and logically connected to it's BICPU's "A" bus circuits. The BICPU microcomputer is also provided with connectors enabling the CPU to be connected to system buses. Any number of BICPU microcomputers can be logically chained, linked and treed in a simple logical bimemory independent pattern infinitely in as many dimensions as is reasonably desired, using one standard set of dedicated, simple, single line conductors (system buses) to mechanically interconnect any "B" or "C" bus curcuits of two different BICPU microcomputers.

28 Claims, 24 Drawing Sheets

Two Interconnected BICPUs

BICPU#5.Jeff-16.Holly     BICPU#4.Holly-7.John

MICROCOMPUTER WITH DISCONNECTED, OPEN, INDEPENDENT, BIMEMORY ARCHITECTURE, ALLOWING LARGE INTERACTING, INTERCONNECTED MULTI-MICROCOMPUTER PARALLEL SYSTEMS ACCOMODATING MULTIPLE LEVELS OF PROGRAMMER DEFINED HEIRARCHY

CROSS REFERENCE TO RELATED APPLICATION

This is a continuation in part application of Ser. No. 541,453, filed Oct. 13, 1983, now abandoned.

TECHNOLOGICAL CONTEXT OF THE INVENTION

The advent of the Eniac computer and later computers has signalled a period of technology in which numerous problems that were previously insolvable could be solved. However, even with the increased data processing power achieved by the computer, the magnitude and complexity of some problems still defies the computer age.

One of the most evident unsolved problems is climate and weather forecasting. In the May Issue of *Science 82*, Jim Hansen, the Director of NASA's Goddard Institute for Space Studies, stressed that the ability to forecast the future climate of the world with a relatively high degree of accuracy is of very great importance to all the people of the world. Hansen and his colleagues have, accordingly, been engaged in formulating mathematical models which might explain and predict world climate. However, the models generated have been greatly simplified so that existing computer systems can process the data. As a result of the simplifications, such climate models have been less than optimal.

To a great extent, the problem with predicting weather and climate relates to the vast number of atmospheric volumes which interact to form an overall pattern. That is, the atmosphere can be viewed as a multitude of cells encircling the earth, each cell containing sundry forms of information which changes over time, and affects the characteristics of other adjoining cells.

If the cells were configured as interacting, almost spherical ellipsoids of influence, with each ellipsoidal cell enclosing essentially 25 cubic miles and with only a 25 mile layer of contiguous ellipsoidal cells being formed about the earth, approximately 200 million cells would be required. A smaller cell size or increasing the volume to be considered would, of course, increase the number of ellipsoidal cells required. In any case, let each cell contain information requiring, say 1,000 floating point calculations per second. A computer system designed to handle information for the various cells would thus be required to perform 200 billion interacting floating point calculations per second.

If a computer system based on existing technology were capable of performing such calculations, the cost would be exorbitant.

Moreover, adaptability of such a system based on known art, would be limited.

Relying on prior technology, the solution to modeling weather and the climate thus appears arduous if achievable.

Other problems which are similarly difficult to solve at reasonable costs include large oil field geological surveys, econometric models, air traffic control systems, and other large scale complex three-dimensional space prediction problems. For example, econometric models which evaluate myriad possibilities based on "what if" assumptions and calculations require complex, costly systems.

The more recent Strategic Defense Initiative Organization (SDIO) computer problem is substantially more complex than any of the other applications mentioned above.

Moreover, language applications—such as implementing the new Defense Department ADA language——and corporate decision-making applications often require high-volume, high-speed calculations based on information received from numerous sources. The cost and adaptability of data processing systems which handle such highly parallel tasks are notably less than optimal.

For many years computer scientists have known one basic object of the Ideal Computer System is to, "Be capable of mimicking human thinking". The problems noted above would be solvable, if a computer which could mimic human thinking at computer speed were applied to the task.

This object is quite straight forward. Manufacturing computer system designers have spent the past 20 years attempting to accomplish this objective. The speed of a single computer is limited by the speed of electric signals in the computer circuits. Single, high speed computers, made with shorter and colder circuits, are approaching their maximum circuit speed limits.

Therefore, the manufacturing computer system designers have for some time, attempted to combine more than one processor in a computer system. There are hundreds of different systems for linking, treeing and chaining processors together in a computer system. None of these systems have been capable of mimicking human thinking to the desired degree.

A computer system must be capable of mimicking human thinking to a degree, for the problems above and others.

In the Ideal Computer System, the individual, independent microcomputer should be able to individually "decide" to work with the other microcomputers, or not to work with the other microcomputers in the system, when the logic in it's standard memory circuits, written by human programmers and human field application system designers, instruct the microcomputer to work, or not to work, with the other microcomputers.

Individuals "working together" and "learning together" do so in what might be referred to as parallel thinking. For example, the individual people who designed and built the long range tracking cameras that obtained some of the key pictures of the space shuttle booster rocket seal failure, needed to know little or nothing of the science that was required to develop the booster rockets and the seals that failed. This kind of parallel human thinking and action is referred to as "parallel programs" or "parallel architecture" by the computer scientists. Think of the hundreds of billions of human "parallel" thinking patterns that had to go on from the start of the Moon Rocket program to the Shuttle.

Therefore, in the Ideal Computer Systems, the thousands of individual, independent microcomputers "working together" must be able to be working on tens of thousands of different "parallel" computer programs at the same time, where one individual, independent microcomputer is not interrupted or slowed down by the needs of those other individual, independent microcomputers working on other parts of the overall problem, until data being processed by that one individual, independent microcomputer is needed.

Therefore, in the Ideal Computer System, with thousands of individual, independent microcomputers "working together" in a running system, one must be able to remove individual, independent microcomputers that fail or are damaged by enemy action, or remove an individual, independent microcomputer and add it to a different part of the system, without causing further failure of the overall program logic of the running system.

The "individual people" who are "learning together", "step by step" do this by talking to each other, usually one on one. Even in larger groups, this "learning together" basically entails one person learning something from another person. When one person is speaking to several hundred, the individual person listening is learning in what could be considered a bimemory fashion from the person doing the talking.

Therefore, in the Ideal Computer System, with thousands of individual, independent microcomputers "learning together" in a running system, an individual, independent microcomputer and it's connected standard memory circuits must be capable of directly communicating with another individual, independent microcomputer and it's connected standard memory circuits in what might be called a logical bimemory manner.

The first basic problem of present multiprocessor systems is that when more than two levels of hierarchy are included or more than about twenty processors are interconnected, the hardware and software overhead requirements become so burdensome that additional levels of hierarchy and additional processors have not increased the overall effectiveness or through put of the multiprocessor system. Many of the present multiprocessor systems use one interconnecting circuit to carry data information some of the time and use the same interconnecting circuit to carry address information at other times. This dual use of one circuit to carry both data information and address information, in present multiprocessor systems, requires many additional timing circuits, additional switching circuits, additional arbitration logic circuits and additional error checking logic circuits, and a very large number of additional interrupts when circulating Pierce loops are also used, between the various interconnected processors. This additional complexity, in the interconnecting circuits, is a very large part of the reason that more than two levels of hierarchy and more than about twenty processors being interconnected have not increased the overall effectiveness or through put of the multiprocessor system.

The second basic problem of present multiprocessor systems is most multiprocessor systems are designed with essentially permanent connections between the various clusters of processors, creating one basic system of mechanical connections between the processors. To mimic human thinking to the desired degree requires the ability to use the human thinking of the field application system designers and the programmers to decide which sets of billions of different optional mechanical and logical combinations of interconnections between the individual processors in a multiprocessor system are most effective for a given problem at a given moment in time, based on the actual data flow in the problem, at computer speeds. None of the present multiprocessor systems permit the field application system designers and the programmers to arbitrarily change the mechanical interconnections between the various processors in the billions of different ways the human field application system designers and programmers think the processors should be interconnected.

The human programmers and field application designers think the processors should be interconnected this way today and change their mind and think they should be interconnected in a different way tomorrow. Sometimes the human programmers think the individual processors should be interconnected one way and the human field application system designers think the individual processors should be interconnected in a different way. Only actual, real time, testing in the field of the various sets of billions of mechanical and logical interconnections will make the multicomputer system "be capable of mimicking human thinking" to the required degree.

The third basic problem of present multiprocessor systems is the inability to make existing multiprocessor systems work as truly "parallel processors". The Strategic Defense Initiative Organization problem and the World Climate Prediction problem probably both require very highly parallel architectures to be effective. Over 200 billion interacting floating point calculations are required per second on the World Climate Prediction problem as a minimum, and the SDIO requirement is very much larger. The SDIO problem could probably use 20 trillion interacting floating point calculations per second.

The fourth basic problem of present multiprocessor systems is removing individual processors that have failed or have been damaged by enemy action from a running system without causing further failure of the overall program logic of the balance of the remaining running system.

The fifth basic problem of present multiprocessor systems is adding individual processors to a running system without causing failure of the overall program logic of the balance of the running system.

The sixth basic problem of present multiprocessor systems is some of the switching circuits and some of the arbitration logic circuits and some of the error checking logic circuits needed to effectively interconnect several thousand processors, are being placed outside of the individual processors. These different external logic circuits and BLOCK/SHORT circuits in circulating Pierce loop circuits, preclude using one standard group of circuits made up of simple, dedicated purpose, single line conductors, where the standard group of circuits can be of various random lengths—less than a maximum length—to interconnect any two processors.

The seventh basic problem of present multiprocessor systems is that more than one standard group of circuits are used in the multiprocessor system to interconnect processors on different hierarchy levels. For example, some present multiprocessor systems, like the "Restructurable Integrated Circuit For Implementing Digital Systems" as described by Rob Budzinski, John Linn, and Satish Thatte, *COMPUTER*, March 1982, pages 43 through 54, use the concept of external coordination of microprocessors as developed by R. G. Arnold and E. W. Page, Proc. 3rd Ann. Symp. Computer architecture 1976, pages 40–45, where both time-shared busses referred to above, and "circulating" Pierce Loop busses are used on each level of hierarchy. The highest hierarchy level of busses (Master Control Group) use "circulating" busses without special "BLOCK/SHORT" logic circuit modules. Each additional level of hierarchy (Control Group), below the Master Control Group, requires an additional set of busses with special "BLOCK/SHORT" logic circuit modules.

This requirement of an additional set of busses (Control Group) for each level of hierarchy caused Arnold and Page to state in their *OBSERVATIONS AND CONCLUSIONS*, "As is evident from the examples, only a limited number of Control Groups are likely to be used". When one thinks of one hundred levels of hierarchy requiring one hundred separate sets of (Control Group) busses interconnecting each of several thousand processors, it is easy to understand Arnold and Page's above stated conclusions.

The Bimemory Independent Central Processing Unit microcomputer (BICPU microcomputer) invention, as herein taught, solves all seven of these basic problems. The BICPU microcomputer is actually capable of mimicking the human thinking of the field application system designers and the human programmers involved in the system. If the human programmer can think of a solution, or the human field application system designer can think of a solution, several thousand BICPU microcomputers, mechanically interconnected in one of several billion different unique systems, where the programmers, at computer speeds, can logically connect and logically disconnect the thousands of BICPU microcomputers in several billion additional unique ways, using logical bimemory "S" hookups and logical bimemory "Y" hookups, probably will "be capable of mimicking human thinking" to the required degree.

To demonstrate that one of the hundreds of presently known multiprocessor systems are "capable of mimicking human thinking" to the required degree, one only has to read what Digital Equipment Corporation executives said about their newest multi-processor systems in the Jan. 20, 1987 edition of the New York Times;

Digital to Offer Mainframes

System links VAX Units

Moving into the mainframe computer arena, the Digital Equipment Corporation will announce today a $2.5 million system that links four of its most powerful VAX computers into one, giving it the speed of some of I.B.M.'s largest systems. * * * *

"This is an alternative style of computing when compared to I.B.M.," said Rose Ann Giodan, vice president of information system marketing for Digital. "It is an integrated whole, all the way from a desktop, $5,000 computer to a mainframe."

The announcement today, at a news conference in New York, is expected to involve two new machines, the VAX 8974 and 8978. Both link VAX 8700 computers, the 8974 in a cluster of four processors, the 8978 in a cluster of eight.

Digital said the 8974 would be able to process about 27 million instructions a second, putting it in direct competition with the low end of I.B.M.'s System 3090 computers. The 8978 would run at about twice the rate.

Questions on Power

At the same time, some experts question whether the multiprocessing solution that Digital and other manufacturers have settled on will actually provide heavy-duty users with the power they need.

Four VAX's that are tied together do not process data more quickly than a single VAX—indeed, to solve most tasks only one of the four processors is at work. But because the four processors can work simultaneously, sharing mass storage devices and other expensive peripherals, they can reduce the waiting time that any individual user or program spends waiting for a single processor to become free.

The clustered VAX computers accelerate an industry trend toward the combination of several processors in a single computer. But strictly speaking, the new VAX's are not "parallel processors" because their ability to divide a single problem and parcel it out to different processors is severely limited.

"That's a software problem that still requires some additional work," said F. Grant Saviers, Digital's vice president of storage systems. "Obviously, it's something we are working on intensely."* * *.

This article confirms several of the seven basic problems of present multiprocessor systems mentioned above.

First Problem—Note the two levels of hierarchy used with the five or nine interconnected processors involved. The VAX 8974 or the VAX 8978 are on one hierarchy level, and the clusters of four or eight VAX 8700 are on the second hierarchy level.

Second Problem—Note there is no indication that the four or eight VAX 8700 are flexibly connected to the VAX 8974 in the clusters. In other words, there is no indication that the field application system designers can arbitrarily change the mechanical interconnection arrangement of the four VAX 8700 computers or the eight VAX 8700 computers.

Third Problem—Note "strictly speaking, the new VAX's are not "parallel processors" because their ability to divide a single problem and parcel it out to different processors is severely limited."

Fourth Problem—Note there is no indication that one VAX 8700 processor can be individually powered off and removed from the other three or seven VAX 8700s in a system, without causing a failure of the logic of the other running programs in the system.

Fifth Problem—Note there is no indication that programmers and field application system designers have the ability to add a fifth or ninth VAX 8700 to the system, without causing a failure of the logic of the other running programs in the system.

Sixth Problem—Note to make a four processor multiprocessor system and an eight processor multiprocessor system, three different processors are needed. The VAX 8700, the VAX 9874 and the VAX 8978, instead of only one multiprocessor that can be interconnected into multiprocessor systems of two to over a thousand processors.

Seventh Problem—If the VAX 8974 and VAX 8979 are considered interconnecting circuits for interconnecting four and eight computers, then two different interconnecting circuits are required to interconnect four computers or eight computers.

Especially note that "some experts question whether the multiprocessing solution that Digital and other manufacturers have settled on will actually provide heavy-duty users with the power they need".

SUMMARY OF THE INVENTION

The invention is a Bimemory Independent CPU (BICPU) microcomputer which is comprised of a known CPU chip provided with additional circuitry to enable the CPU to interact in a multi BICPU microcomputer system. Each BICPU microcomputer in a system is supplied with an assigned standard memory mechanically and logically connected to it's BICPU's "A" bus circuits. The BICPU microcomputer is also provided with connectors enabling the CPU to be connected to system buses. Any number of BICPU microcomputers can be logically chained, linked and treed in a simple logical bimemory independent pattern infinitely in as many dimensions as is reasonably desired, using one standard set of dedicated, simple, single line conductors (system buses) to mechanically interconnect any "B" or "C" bus circuits of two different BICPU microcomputers. Packaging considerations will tend to be the limiting factor in the number of BICPU microcomputers that can be mechanically interconnected in large multi-BICPU microcomputer systems.

For example, the BICPU microcomputer systems might be as small as a single stand alone application of one Bimemory Independent CPU microcomputer utilizing its given memory, to a system with thousands of Bimemory Independent CPU microcomputers (BICPU microcomputers) in a world weather prediction system, or in an oil field geological survey, or in the Strategic Defense Initiative Organization computer system.

The invention can be retrofitted on certain types of highly successful microcomputers with dedicated pinout circuits being built today so that most, if not all, of the present software of these highly successful microcomputers can be run on the new Bimemory Independent CPU microcomputer invention with very little, if any, modifications. The memory access circuits (address, data, control) of the CPU are connected to a switching unit. Three buses, "A", "B" and "C" are connected to the switching unit. The internal structure of the switching unit is configured soley by the CPU to create a signal path connecting the memory access circuits of the CPU to the desired bus or buses or any selected portion thereof.

The CPU is further provided with circuitry, including two dedicated function processors (ILUs), to enable the CPU to communicate and interact with other CPUs on either of the system buses "B" "C". The CPU is also provided with additional registers to store switching unit configurations, system addresses etc.

This specification describes how the invention can be retrofitted on the MCS6502 microcomputer of the MCS650X chip family made by MOS Technology Inc. of Norristown, Pennsylvania, and described in detail in a HARDWARE MANUAL and a SOFTWARE MANUAL published in 1976, MOS Technology Inc. of Norristown, Pennsylvania, and incorporated herein by reference.

The CPU of the BICPU microcomputer invention has dedicated circuits similar to the MCS6502 type microcomputer as described in the MOS microcomputer HARDWARE MANUAL above. For example the MCS6502 and the MCS650X family of microcomputers are packaged in 40 pins DIPs (Dual In-Line Packages). According to FIG. 1.15, page 42, of the above MOS microcomputer HARDWARE MANUAL, there are 8 dedicated pins connected to the 8 Data Bus circuits, 8 dedicated pins connected to the 8 Address Bus Low circuits, 8 dedicated pins connected to the 8 Address Bus High circuits, 10 dedicated pins connected to computer and memory control circuits, 3 dedicated pins connected to Power circuits and 3 pins are not connected.

On Page 5 of the above MOS microcomputer HARDWARE MANUAL, in FIG. 1.1, the basic organization of a microcomputer system is shown based on the MCS6502 type microcomputer. Especially note that the *MCS6502* microcomputer in the lower right in FIG. 1.1, is directly and independently connected to the dedicated standard memory circuits, (address bus, data bus, write enable, interrupts and other control signals).

On Page 41, in lines 9 through 11, of the above MOS microcomputer HARDWARE MANUAL, the MCS6502 has the oscillator and clock driver on-chip, thus eliminating the need of an external high-level two-phase clock generator.

Therefore with the MCS6502, in FIG. 1.1 of the MOS microcomputer HARDWARE MANUAL above, the microcomputer independently, directly, logically controls all of the Program Memory (ROM), the Data Memory (RAM), and the Peripheral Interface Device shown, by independently, directly, logically reading and independently, directly, logically writing to the dedicated standard memory circuits mechanically and logically connected to the 40 pins of the MCS6502 Pinout Designation as shown in FIG. 1.15 on page 42 of the above MOS microcomputer HARDWARE MANUAL.

The MCS6502 is a CPU that can independently, directly, logically read or write, in a logical manner, 256 pages of 256 characters each, where each character can be any of 256 different characters. The phrase, in a logical manner, is meant to include all of the CPU's present and potential set of microinstructions, which in the case of the MCS6502 consists of 256 different microinstructions of which essentially 156 have been implemented.

The MCS6502 independently, directly, logically controls everything that is read or written on these 256 pages of memory space.

Examples of fantastic implementations of the MCS6502 include the Commodore, Apple, Atari, and many other personal computers. The MCS6502 essentially is an 8-bit microcomputer addressing a 16-bit address space. (With essentially 16-bit MCS650X type microcomputers addressing a 32-bit address space, the numbers 256 above can be changed to 65,536. In the World Climate and SDIO problems above, 16-bit BICPU microcomputers addressing 32-bit address space can be used).

The BICPU microcomputer invention takes the MCS6502 and the dedicated address, data and control circuits presently connected to the 40 pins in FIG. 1.15 on page 42 of the MOS microcomputer HARDWARE MANUAL (or some other similar type highly successful microcomputer), and defines these circuits the "A" bus circuits 520 of FIG. 19 (the power circuits are not changed by the invention and for clarity are not shown in FIG. 19). The new bimemory switching circuits 502, 504, 506, and 508, of FIG. 19 are inserted in these "A" bus circuits between the CPU and the pins of FIG. 1.15 on page 42 above, (but are not inserted in the BICPU microcomputer power circuits). These bimemory switching circuits are also connected to the "B" bus circuits 522, and the "C" bus circuits 524 in a bimemory manner where at any one time the individual address circuits, data circuits and the read/write circuit from the microcomputer of FIG. 1.1 page 5, is logically directly connected to only one of the dedicated off chip pins in the "A" bus circuits 520, "B" bus circuits 522 or "C" bus circuits 524. The remainder of the circuits utilized for memory control, e.g. clock timing circuits, ready circuit, sync circuit, interrupt circuits etc., remain connected between the CPU and its memory during bimemory operations.

At any one moment in time, a first Bimemory Independent CPU (like in FIG. 1.1 on page 5, MOS microcomputer HARDWARE MANUAL), (a) can be independently, directly, logically connected to the "A" bus circuits 520 in FIG. 19, and a first set of standard memory circuits mechanically connected to the "A" bus circuits of this BICPU microcomputer or, (b) can be directly, logically connected in a bimemory manner, to the "B" bus circuits 522 in FIG. 19, which are mechanically connected to a set of dedicated standard Bimemory Interconnecting Control-BUS (BIC-BUS) circuits which are mechanically connected to "B" "C" bus circuits of a consenting second BICPU microcomputer which has logically, directly, connected it's "A" bus circuits and a second set of standard memory circuits mechanically connected thereto or, (c) can be directly, logically connected in a bimemory manner, to the "C" bus circuits 524 in FIG. 19, which are mechanically connected to a set of dedicated standard Bimemory Interconnecting Control-BUS (BIC-BUS) circuits which are mechanically connected to "B" or "C" bus circuits of a consenting third BICPU microcomputer which has logically, directly, connected it's "B" or "C" bus circuits to it's "A" bus circuits and a third set of standard memory circuits mechanically connected thereto.

Human programmers and human field application system designers can mechanically interconnect two or more BICPU microcomputers with dedicated standard memory circuits mechanically and logically directly connected to their "A" bus circuits, by mechanically connecting sets of dedicated BIC-BUS circuits between the "B" or "C" bus circuits of one BICPU microcomputer and the "B" or "C" bus circuits of a second BICPU microcomputer. In this simple manner, programmers and field application system designers can mechanically interconnect thousands of BICPU microcomputers in billions of different systems with hundreds of logical levels of hierarchy.

The meaning of the new mnemonics used in this specification are as follows:

BICPU—Bimemory Independent Central Processing Unit—This is the mnemonic for the invention. It comprises the basic CPU being implemented on the invention, plus the seven new switch means, the nine additional registers, the two new ILUs, the new BIC-CTRB control lines, the new Interconnect Switch and the new "B" and "C" bus circuits.

BIM mode—BIMemory mode—This is one of eight different logical bimemory modes a BICPU can assume. In these eight BIM modes, a first BICPU microcomputer is in a logical bimemory hookup, controlling part or all of two standard memory circuits in a bimemory manner.

FLT mode—FLoaTing mode—This is one of four different logical bimemory modes a "consenting" BICPU microcomputer can assume. In these four FLT modes, a "consenting" BICPU microcomputer has logically connected some or all of its "A" bus circuits and the standard memory circuits connected thereto, to the BICPU microcomputer in the IBM mode in a logical bimemory hookup, and gone into a "floating" state waiting for the BICPU microcomputer in the BIM mode to complete the logical bimemory hookup.

PRM mode—PRimary Mode—This is one of three different logical modes a BICPU microcomputer can assume. In these three PRM modes, the BICPU microcomputer is logically connected to its "A" bus circuits and the standard memory circuits connected thereto, in exactly the same logical manner as the CPU was connected to its standard memory circuits before being retrofit with the BICPU invention. These three PRM modes logically bridge the gap between microprocessors and the BIM and FLT modes of the BICPU microcomputer.

BIC-BUS—Bimemory Interconnecting Control-BUS—These standard groups of simple, single line, circuits are used to interconnect the "B" or "C" bus circuits of any two different BICPU microcomputers.

ILU—Interrupt Logic Unit—The two new "B" and "C" ILUs monitor and control the BIC-CTRB circuits for the CPU of the BICPU in an asynchronous manner. They enable the CPU of the BICPU invention to go about its data processing tasks, without being interrupted or slowed down, except when the exact BICPU microcomputer needs to be involved in a logical bimemory manner. The ILUs make and complete all logical bimemory hookups, under the control of the CPU of the BICPU microcomputer.

BIC-CTRB—BIC-BUS ConTRol Bus—These circuits comprise the BIC-AD circuits and the "BCR", "BEN" and "BRQ" lines. They are connected to the new buffers and Interconnect Switch on one end and connected to the "B" and "C" bus circuits on the other end. They join and run parallel with the other circuits in the BIC-BUS circuits. They are monitored and controlled by the ILUs, under the control of the CPU of the BICPU microcomputer. Essentially these circuits are new interrupt circuits between two CPUs of two different BICPU microcomputers. These BIC-CTRB circuits are always unique to one set of BIC-BUS circuits. The BIC-CTRB circuits of two different sets of BIC-BUS circuits are never interconnected, and remain unique to just the one set of BIC-BUS circuits they are in. The BICPU microcomputers never directly interconnect the BIC-CTRB circuits. The "B" BIC-CTRB circuits are monitored and controlled by the "B" ILU, and the "C" BIC-CTRB circuits are monitored and controlled by the "C" ILU.

"BCR" line—Bus ControlleR line—This line is set TRUE by the "calling" ILU of a BICPU microcomputer and determines which ILU has control of a set of BIC-CTRB circuits. The "BCR" line is set FALSE by the ILU of the BICPU microcomputer in the BIM mode in a logical bimemory hookup, to initiate logical hang up. The "BCR" line always being set FALSE by the ILU of the BICPU microcomputer in the BIM mode assures that all logical bimemory hookups can be interrupted in a logical manner where the program logic of the bimemory hookup is saved in a logical manner, as desired by the programmer, before the logical bimemory hookup is hung up.

"BEN" line—Bus ENable line—This line enables the logical bimemory hookup to proceed when it is set TRUE by the ILU of the "consenting" BICPU microcomputer. When the "BEN" line is set FALSE by an ILU of a BICPU microcomputer, the logical bimemory hookup is logically hung up, saving the program logic in a logical hang up procedure.

"BRQ" line—Bus ReQuest line—This line is used by the ILUs to generate the "Not Active", "Active BICPU" or "Two or More" signals without requiring external logic circuits outside of the BICPU microcomputers involved in the logical bimemory hookup. This enables simple, single line circuits, without logic, to be used in the BIC-BUS circuits.

BIC-AD lines—Bimemory Interconnecting Control Bus-ADress lines—These BIC-AD lines are part of the BIC-CTRB circuits. These BIC-AD lines are not to be confused with the standard address circuits of the CPU of the BICPU microcomputer. These BIC-AD lines are unique to one set of BIC-BUS circuits, and carry the assigned "B" or "C" register number of a BICPU microcomputer being "called" to participate in a logical bimemory hookup. The standard address circuits of the CPU of the BICPU microcomputer can be interconnected between two sets of BIC-BUS circuits by the ILUs of the BICPU microcomputers involved in the logical bimemory hookup. The BIC-AD circuits of two different sets of BIC-BUS circuits are never interconnected. The ILUs monitor these BIC-AD circuits to determine when the address on these circuits match the valid assigned bus number stored in the correct "B" or "C" register, so that the ILUs can determine when they are being "called" by another ILU on this set of BIC-BUS circuits.

DHU—Directed Hang Up—New bimemory instruction causing an ILU to place a special code on the BIC-AD line, subsequently causing both "BEN" lines of each BICPU microcomputer in a given set of BIC-BUS circuits to go FALSE, thereby causing all logical bimemory hookups utilizing all involved BIC-BUS circuits to terminate logically.

NHU—Normal Hang Up—New bimemory instruction causing a normal logical hang up of the various sets of BIC-BUS circuits involved in a logical bimemory hookup. This is used by the programmer to hang up a logical bimemory hookup and return to a PRM mode. It can be compared to the RTN (return) instruction after a subroutine has been completed and the programmer directs the program logic to return to the instruction after the gosubroutine instruction.

GBH—Go Bimemory Hookup—New bimemory instruction causing the BICPU microcomputer to attempt to create a logical bimemory hookup between this BICPU microcomputer and another BICPU microcomputer. This instruction can be compared to a gosubroutine instruction, where the subroutine includes many conditional tests.

To make the following descriptions of the amazing flexibility of both the mechanical and logical interconnection of several thousand BICPU microcomputers more clear and concise, the phrase "standard memory circuits" will be used to refer to "standard dedicated memory circuits" and the phrase "BIC-BUS circuits" will be used to refer to "dedicated BIC-BUS circuits" as all standard memory circuits and all BIC-BUS circuits are dedicated circuits in the BICPU microcomputer invention. Since all standard memory circuits are always mechanically connected to "A" bus circuits, and all BIC-BUS circuits are always mechanically connected to "B" or "C" bus circuits, the phrases "connected standard memory circuits" and "connected "B" or "C" bus circuits" always means "mechanically connected".

The phrase "first BICPU microcomputer" will generally be used to refer to a BICPU microcomputer as depicted in the various bimemory modes in FIG. 3 through FIG. 13 and FIG. 15 through FIG. 17 that has standard memory circuits 217 connected to it's "A" bus circuits.

The phrase "second BICPU microcomputer" will generally be used to refer to a BICPU microcomputer connected to BIC-BUS circuits connected to the "B" bus circuits of a first BICPU microcomputer, that is in the process of being logically directly connected to, or is logically directly connected to the "B" bus circuits of a first BICPU microcomputer.

The phrase "third BICPU microcomputer" will generally be used to refer to a BICPU microcomputer connected to BIC-BUS circuits connected to the "C" bus circuits of a first BICPU microcomputer, that is in the process of being logically directly connected to, or is logically directly connected to the "C" bus circuits of a first BICPU microcomputer.

The phrase "consenting" BICPU microcomputer refers to a BICPU microcomputer that has "consented" to assume one of the FLT modes and directly logically connects some or all of it's "A" bus circuits and the standard memory circuits connected thereto, to it's "B" or "C" bus circuits thus directly logically connecting these "" bus circuits and the standard memory circuits connected thereto, to the BICPU microcomputer in the BIM mode in either a logical bimemory "S" hookup or a logical bimemory "Y" hookup.

The phrase "original calling" BICPU microcomputer refers to a BICPU microcomputer that initially reads the first microcode of either a logical bimemory "S" hookup or a logical bimemory "Y" hookup. The mode of the "original calling" BICPU microcomputer must be either a BIM mode or a FLT mode or a bimemory programming error has occurred.

The phrase "interconnecting" BICPU microcomputer refers to a BICPU microcomputer in either a PRM-1 mode or a PRM-2 mode, interconnecting two different sets of BIC-BUS circuits.

The following parts are added to the existing CPU to enable the CPU to function interactively in a system of any number of BICPU microcomputers.

The new "B" BIC-CTRB circuits 627 in FIG. 19, join and run parallel to the "B" bus circuits 522 in FIG. 19, and new "C" BIC-CTRB circuits 629 in FIG. 19, join and run parallel to the "C" bus circuits 524 in FIG. 19.

The new "B" Interrupt Logic Unit 634 in FIG. 19, monitors and controls the "B" BIC-CTRB circuits 627 in FIG. 19, and the new "C" Interrupt Logic Unit 636 in FIG. 19, monitors and controls the "C" BIC-CTRB circuits 629 in FIG. 19.

The new "B" register 604 in FIG. 19 and the new "C" register 610 in FIG. 19 hold assigned bus address numbers of this BICPU microcomputer, when this BICPU microcomputer is logically connected to the dedicated BIC-BUS circuits mechanically connected to it's "B" or "C" bus circuits.

The new "B" BIC-BUS Status Register #1 and #2, 702 and 703 in FIG. 19, and the new "C" BIC-BUS Status Registers #1 and #2, 704 and 705 in FIG. 19, hold the status of the nearest linking second and third BICPU microcomputers logically connected to the sets of new BIC-BUS circuits mechanically connected to "B" and "C" bus circuits 522 and 524 in FIG. 19.

The new BICPU Bus Status Registers #1, #2 and #3, 706, 707 and 708 in FIG. 19, hold the bimemory status of BICPU microcomputer 400 in FIG. 19.

The new Inter Connect Switch 660 in FIG. 19, latches the status of the "BCR", and "BEN" circuits in a special bimemory way under control of the new Interrupt Logic Units (ILUs) 634 and 636.

The new Buffers 602 and 614 in FIG. 19, latch, drive and read the BIC-AD circuits 600 and 652 in FIG. 19, under the control of the new ILUs 634 and 636.

The new Bimemory Switching units ABL Switch 504, ABH Switch 506, DATA Switch 508, Control Switch 502 and DECODE Switch 530 in FIG. 19 configure the path of the memory address, data and control lines, under the control of the Instruction Decode unit 404.

New additional logical bimemory microinstructions are programmed into the existing Instruction Decode unit 404.

When the invention is implemented on a MCS6502 type microcomputer, the standard address circuits, the standard data circuits and the standard control circuits connecting the BICPU of the BICPU microcomputer invention and the standard memory circuits are dedicated circuits such as are used in the MCS6502. For example, on page 42, FIG. 1.15 of the above MOS microcomputer HARDWARE MANUAL gives the MCS6502 Pinout Designation. There is a pin numbered 33, marked DB0, for the lowest order bit of the data bus circuits. There is a pin numbered 9, marked AB0, for the lowest order bit of the Address Bus Low circuits. Pin numbered 33 is used only for the lowest order bit of the data bus circuits. Pin number 9 is used only for the lowest order bit of the address bus low circuits. These two pins and their data and address circuits and the logical information they carry are NEVER interconnected or interchanged on these pins. The same is true for all the data circuits and all of the address circuits and the R/W circuit on pin 34. Notice in the legend of FIG. 1.12 on page 33, of the above MOS microcomputer HARDWARE MANUAL, the MCS6501 "always puts out known addresses on the address bus". The MCS6502 always does the same.

Page 32, lines 28 through 34, and page 34, lines 1 and 2, of the MOS microcomputer HARDWARE MANUAL;

1.4.1.2.2 AB00–AB15—Address BUS

The address bus buffers on the MCS650X family of microprocessors are push/pull type drivers capable of driving at least 130 pf and 1 standard TTL load.

The address bus will always contain known data as detailed in Appendix A. The addressing techniques involves putting an address on the address bus which is known to be either in program sequence, on the same page in program memory or at a known point in RAM. "A" brief study of Appendix "A" will acquaint the designer with the detailed operation of this bus."

On page 34, lines 10 through 23;

"The specific timing of the address bus is exactly the same for all the processors. The address is valid 300 ns (at 1 MHz clock rate) into the 01 clock pulse and stays stable until the next 01 pulse. This specification will only change for the processors which are specified to operate at a higher clock rate. FIG. 1.13 details the relation of address bus to other critical signals.

Because of the reduced number of address lines on the 28-pin processors, it is possible to write a program which attempts to access non-existent memory address space, i.e., the address bits 13, 14 and 15 set to logic "1." These upper address bits in the program will be ignored and the program will drop into existing address space. This assumes proper memory management when using devices of large addressing capability such that the addressed memory space will fit within the constraints of a device with smaller available memory addressing capability."

Especially notice the above paragraph explains in detail how and why the BICPU invention can do a partly connected Address Bus High mode in BIM-1, BIM-3, BIM-5, BIM-7, FLT-1 and FLT-3 modes.

On page 34 of the MOS microcomputer HARDWARE MANUAL, lines 24 through 35, and page 35, lines 1 through 5;

1.4.1.2.3 DB0-DB7—Data Bus

The processor date bus is exactly the same for the processors currently available and for the software-compatible processors which will be introduced in the near future. All instructions and data transfers between the processor and memory take place on these lines. The buffers driving the Each data bus pin is connected to an input and an output buffer, with the output buffer remaining in the "floating" condition except when the processor is transferring data into or out of one of the support chips. All inter-chip data transfers take place during the Phase Two clock pulse. During Phase One the entire data bus is "floating."

The data bus buffer is a push/pull driver capable of driving 130 pf and 1 standard TTL load at the rate speed. At a 1 MHz clock rate, the data on the data bus must be stable 100 ns before the end of Phase Two. This is true for transfers in either direction. FIG. 1.13 details the relationship of the data bus to other signals."

On page 36 of the above MOS microcomputer HARDWARE MANUAL, lines 6 through 16;

1.4.1.2.4 R/W—Read/Write

The Read/Write line allows the processor to control the direction of data transfers between the processor and the support chips. This line is high except when the processor is writing to memory or to a peripheral interface device.

All transitions on this line occur during the Phase One clock pulse (concurrent with the address lines). This allows complete control of the data transition which takes place during the Phase Two clock pulse.

The R/W buffer is similar to the address buffers. They are capable of driving 130 pf and one standard TTL load at the rated speed. Again, FIG. 1.13 details the relative timing of the R/W line."

On page 41 of the above MOS microcomputer HARDWARE MANUAL, lines 1 through 19;

1.4.2 The MCS6502

1.4.2.1 Product Characteristics

The MCS6502 is very similar to the MCS6501 described in detail in the previous section. It provides a full 16-pin address bus and therefore addresses a full 65,536 words in memory. It also has the same data bus, R/W and RDY available on the MCS6501. FIG. 1.15 illustrates the pin configuration of the MCS6502. The differences between the two devices are as follows:

1. The MCS6502 has the oscillator and clock driver on-chip, thus eliminating the need for an external high-level two-phase clock generator.

2. The MCS6502 generates a SYNC signal instead of the bus available (BA) signal. The SYNC signal is described in detail below.

3. Pin 5, corresponding to the MCS6800 VMA signal, is not connected.

4. The internal data bus enable function is connected directly to the phase two clock on the chip. Therefore pin 36 on the MCS6502 is not connected.

Some multiprocessors use the same pin and the same circuit to carry data information part of the time and to carry address information at different times. These types of multiprocessors are completely different and do not relate to the BICPU microcomputer invention, as implemented on the MCS6502 type of microcomputer. The BICPU microcomputer invention achieves it's fantastic ability to be chained, linked and treed in a simple bimemory independent pattern infinitely in as many dimensions as is reasonably desired by directly logically switching, in a bimemory manner, dedicated circuits that carry standard memory address information, standard memory data information and standard memory control information. This is what enables over a thousand BICPU microcomputers to be mechanically and logically interconnected in billions of different ways, using one dedicated standard set of BIC-BUS circuits.

The implementation of the BICPU microcomputer invention, as described in this specification, requires that the standard address circuits, the standard data circuits and the standard control circuits and the standard memory circuits be of the dedicated type described in the MOS microcomputer HARDWARE MANUAL above. In this specification, when the word "standard" is used in connection with address circuits, data circuits, control circuits and memory circuits, standard means the standard address circuits, standard data circuits, standard control circuits and standard memory circuits as described in the MOS microcomputer HARDWARE MANUAL above for the MCS6502.

On page 50 of the MOS microcomputer HARDWARE MANUAL, lines 1 through 15, and page 51, lines 1 through 5;

1.5 Peripheral Interface Device—MCS6520

1.5.1 Introduction

The MCS6520 is a direct pin for pin replacement for the Motorola MC6820 Peripheral Interface Adapter, the "PIA". As such, it meets all of the "PIA" electrical specifications and is totally hardware compatable with the MC6820.

The MCS6520 is an I/O device which acts as an interface between the microprocessor and the peripherals such as printers, displays, keyboards, etc. The prime function of the MCS6520 is to respond to stimulus from each of the two worlds it is serving. On the one side, the 6520 is interfacing with the peripherals via two eight-bit bi-directional peripheral data ports. On the other side, the device interfaces with the microprocessor through an eight-bit data bus; this is the same data bus discussed at length in Section 1.3.1. It is, therefore, simplest to view the basic function of the MCS6520 as in the block diagram of FIG. 1.23. In addition to the lines described above, the MCS6520 provides four interrupt input/peripheral control lines and the logic necessary for simple, effective control of peripheral interrupts. No external logic is required for interfacing the MCS650X microprocessor to most peripheral devices."

Especially notice the last sentence, above, "No external logic is required for interfacing the MCS650X microprocessor to most peripheral devices." This is another key to the multi-microcomputer system using 8 microcomputers. All of the present MCS6502 microcode routines to do keyboard, CRT display, printer, disk and other usual data processing functions can be used either without change, or at most, very little change in the BICPU microcomputer invention.

It seems impossible, but with the BICPU microcomputer, only two basic logical bimemory hookups are required to logically interconnect thousands of BICPU microcomputers in logical interacting parallel programs in a running multi-microcomputer system, with tens of thousands of parallel programs.

The logical bimemory "S" hookup (Straight Line) with a BIM mode on one end and a FLT mode on the other, with any number of interconnecting PRM-1 and PRM-2 modes in between, and the logical bimemory "Y" hookup with a BIM mode at the base of an imaginary "Y" and a FLT mode at the end of each branch of the imaginary "Y", with any number of interconnecting PRM-1 and PRM-2 modes in between the BIM mode and the FLT modes.

When programmers perfect the use of these two bimemory hookups, truly fantastic "bimemory logic structures" can be created that "mimic the thinking" of the hum programmers and human field application design engineers involved.

In a climate forecasting context as outlined above, each ellipsoidal cell contains information pertaining to a specific volume of atmosphere. For processing this information, one or more BICPU microcomputers can be used for each cell. In accordance with the invention, information written by a first BICPU microcomputer to it's "A" bus circuits and stored in the standard memory connected thereto, can be logically directly read from these same "A" bus circuits by other mechanically and logically connected BICPU microcomputers. The consenting first BICPU microcomputer in a FLT mode, directly logically connects some or all of it's "A" bus circuits, to the other BICPU microcomputer in the BIM mode.

The other BICPU microcomputers individually take direct logical bimemory control of some of all of the "A" bus circuits of the consenting first BICPU microcomputer, and the standard memory circuits connected thereto, using either a logical bimemory "S" hookup or a logical bimemory "Y" hookup, with the consent of the first BICPU microcomputer. Data from contiguous cells can thereby be evaluated very rapidly.

It is not necessarily intuitively obvious, but the BICPU microcomputer invention requires the human programmers to cause each and every logical interconnection of BIC-BUS circuits between any two BICPU microcomputers to be made by execution of appropriate program steps. This is an object of the invention.

The human field application system designers mechanically interconnect thousands of BICPU microcomputers in billions of different unique systems. Each and every one of the individual, independent BICPU microcomputers can run all of their individual parallel programs, and each and every one of the individual, independent BICPU microcomputers can communicate in their old fashion way, using the standard memory circuits connected to their "A" bus circuits, just the same as they do now. However, no logical bimemory "S" hookup between two BICPU microcomputers occurs on BIC-BUS circuits until the human programmers write new microcodes logically storing valid bus numbers in the new "B" and "C" registers and write logical bimemory hookup microcodes to logically interconnect two BICPU microcomputers, one in a BIM mode, and one or two in a consenting FLT mode.

The BICPU microcomputer invention, puts the human programmer—with the help of the human field application system designers—incomplete control of the logical bimemory interconnection of BICPU microcomputers. The BICPU microcomputer causes human programmers to create truly highly parallel logic programs that fit the data flow of the problem, and best employ the data processing power and standard memory circuits connected to the "A" bus circuits of individual Bimemory Independent CPU microcomputers in a multi-BICPU microcomputer system, to enhance the data processing therein.

Specifically, if the state of a first cell changes, the first BICPU microcomputer modeling the first cell, can write data relating to these changes in the first cell, directly logically to the "A" bus circuits of a consenting second BICPU microcomputer modeling a second cell, and the standard memory circuits connected thereto.

Moreover, the first BICPU microcomputer modeling the first cell, can read data directly logically from the "A" bus circuits, and the standard memory circuits connected thereto, of the consenting second BICPU microcomputer modeling the second cell. With such direct logical bimemory hookup capabilities for each BICPU microcomputer, a system can be formed where BICPU microcomputers—and the standard memory circuits connected to their "A" bus circuits—can be linked, treed and chained to closely model the interactive data flow of the modeled cells that make up the atmosphere or some other complex system.

In accordance with the invention, the BICPU microcomputers contain all of the necessary switching circuits, arbitration logic circuits and error detecting circuits needed to effectively logically interconnect BICPU microcomputers in either the logical bimemory "S" hookup or the logical bimemory "Y" hookup, within the individual BICPU microcomputers. Since all logic switching circuits, all arbitration logic circuits and error detecting circuits are contained within the BICPU microcomputers, only simple, single circuit, BIC-BUS circuits are needed to mechanically interconnect the "B" and "C" bus circuits of two BICPU microcomputers.

Therefore, in a large multi-BICPU microcomputer system of several thousand BICPU microcomputers mechanically interconnected with several thousand BIC-BUS circuits, the only logic circuits needed on the CPU side of the "A" bus circuits is the BICPU of the BICPU microcomputer invention itself. The fabrication costs of multi-BICPU microcomputer systems are, therefore, notably reduced. The BICPU microcomputers are also, preferably, adapted from existing highly successful microprocessor or microcomputer chips.

Multi-BICPU microcomputers systems require only BICPU microcomputers, standard BIC-BUS circuits, and standard memory circuits containing present standard peripherals.

The cost of adding the BICPU microcomputer bimemory switching circuits to present microprocessors is relatively small, and the total costs will be fairly low, compared to present multiprocessor systems. The billions of man hours, that have gone into developing standard microcode routines, to handle such mundane computer tasks as monitoring the keyboard, displays, disks and other peripheral equipment, over the past twenty years, will continue to be used fully. The object of practicality is thus achieved.

There is one such bimemory switching circuit connected in each BICPU microcomputer dedicated standard memory address circuit, standard memory data circuit and standard memory control circuit.

Figure 2:
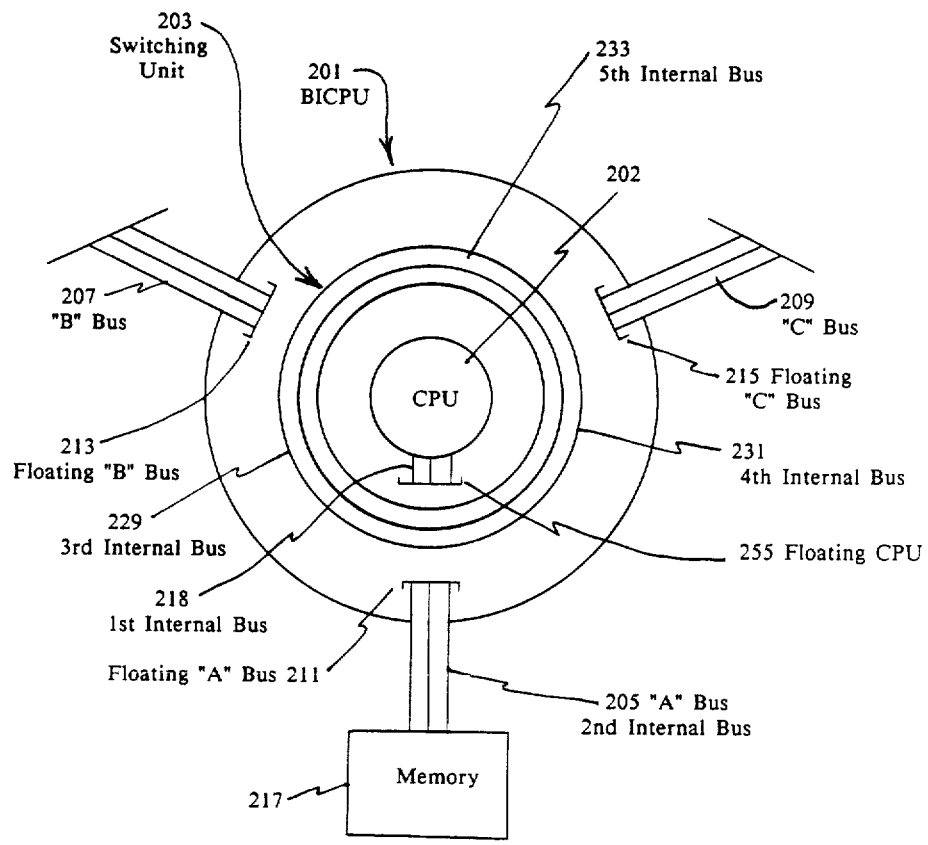

FIG. 2 illustrates the logically disconnected and latched positions of the five major switch means in the bimemory switching circuits and the logically disconnected and latched, floating circuits of the first and second switch means in the automatic power off deactivated mode.

This logically disconnected and latched, power off deactivated mode is an object of the invention.

Each of FIGS. 3 through 13 and 15 through 17 illustrate the logically disconnected and latched positions or the logically connected and latched positions or the logically connected and unlatched logical bimemory hookup positions of the third through seventh switch means in the bimemory switching circuits, controlled by the CPU 202 to place the BICPU microcomputer in fifteen different logical bimemory modes, when power is being supplied to the power circuits.

Figure 3:
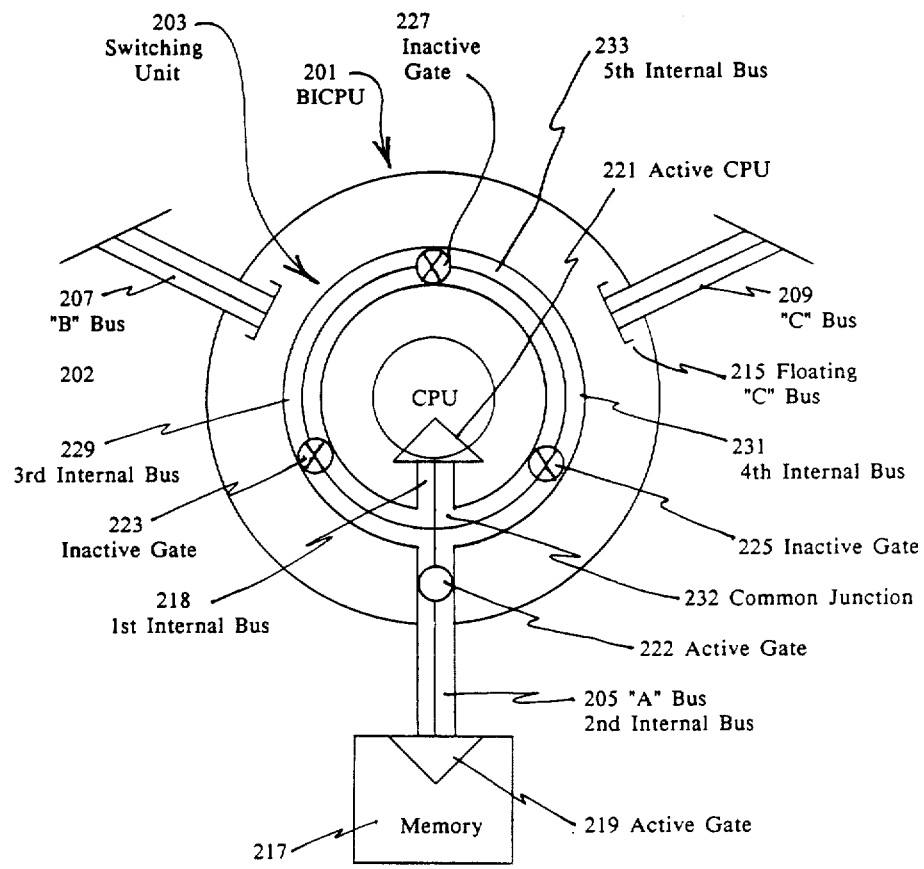
Figure 4:
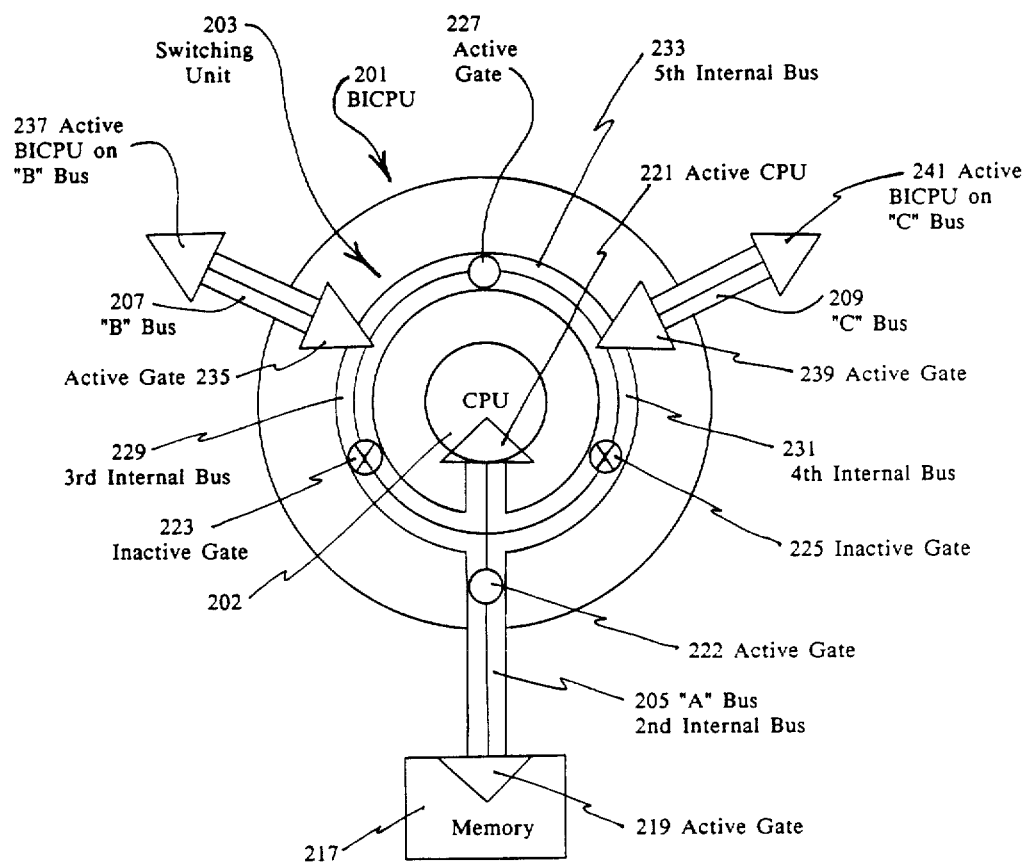
Figure 5:
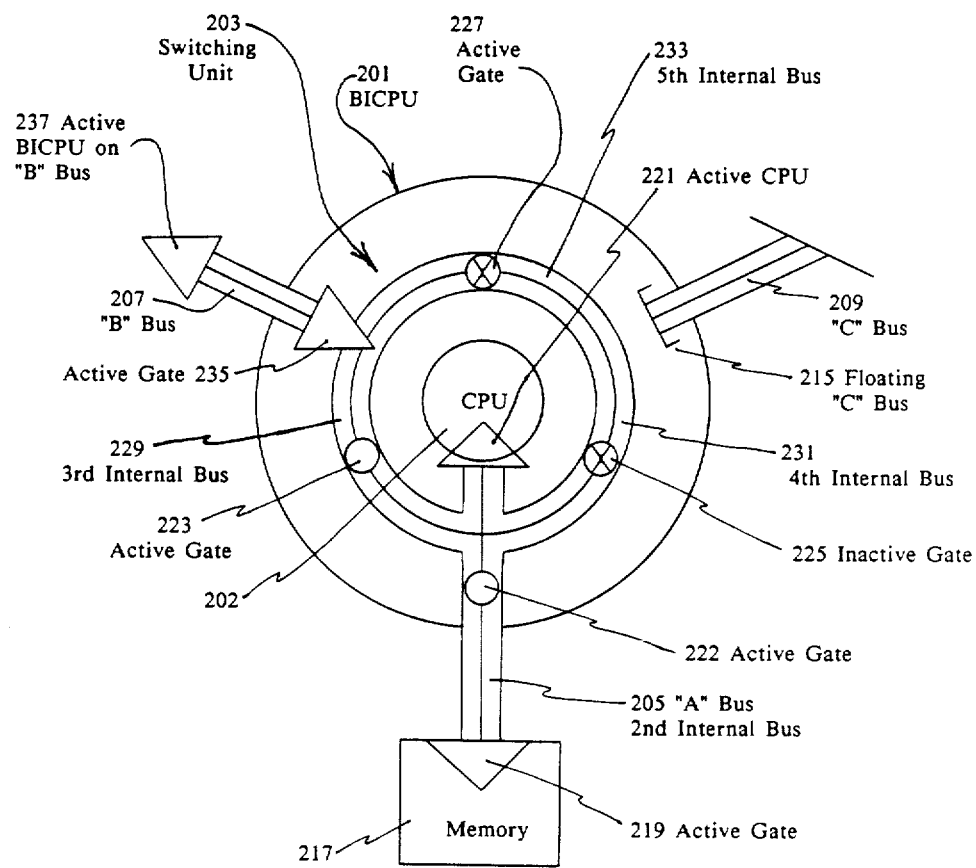
Figure 6:
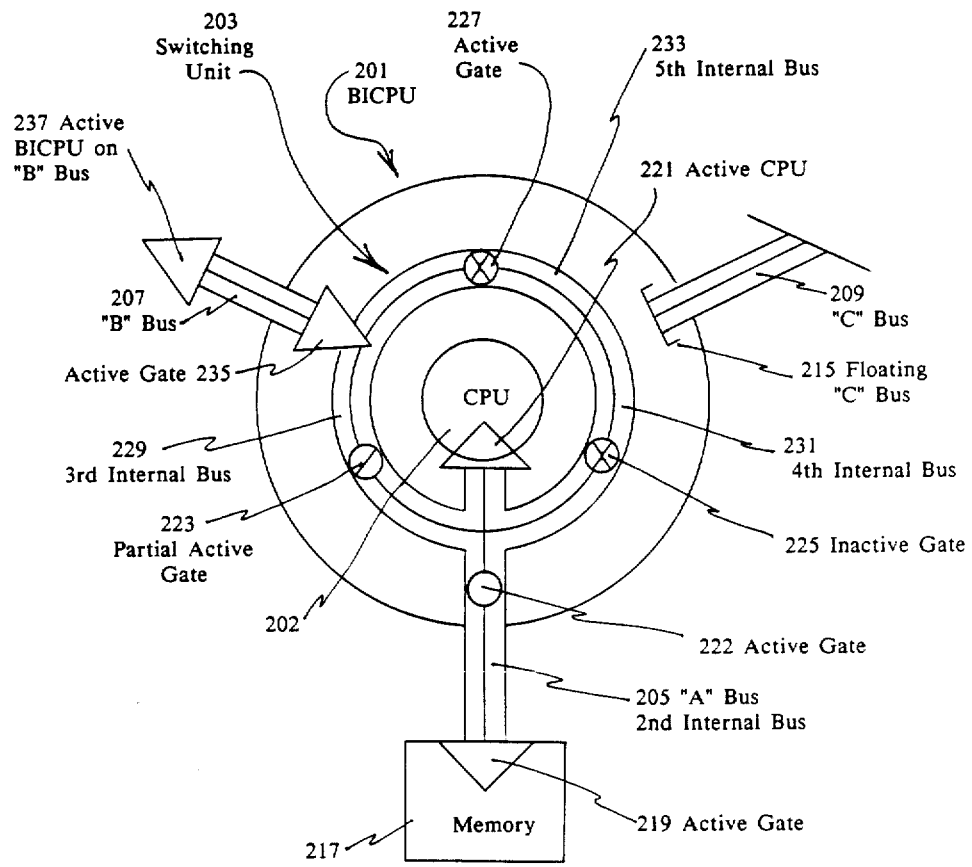
Figure 7:
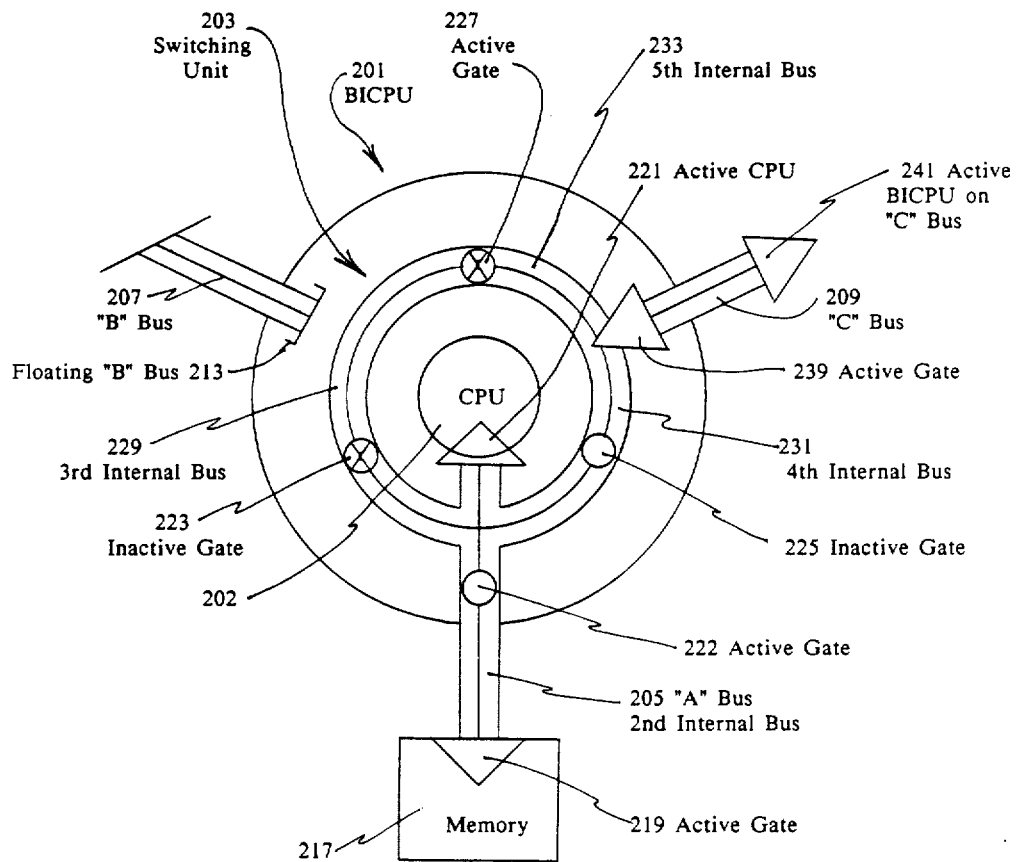
Figure 8:
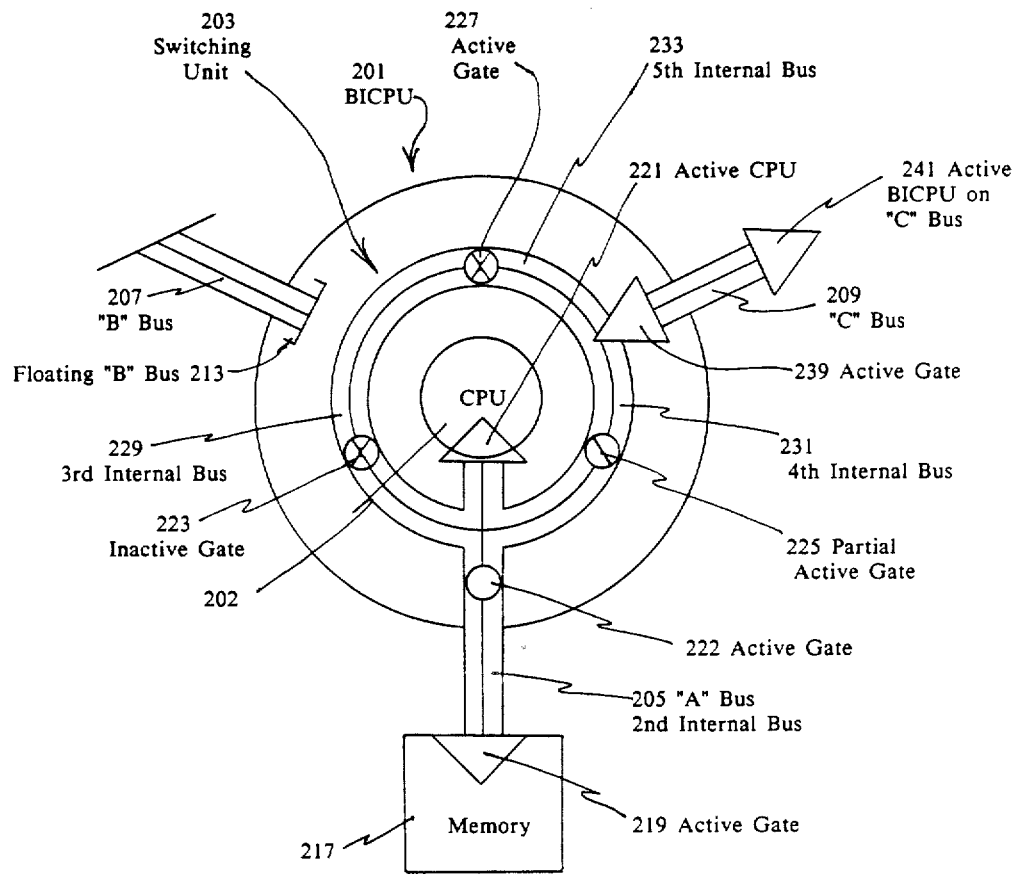
Figure 9:
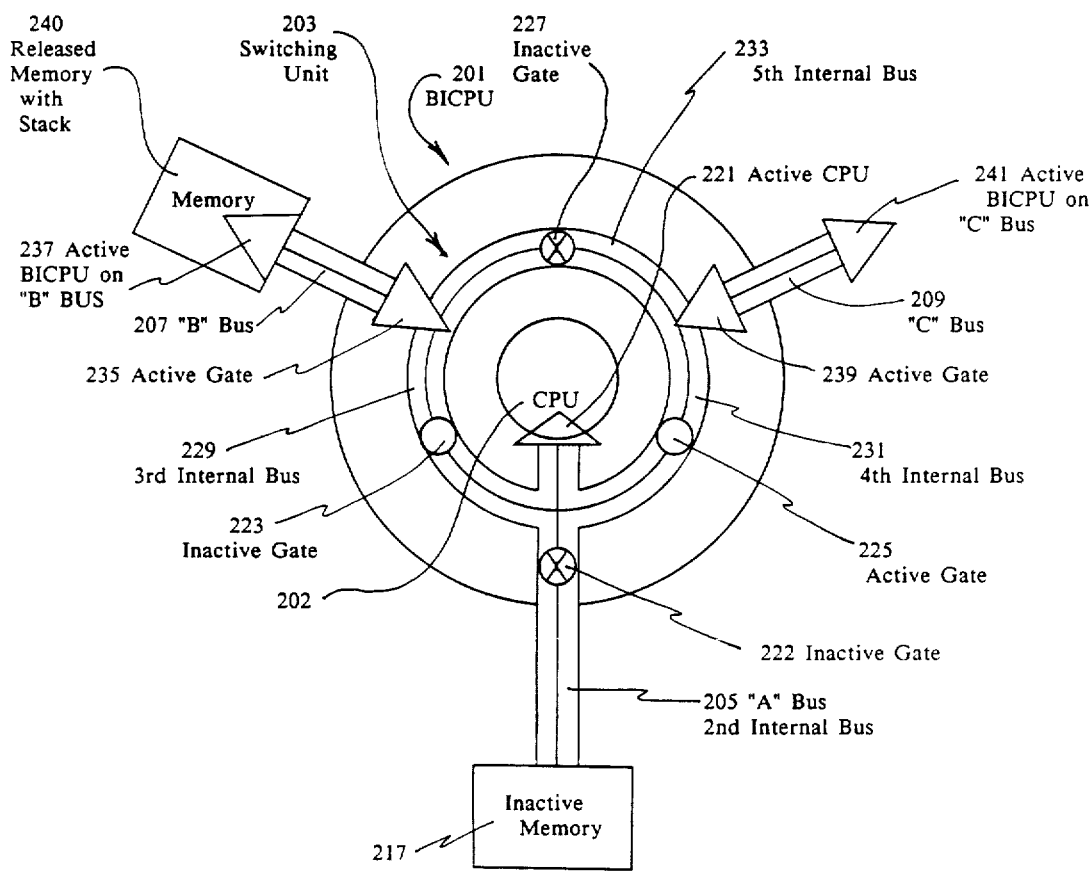
Figure 10:
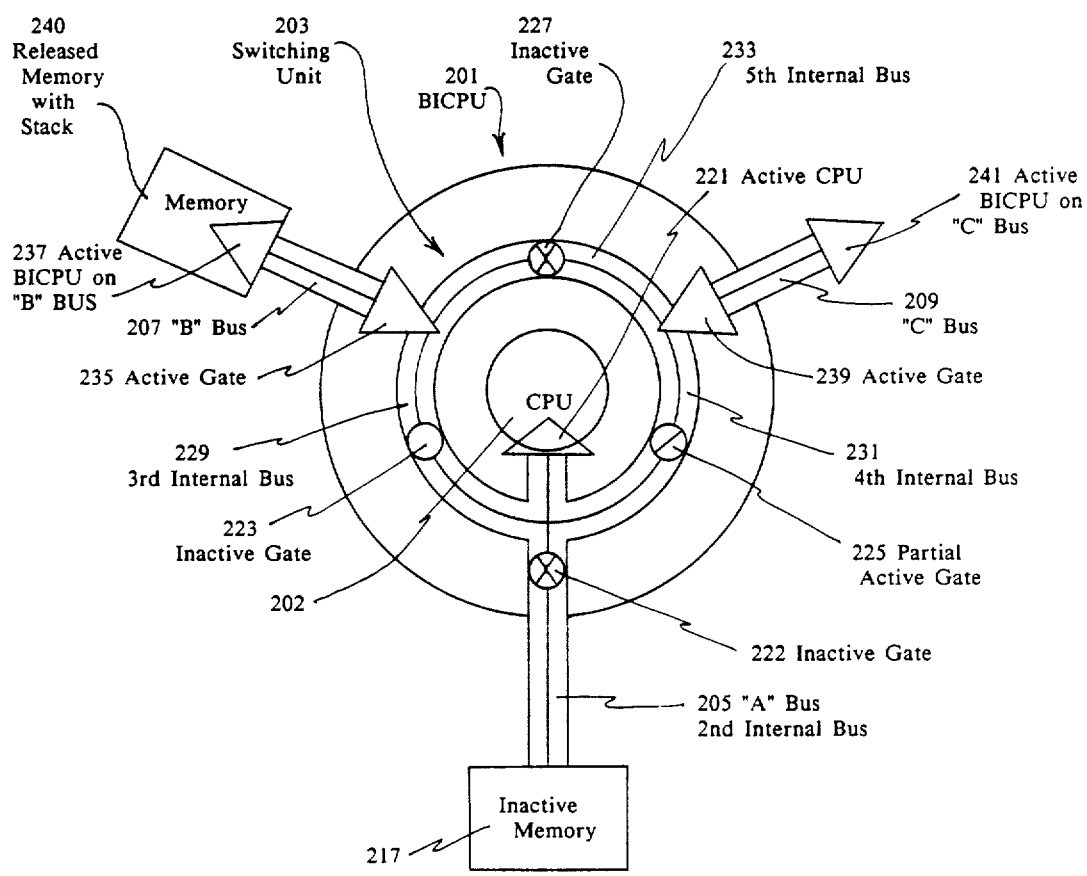
Figure 11:
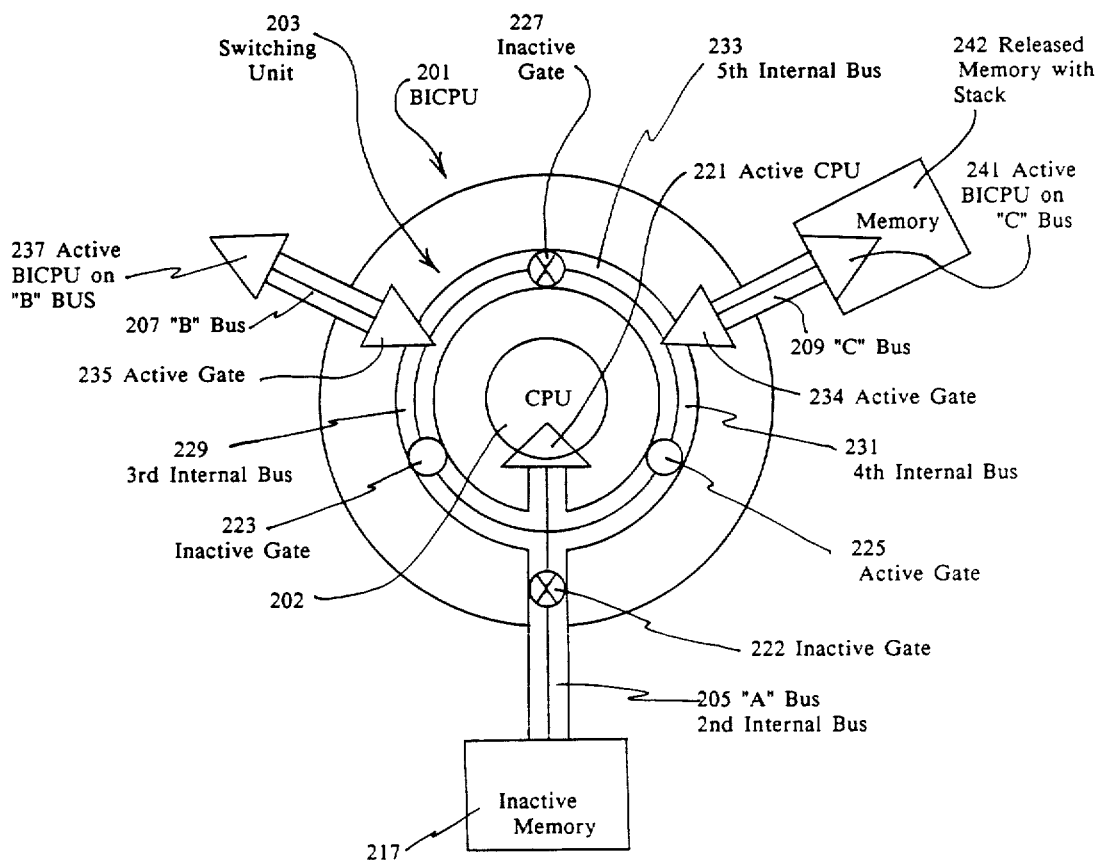
Figure 12:
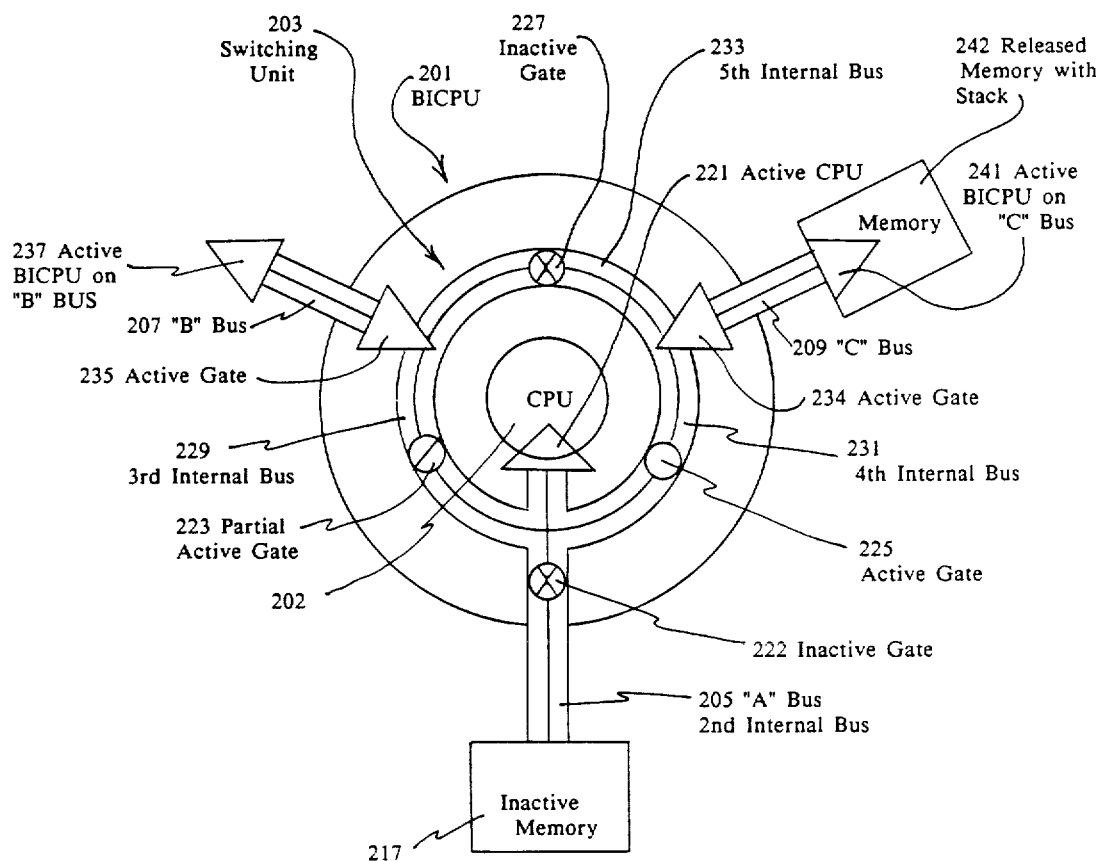
Figure 13:
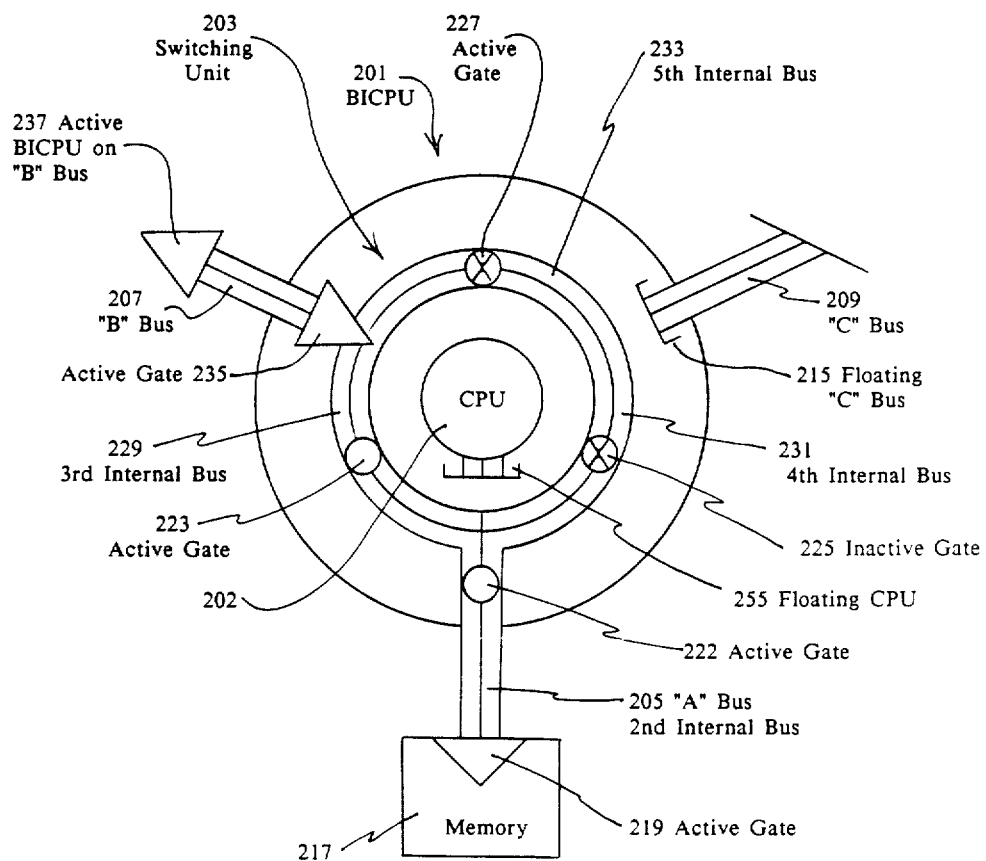
Figure 14:
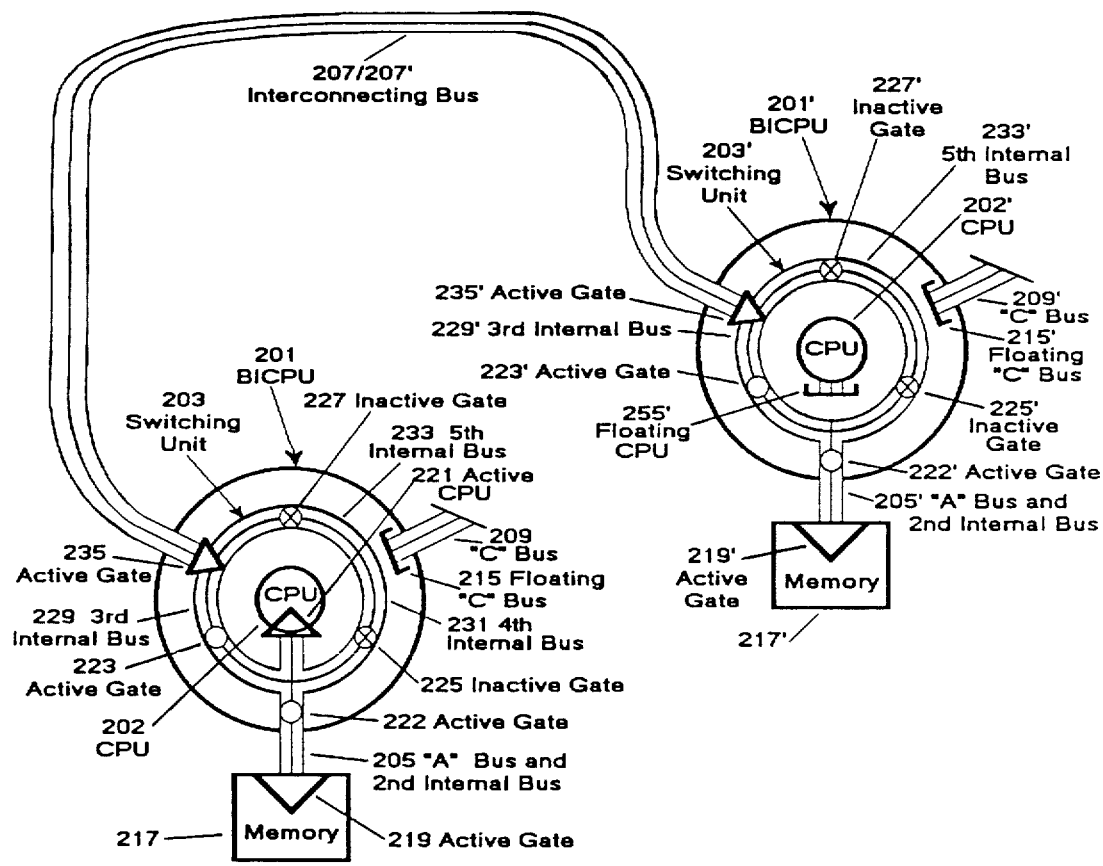
Figure 15:
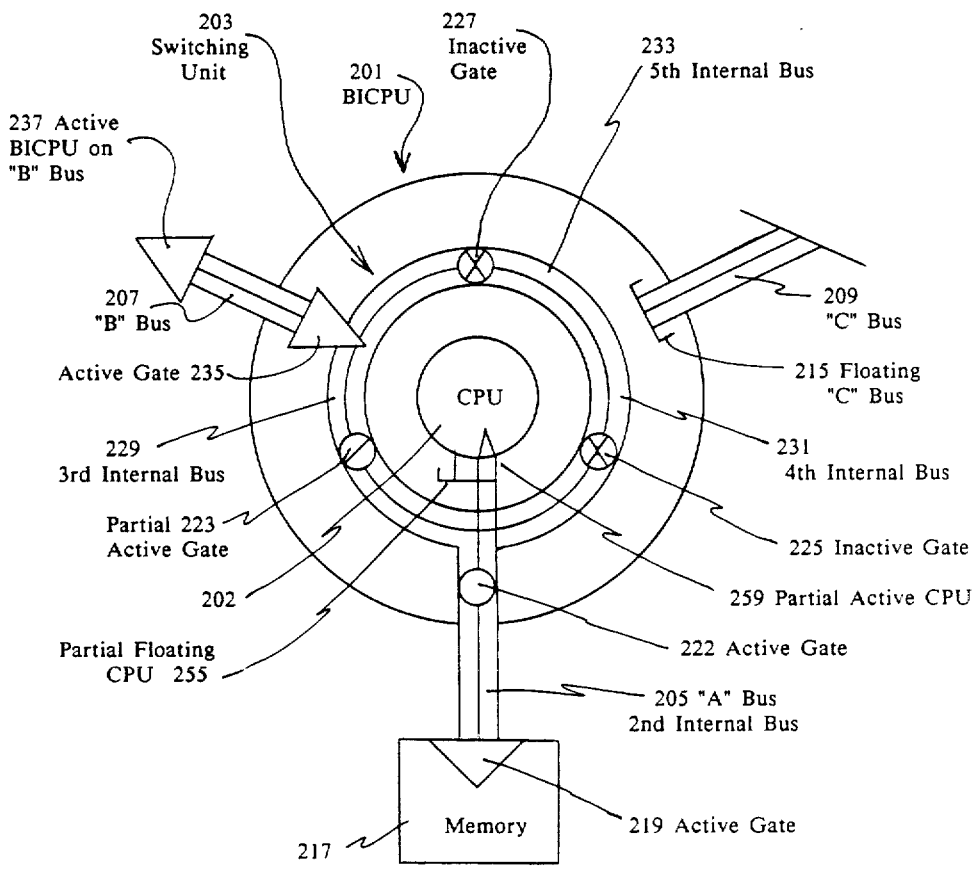
Figure 16:
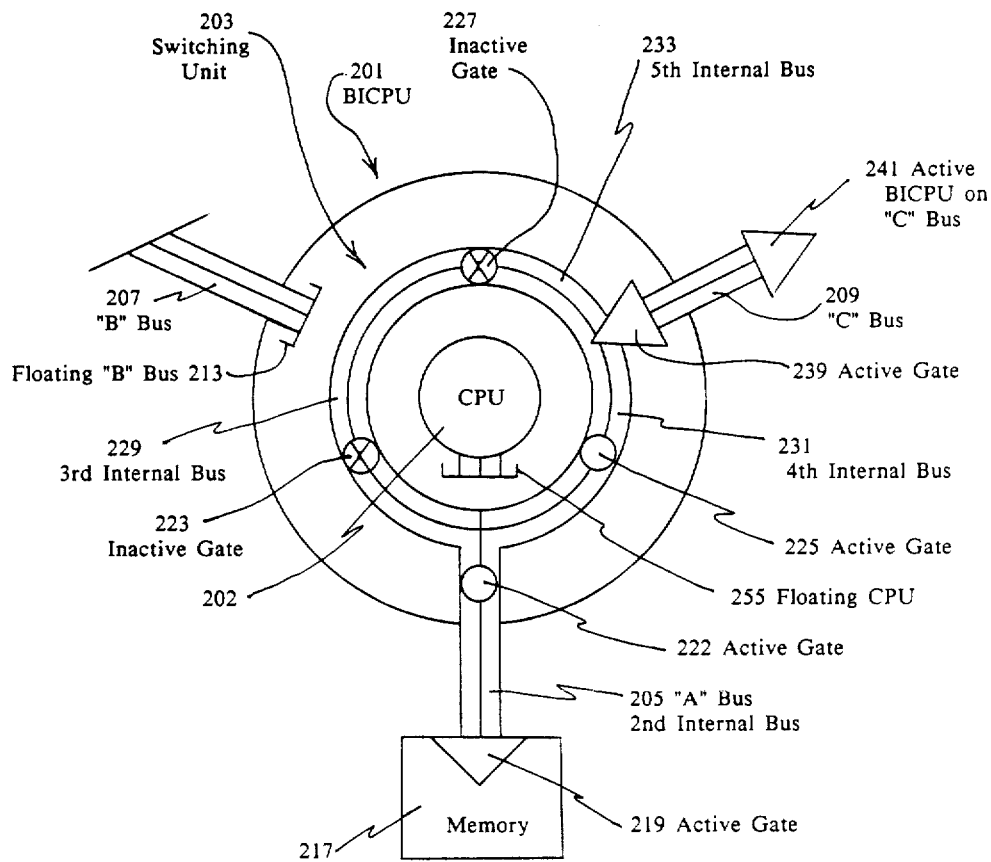
Figure 17:
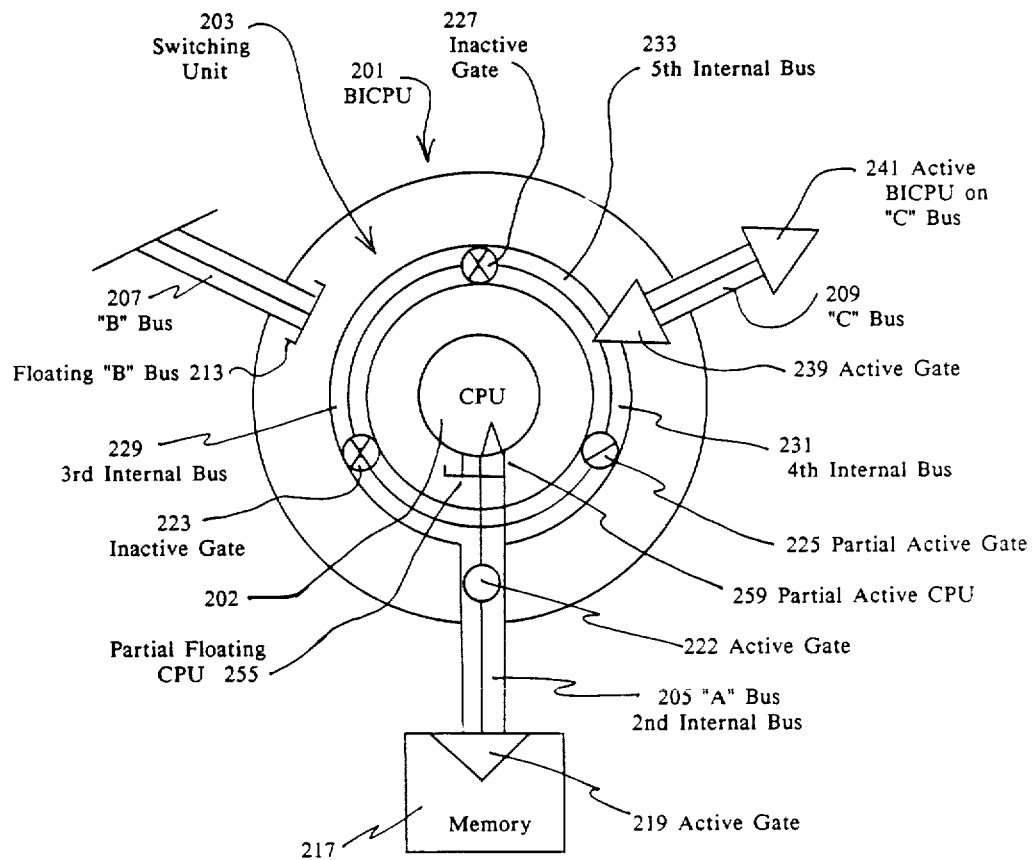
Figure 18:
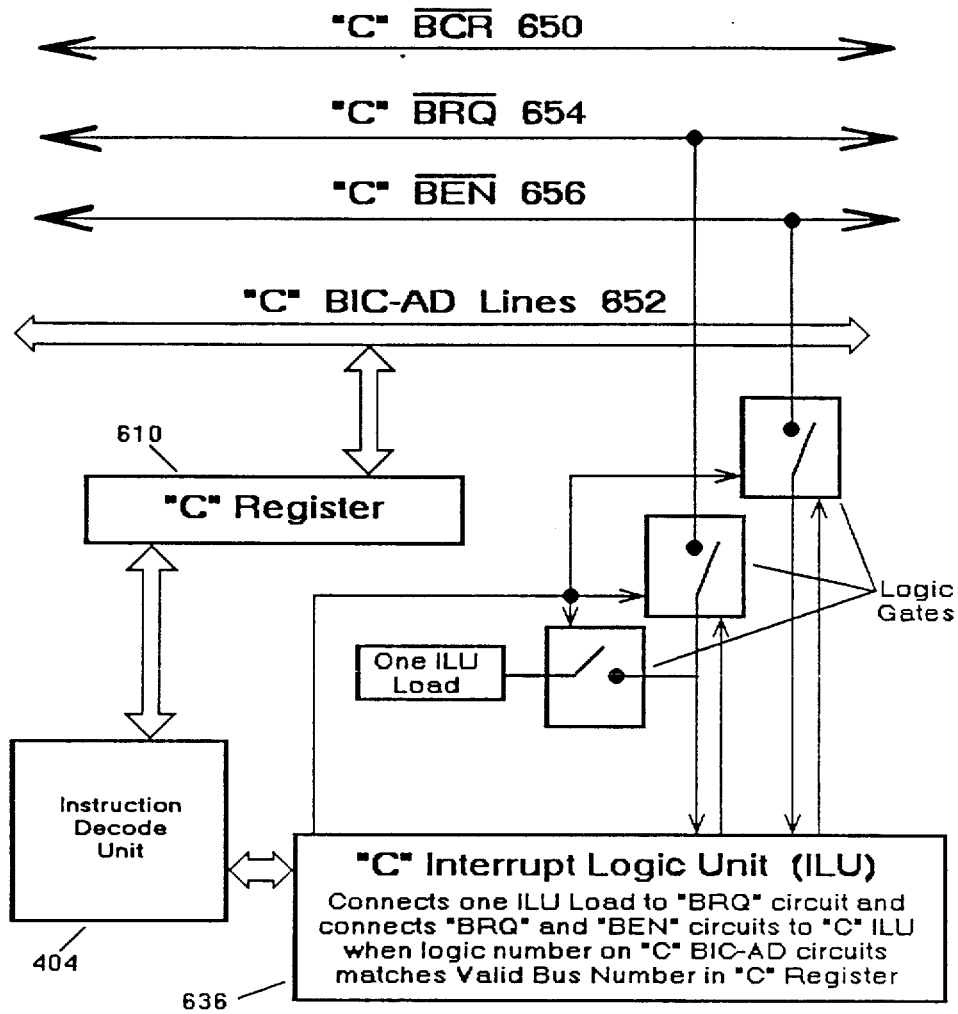
Figure 19A:
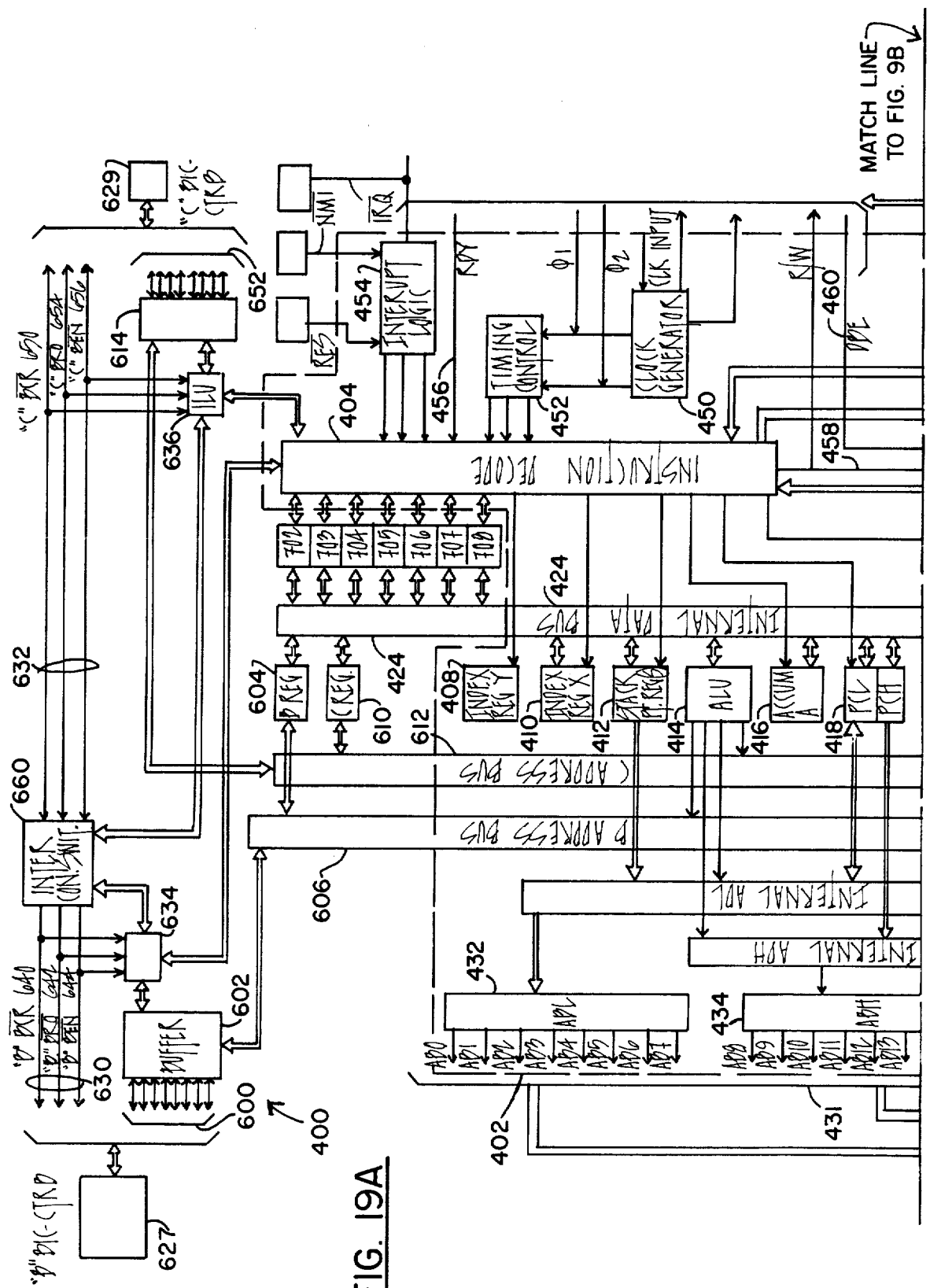
Figure 19B:
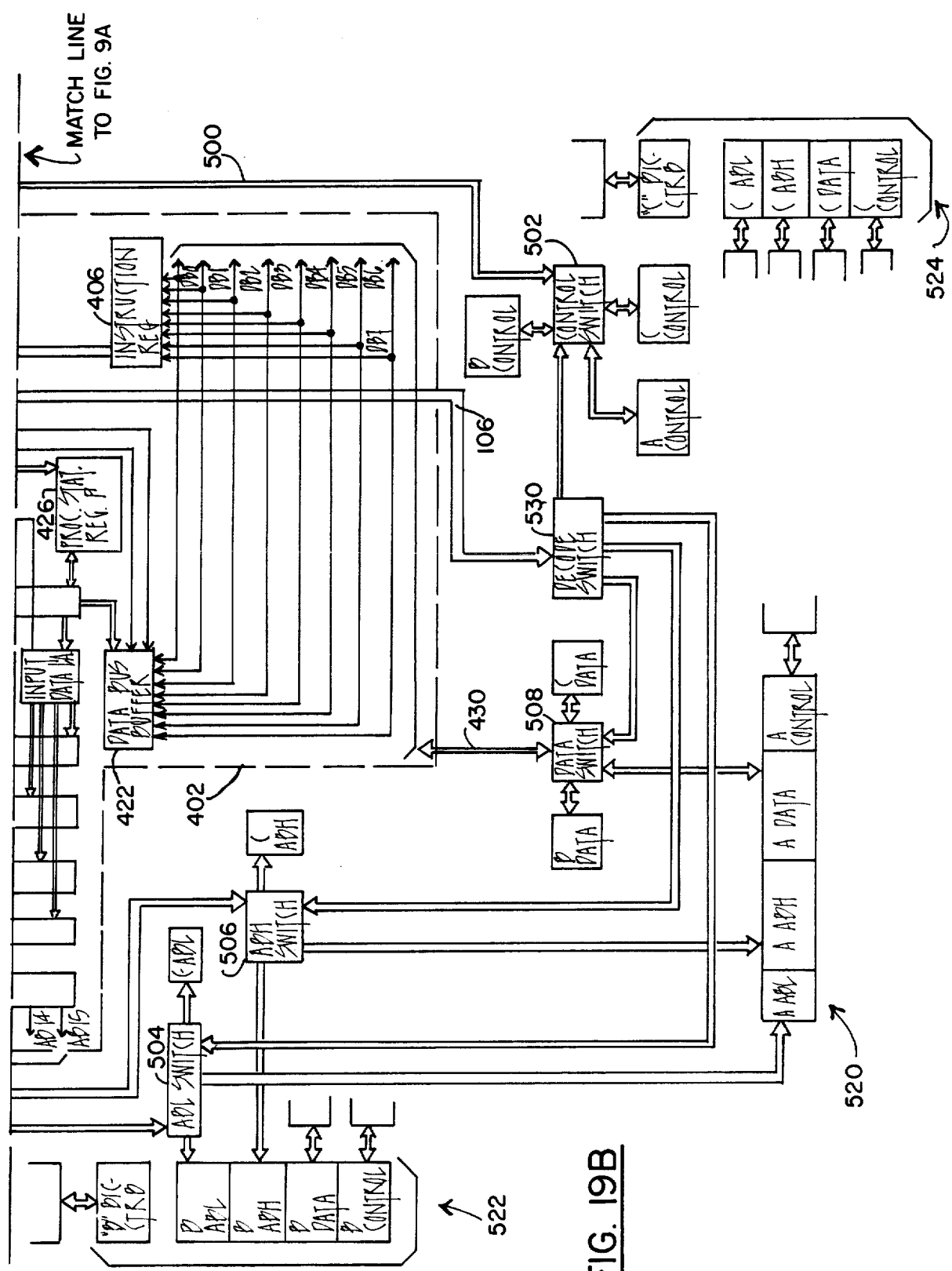
Figure 20:
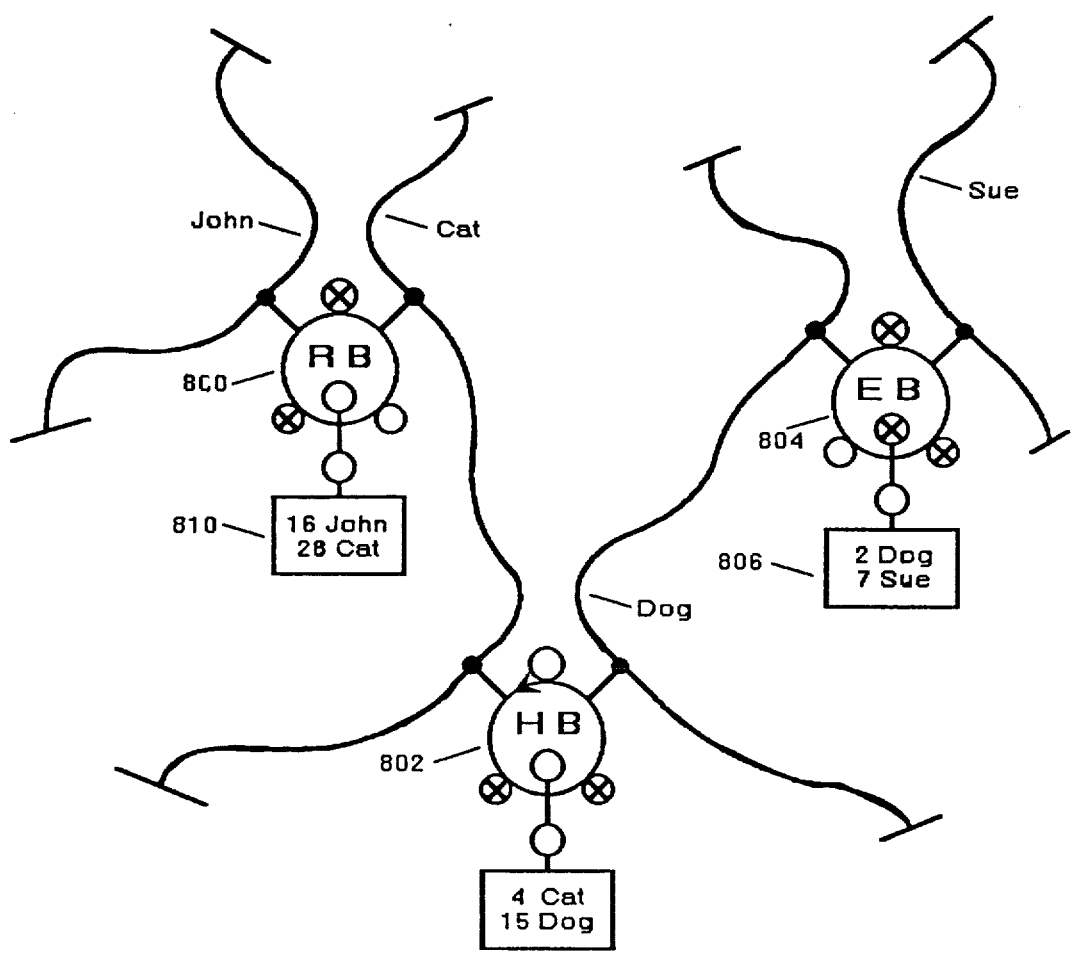
Figure 21:
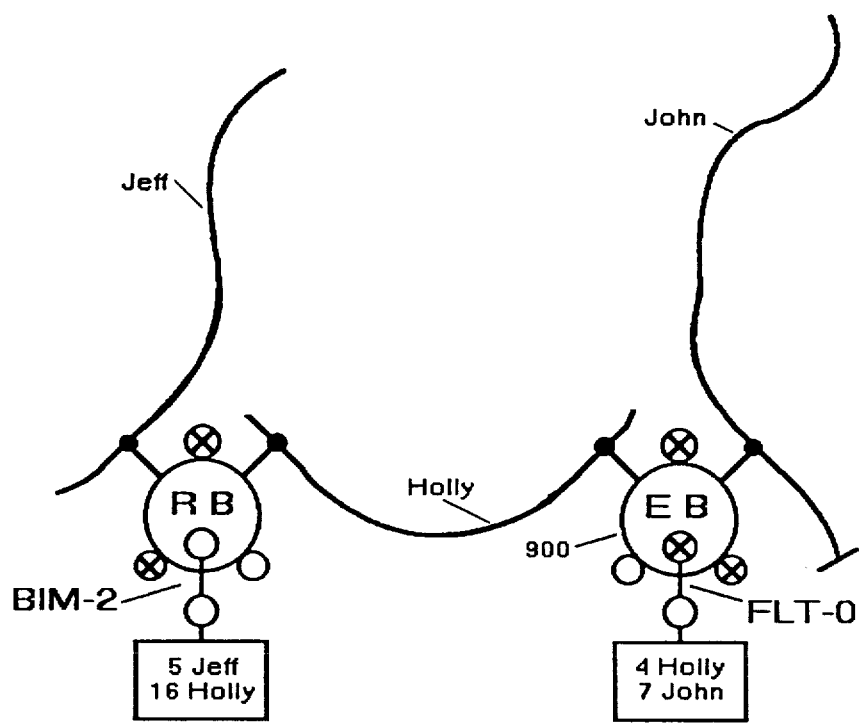
Figure 22:
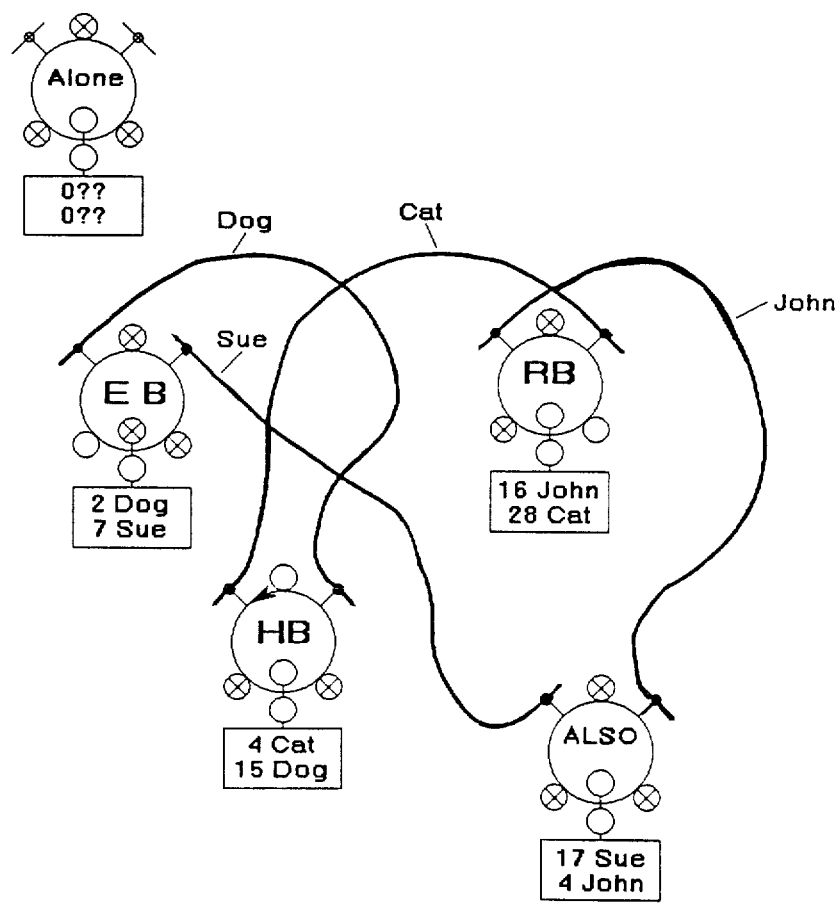
Figure 23:
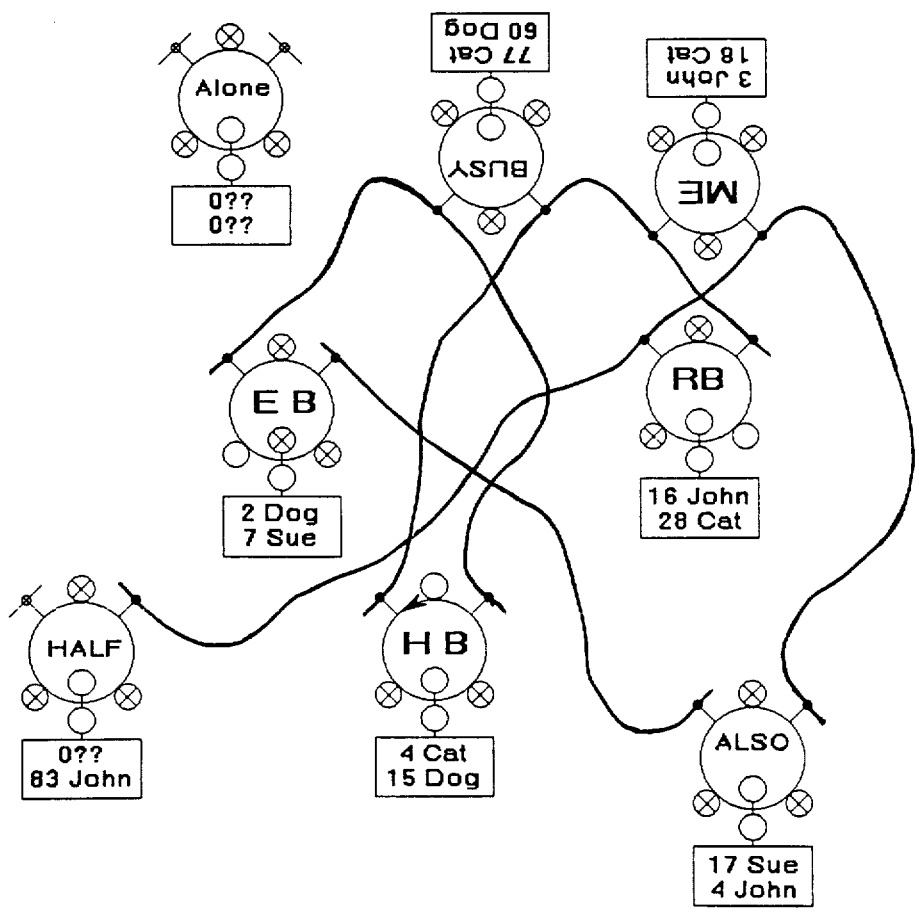
Figure 24:
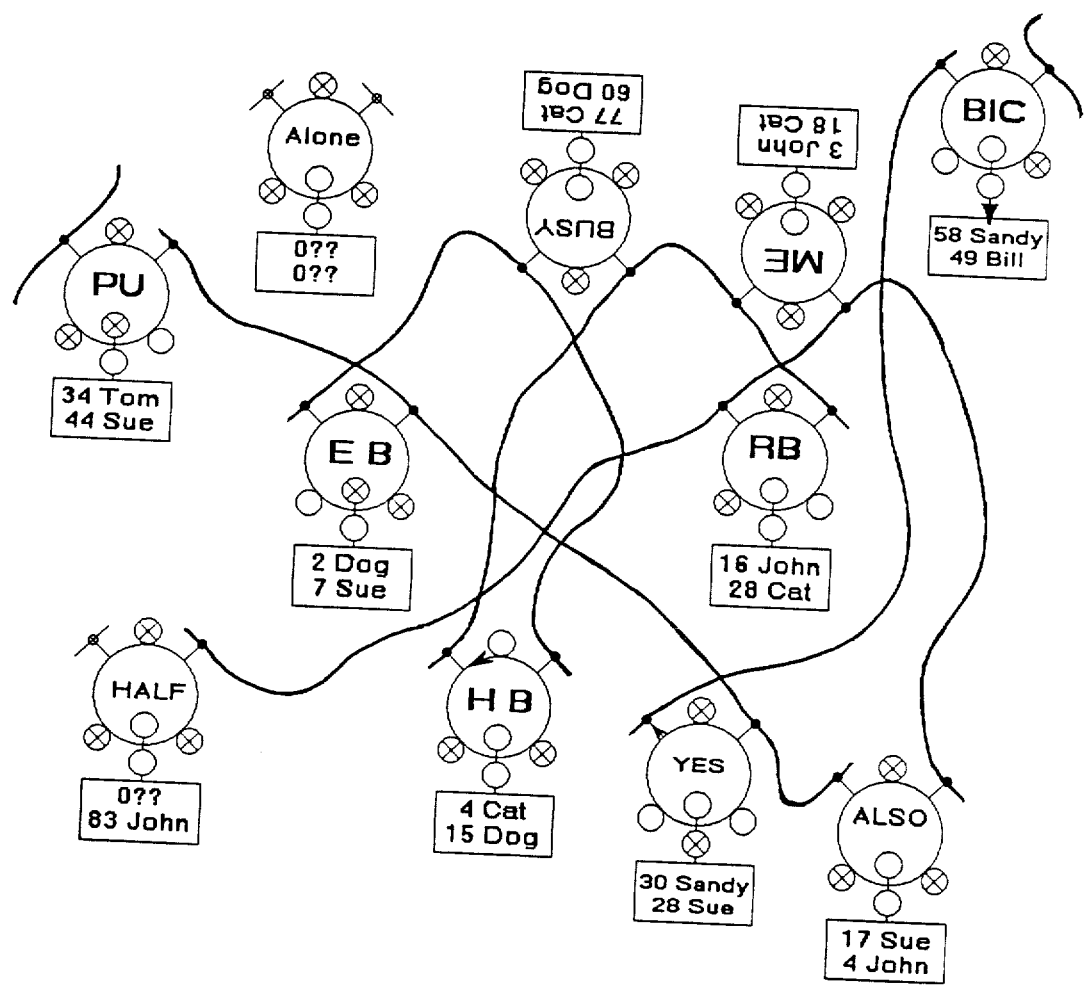
Figure 1:
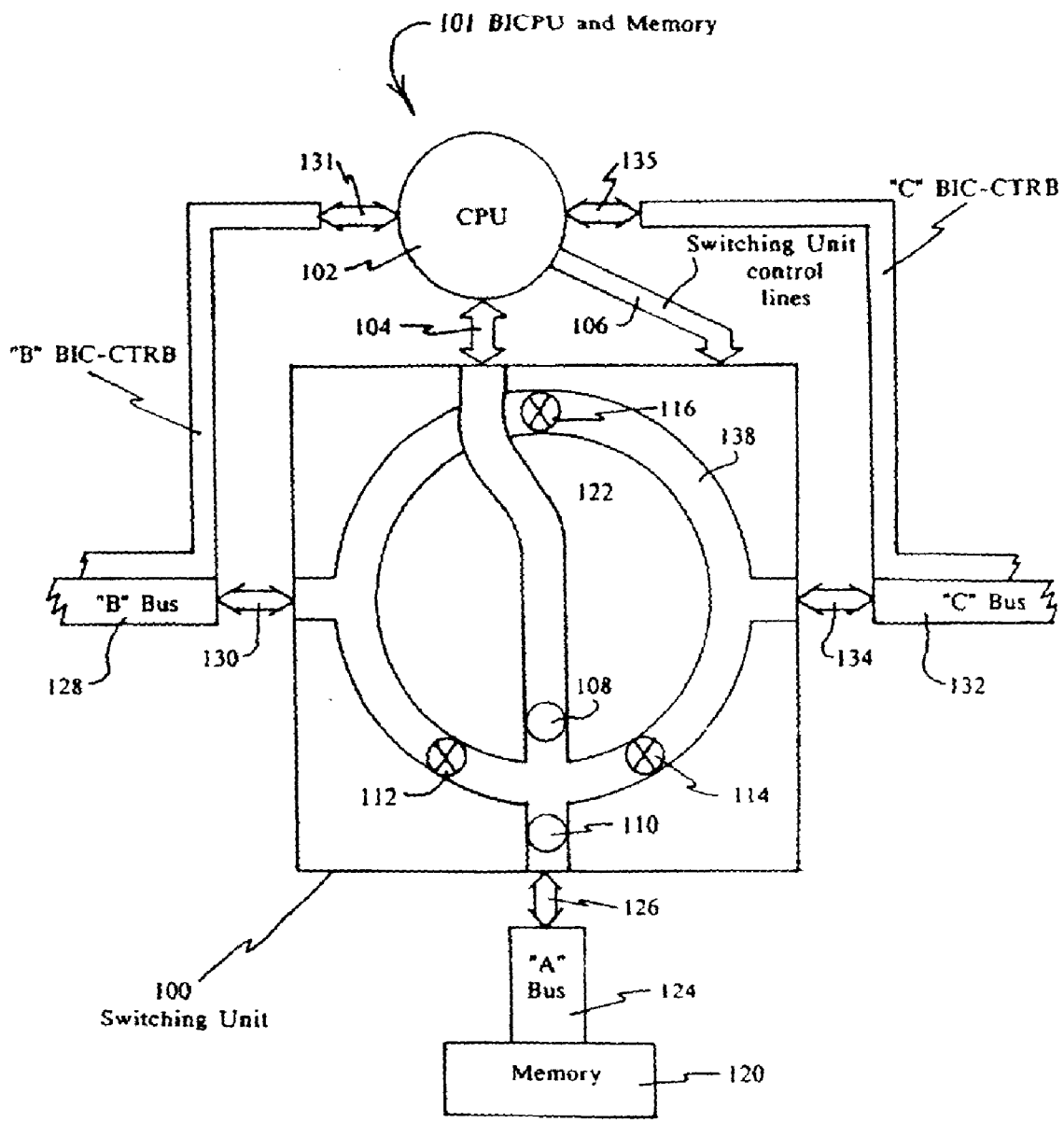

FIG. 3 represents the PRM-0 mode.
FIG. 4 represents the PRM-1 and PRM-2 modes.
FIG. 5 represents the BIM-0 mode.
FIG. 6 represents the BIM-1 mode.
FIG. 7 represents the BIM-2 mode.
FIG. 8 represents the BIM-3 mode.
FIG. 9 represents the BIM-4 mode.
FIG. 10 represents the BIM-5 mode.
FIG. 11 represents the BIM-6 mode.
FIG. 12 represents the BIM-7 mode.
FIG. 13 represents the FLT-0 mode.
FIG. 14 is an illustration of the logically disconnected and latched switch means, the logically connected and latched switch means and the logically connected and unlatched switch means of two BICPU microcomputers in a logical bimemory "S" hookup.
FIG. 15 represents the FLT-1 mode.
FIG. 16 represents the FLT-2 mode.
FIG. 17 represents the FLT-3 mode.
FIG. 18 is a diagram depicting one way one ILU load can be logically connected to, and logically disconnected from, the "BRQ" circuit, and how the "BEN" and "BRQ" circuits of one ILU, can be logically connected to the "BEN" and "BRQ" circuits of the "B" and "C" bus circuits.
FIG. 19 is a detailed diagram of a BICPU microcomputer.
FIG. 20 is an illustration of BICPU microcomputers connected along dedicated standard Bimemory Interconnecting Control-BUS (BIC-BUS) circuits connected to "B" and "C" bus circuits, 522 and 524 of FIG. 19.
FIG. 21 is another illustration of BICPU microcomputers connected along dedicated BIC-BUS circuits connected to "B" and "C" bus circuits.
FIGS. 22 through 24 illustrate how a given multi-microcomputer system of BICPU microcomputers interconnected on sets of dedicated BIC-BUS circuits can be easily changed and modified, where both BICPU microcomputers and sets of dedicated BIC-BUS circuits can be added, that can contain additional "parallel" programs, without changing the program logic of the original system.

DETAILED DESCRIPTION OF A PREFERRED EXEMPLARY EMBODIMENT OF THE INVENTION

GENERAL DESCRIPTION OF THE BIMEMORY SWITCHING CIRCUITS OF A BICPU MICROCOMPUTER

Figure 1:
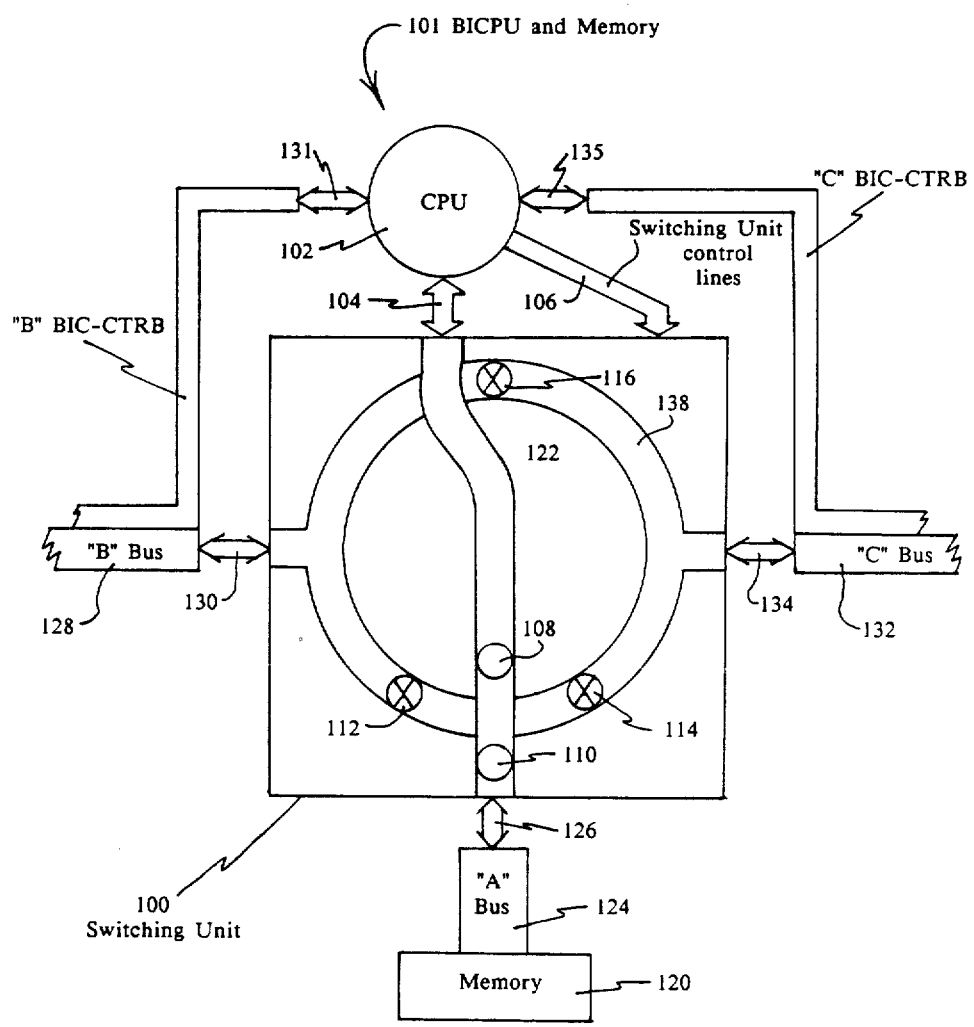
FIG. 1 is a general diagram of one simple bimemory switching circuit according to the invention, in one of the dedicated standard memory circuits between the CPU and the "A" bus circuits, the "B" bus circuits and the "C" bus circuits.

In FIG. 1, a basic diagram of a bimemory switching unit 100 of a bimemory microcomputer (BICPU microcomputer) 101—in accordance with the invention—is illustrated. The bimemory switching unit 100 is attached to a conventional central processor unit (CPU) 102—(such as a MCS6502 or some other similar microcomputer)—being implemented on the BICPU microcomputer invention. The bimemory switching unit 100 is inserted and connected into each input and output circuit presently connected to the microprocessor being implemented on the BICPU microcomputer invention, (excepting only the power circuits of the microprocessor which are connected directly to the power circuits of the BICPU microcomputer). The input and output circuits of the CPU prior to being implemented on the invention are directly logically connected to standard memory circuits 124 and such input and output circuits are herein referred to as the "A" bus circuits and the standard memory 120 connected thereto, of a BICPU microcomputer.

The switching unit 100 is connected to buses "A", "B" and "C" through the first, second and fourth parts of a first switching mechanism divided into five parts 126, 130, 131, 134, and 135, and is connected to the CPU 102 through a second switch mechanism 104. These switches are utilized to connect the address, data and control lines necessary for the proper memory access between the buses, the switching unit 100 and the CPU, 102. The third 131 and fifth 135 parts of the first switch are utilized to connect the CPU, 102 to the system address and status lines of the "B" and "C" buses.

Control lines, 106, enable the CPU, 102 to logically connect and disconnect the desired switches including the above described first and second as well as the third 108, fourth 110, fifth 112, sixth 114, and seventh 116. The third through seventh switches are utilized to create a data flow path through the switching unit 100 for transfer of data between the CPU 102 and the memory 120 and the "B" and "C" buses.

Based on signals from the CPU of the BICPU microcomputer on the control circuits 106, the first switch means (in 126, 130 and 134 circuits in FIG. 1), the second switch means (in 104 circuits in FIG. 1), the third switch means 108, the fourth switch means 110, the fifth switch means 112, the sixth switch means 114 and the seventh switch means 116 are logically disconnected and logically connected to (a) permit logical data flow, (b) to inhibit logical data flow, or (c) permit logical data flow to or from the "A" bus circuits 124 and the standard memory circuits connected thereto, of a BICPU microcomputer. Each first switch means, second switch means, third switch means 108, fourth switch means 110, fifth switch means 112, sixth switch means 114 and seventh switch means 116, it is noted, actually represents a plurality of logical elements, each of which can logically connect or logically disconnect an address, data, or control circuit that is mechanically connected to the switch means, under the control of the CPU 102 when power is being supplied to the BICPU microcomputer power circuits.

By appropriately logically connecting and logically disconnecting the first switch means (in 126, 130 and 134 circuits in FIG. 1), the second switch means (in 104 circuits in FIG. 1), the third switch means 108, the fourth switch means 110, the fifth switch means 112, the sixth switch means 114 and the seventh switch means 116, data can be logically transferred along any of various paths. Specifically, it is noted that the CPU 102 in FIG. 1 has logically connected and latched it's second, third and fourth switch means 108 and 110, and it's first switch means connected to it's fourth switch means, and has logically disconnected and latched it's fifth, sixth and seventh switch means 112, 114 and 116, and it's first switch means connected to it's fifth and sixth switch means, thus logically connecting CPU 102 to the "A" bus circuits 124 and the standard memory circuits 120 connected thereto, via a path used by conventional CPUs. In the invention, the logical transfer of data between CPU 102 and the "A" bus circuits and the standard memory circuits 120 connected thereto, is over the first internal bus circuits 122 9via I/O circuits 104 each with second switch means, via the third switch means 108 to a common junction point), and the second internal bus circuits to it's "A" bus circuits 124 (from the common junction point, via the fourth switch means 110, via I/O circuits 126 each with first switch means). As depicted in FIG. 1, the third switch means 108 and fourth switch means 110 are logically connected and latched (i.e. there is no "X" in the two small circles representing the switch means) permitting logical data transfer between CPU 102 and the "A" bus circuits 124 and the standard memory circuits 120 connected thereto. CPU 102 is directly logically connected to and directly logically controls the dedicated standard address circuits, standard data circuits, and standard control circuits, connected to the "A" bus circuits 124 and the standard memory circuits 120 connected thereto.

The fifth switch means 112 is a switching device, under the control of the BICPU microcomputer, that can logically connect and logically disconnect the circuit between the common junction point and the "B" bus circuits 128 (via I/O circuits 130 each with first switch means). The "B" bus circuits 128 can be mechanically connected to BIC-BUS circuits and logically connected to the "A" bus circuits and the standard memory circuits connected thereto, of a consenting second BICPU microcomputer. By logically disconnecting the sixth switch means 114, and logically disconnecting the fourth switch means 110, and logically connecting the fifth switch means 112 in a bimemory manner, CPU 102 directly logically connects the first BICPU microcomputer to the "A" bus circuits and the standard memory circuits connected thereto, of a consenting second BICPU microcomputer logically connected to the "B" bus circuits 128. The consenting second BICPU microcomputer on the "B" bus circuits 128, can directly logically connect the first BICPU microcomputer 101, to some or all of the consenting second BICPU microcomputer's "A" bus circuits and the standard memory circuits connected thereto, for a logical bimemory hookup.

In this way, the first BICPU microcomputer 101 can be directly logically connected to, and directly logically control some or all of the "A" bus circuits and the standard memory circuits connected thereto, of a consenting second BICPU microcomputer.

The first BICPU microcomputer 101 can be directly logically connected to, and thus directly logically control it's own "A" bus circuits and the standard memory circuits 120 connected thereto, or can be directly logically connected to, and thus directly logically control some or all of the "A" bus circuits and the standard memory circuits connected thereto, of a consenting second BICPU microcomputer in a bimemory manner. This logical bimemory hookup is called a logical bimemory "S" hookup.

The "Bimemory" characterization of the invention, comes from the fact that at the same time, one BICPU microcomputer in a BIM mode can be directly logically connected to, and directly logically control some or all of two "A" bus circuits and the standard memory circuits connected thereto, in a logical bimemory manner.

The "Independent" characterization of the invention, comes from the fact that every BICPU microcomputer can be logically disconnected from BIC-BUS circuits connected to it's "B" and "C" bus circuits and operate completely in a stand alone independent manner, at any time, without causing a failure of the program logic of other running BICPU microcomputers logically connected to the same BIC-BUS circuits, and without causing a failure of it's own program logic.

The sixth switch means 114 is a switching device, under the control of the BICPU microcomputer, that can logically connect and logically disconnect the circuit between common junction point and the "C" bus circuits 132 (via I/O circuits 134 each with first switch means). The "C" bus circuits 132 can be mechanically connected to BIC-BUS circuits and logically connected to a consenting third BICPU microcomputer. By logically disconnecting the fifth switch means 112, and logically disconnecting the fourth switch means 110, and logically connecting the sixth switch means 114 in a bimemory manner, CPU 102 directly logically connects the first BICPU microcomputer to some or all of the "A" bus circuits and the standard memory circuits connected thereto, of a consenting third BICPU microcomputer logically connected to the "C" bus circuits 132.

The consenting third BICPU microcomputer on the "C" bus circuits 132, can directly logically connect the first BICPU microcomputer 101, to some or all of the consenting third BICPU microcomputer's "A" bus circuits and the standard memory circuits connected thereto, for a logical bimemory hookup.

Referring now to the seventh switch means 116, a particularly significant aspect of the invention is achieved. The seventh switch means 116 is a switching device, under the control of the BICPU microcomputer. Specifically, logically disconnecting and latching the fifth and sixth switch means and logically connecting and latching the seventh switch means 116, directly logically interconnects the standard address, data, and control circuits between the "B" bus circuits 128 and the "C" bus circuits 132 over the fifth internal bus circuits 138. That is, a second BICPU microcomputer on the "B" bus circuits 128 can be directly logically connected to and directly logically control the "A" bus circuits and the standard memory circuits connected thereto, of a third BICPU microcomputer on the "C" bus circuits 132 via the fifth internal bus circuits 138. Conversely, a third BICPU microcomputer on the "C" bus circuits 132 can be directly logically connected to and directly logically control the "A" bus circuits and the standard memory circuits connected thereto, of a second BICPU microcomputer on the "B" bus circuits 128 via the fifth internal bus circuits 138. The first BICPU microcomputer 101 thereby directly logically interconnecting the two sets of BIC-BUS circuits connected to it's "B" bus circuits 128 and "C" bus circuits 132.

The logically disconnecting and logically connecting of the first switch means, the second switch means, the third switch means 108, the fourth switch means 110, the fifth switch means 112, the sixth switch means 114 and the seventh switch means 116 results in the BICPU microcomputer 101 assuming the various bimemory modes depicted in FIGS. 2 through 17.

Particularly notice that the standard BIC-BUS circuits mechanically directly logically interconnect "A" bus circuits and CPUs of the BICPU microcomputer invention.

Intuitively, it can seem the standard BIC-BUS circuits are mechanically interconnecting the standard memory circuits of two BICPU microcomputers.

This is not the case.

Standard memory circuits are connected only to "A" bus circuits of BICPU microcomputers. Standard BIC-BUS circuits are never connected to "A" bus circuits or to standard memory circuits. In a BICPU microcomputer, the standard address circuits in the "A" bus circuits always send the address information to the standard memory circuits connected thereto.

The standard address circuits of the "B" and "C" bus circuits are bi-directional standard address circuits, similar to the bi-directional standard data circuits. The B and "C" bus circuits are connected to BIC-BUS circuits, which are connected to other "B" or "C" bus circuits.

When the "B" or "C" bus circuits are used to directly logically connect the CPU of this BICPU microcomputer in a BIM mode, through BIC-BUS circuits to "A" bus circuits of a consenting BICPU microcomputer in a FLT mode, standard address information is always sent from this BICPU microcomputer in a BIM mode, to the "A" bus circuits of the consenting BICPU microcomputer in the FLT mode.

When the "B" or "C" bus circuits are used to directly logically connect a BICPU microcomputer in a BIM mode to the "A" bus circuits of this consenting BICPU microcomputer in a FLT mode, standard address information is always sent from the BICPU microcomputer in the BIM mode to the "A" bus circuits of this consenting BICPU microcomputer in a FLT mode.

When the "B" and "C" bus circuits of this interconnecting BICPU microcomputer in a PRM-1 or PRM-2 mode, are used to directly logically interconnect a BICPU microcomputer in a BIM mode, on either the "B" or "C" bus circuits, with a BICPU microcomputer in a consenting FLT mode, on the other "C" or "B" bus circuits, standard address information is always sent from the BICPU in the BIM mode to the BICPU in the FLT mode.

The standard BIC-BUS circuits directly mechanically interconnect the "B" or "C" bus circuits of two different BICPU microcomputers. The individual, independent BICPU microcomputers directly logically interconnect their "B" or "C" bus circuits, so that the standard address information, always flows from the BICPU microcomputer in the BIM mode, to the "A" bus circuits of the consenting BICPU microcomputer in the FLT mode. Thus the BICPU microcomputer in the BIM mode, is always sending standard address information, from it's CPU, to the directly logically connected set of "A" bus circuits.

Therefore, the new standard BIC-BUS circuits directly, logically, interconnecting the "A" bus circuits and CPUs of BICPU microcomputers, do not replace, or interfere with, the operation of all of the present standard IEEE type busses, and other standard busses that are presently used to interconnect standard memory circuits, and other present peripheral devices connected to present standard memory circuits.

The completely new and unique, logical bimemory "S" hookup, and the completely new and unique, logical bimemory "Y" hookup, between BICPU microcomputers in BIM modes, and consenting BICPU microcomputers in FLT modes, with interconnecting BICPU microcomputers, in PRM-1 or PRM-2 modes in between, in a multi-BICPU microcomputer system, is an object of the Bimemory Independent CPU microcomputer invention.

Using the logical bimemory "S" hookup, and the logical bimemory "Y" hookup, several thousand BICPU microcomputers can be mechanically and logically interconnected, in a new and unique, interacting, parallel manner. Human programmers, and human field application design engineers, can continue to use all of their present and past computer programming abilities, in even more effective ways.

Referring again to the weather forecasting environment of the invention, it can be further noted that the programmers of a large multi-BICPU microcomputer system, can develop many bimemory "parallel program logic structures", that are a function of a selected major or minor axis, of an ellipsoidal cell of influence.

(The exact shape of the ellipsoidal cell of influence, can be expressed as a function of one initial selected major or minor axis, by defining the length of the other two axes as ratios, of the initial selected axis. Ellipsoids of influence, and how they interact, in imaginary non-parallel thirteen plane space, are explained in detail, in the Pat. No. 4,650,424, issued Mar. 17, 1987, entitled "Educational Device and Method", and incorporated herein by reference).

The basic ellipsoidal cell of influence, can be enlarged or decreased in size, by changing the value of the selected axis. Further, the information and data in a first basic ellipsoidal cell, will be a function of the information and data, in those twelve ellipsoidal cells, of essentially equal size and shape, acting on and adjoining, the first basic ellipsoidal cell. Programmers can write programs, that automatically change the size of the initial selected axis of the ellipsoidal cell, and cause the modeling calculations to be on a cell that is much larger or much smaller in size, depending on the rate of change of the information and data, in the basic ellipsoidal cell, and those twelve similar adjoining cells.

The SDIO computer problem, air traffic control systems, and geological oil field systems will be able to effectively use the imaginary non-parallel thirteen plane space logic structures, patterned after the Educational Device and Method of Pat. No. 4,650,424 referred to above.

Thousands of "parallel programs", running in a large system of thousands of BICPU microcomputers for predicting long term weather, can logically change the "parallel program"—at computer speeds—to use a much higher density of ellipsoidal cells where the weather is changing rapidly, and a much lower density of ellipsoidal cells, where the weather is calm. The invention not only achieves adaptability, but also achieves enhanced employment of the BICPU microcomputers, and standard memory circuits connected to their "A" bus circuits, in the system.

In the SDIO environment, the ability to add BICPU microcomputers to the running system, without causing the program logic of other logical connected BICPU microcomputers to fail, will be of very great importance. Probably the greatest benefit of all, is the fact over 50% of the BICPU microcomputers, mechanically interconnected with BIC-BUS circuits, can be knocked out by enemy action, and the remaining undamaged BICPU microcomputers and BIC-BUS circuits, can continue to run all of their individual, independent programs, and many of their parallel programs. Programmers can write programs, that can logically determine which BICPU microcomputers, and which BIC-BUS circuits, are not damaged. Programs can be written that reconfigure these remaining, undamaged BICPU microcomputers, and continue to run many of their parallel programs effectively.

The fact that each BICPU microcomputer is a complete individual, independent operating computer system in itself, and can be logically disconnected from the sets of BIC-BUS circuits, that are connected to it's "B" and "C" bus circuits, is a key factor in this ability. No other known multiprocessor system, can withstand this kind of damage and continue to function at all.

In sum, the present invention realizes the objects of economy, flexibility and adaptability, high-volume and high-speed calculation, and enhanced use of the BICPU microcomputers and standard memory circuits connected to their "A" bus circuits, in a data processing system.

To achieve these objects, the invention uses a Bimemory Independent CPU microcomputer (BICPU microcomputer), that includes a bimemory switching circuit. Each BICPU microcomputer has its own CPU.

Each BICPU microcomputer has "A" bus circuits 520 of FIG. 19, comprising the "A" address circuits, the "A" data circuits, the "A" control circuits and the power circuits for the BICPU microcomputer. Each BICPU microcomputer has "B" bus circuits 522 of FIG. 19, comprising the "B" address circuits, the "B" data circuits, the "B" control circuits and the "B" BIC-BUS control circuits ("B" BIC-CTRB circuits 627). Each BICPU microcomputer has "C" bus circuits 524 in FIG. 19, comprising the "C" address circuits, the "C" data circuits, the "C" control circuits and the "C" BIC-BUS control circuits ("C" BIC-CTRB circuits 629).

Each BICPU microcomputer has a first switch means in each address circuit, data circuit and control circuit connecting the BICPU microcomputer to the "A" bus circuit (520 in FIG. 19) off-chip pins, connected to standard memory circuits, and in each address circuit, data circuit and control circuit (including each BIC-CTRB circuit 627 and 627 of FIG. 19), connecting the BICPU microcomputer, to the "B" and "C" bus circuit (522 and 524 of FIG. 19) off-chip pins, that can be connected to BIC-BUS circuits.

When power is removed from the BICPU microcomputer power circuits, a first switch means automatically, logically disconnects, and floats each connected circuit, and latches the first switch means in the logically disconnected position. Each logically disconnected and latched, floating, address circuit, data circuit and control circuit stays floating and logically disconnected and latched, when power is supplied to the BICPU microcomputer power circuits, until each first switch means is logically connected by signals from the BICPU microcomputer, after power is supplied to the BICPU microcomputer power circuits.

A first switch means remains under control of the BICPU microcomputer, after power is supplied to the power circuits, and the BICPU microcomputer can logically disconnect and float, or logically connect, each of these circuits connected to a first switch means. Notice there are no first switch means, connected in the BICPU microcomputer power circuits.

The logically disconnected, floating, latched portion, of the address circuits, data circuits and control circuits, connected to a first switch means, float with the information on the connected address circuits, data circuits and control circuits, in the connected sets of BIC-BUS circuits, and in the connected standard memory circuits, without changing the floating information, on these connected circuits.

Each BICPU microcomputer has standard CPU memory circuits, comprising address circuits, data circuits and control circuits, with one end of each circuit connected to the CPU of the BICPU microcomputer, and the other end of each circuit connected to it's common junction point 232 in FIG. 3, in the bimemory switching circuit 203. Each of these circuits contains a second switch means, similar in action to the first switch means, except the logically disconnected, floating, latched portion of the circuit, is connected to the CPU of the BICPU microcomputer. Each logically disconnected, floating, latched CPU address circuit, data circuit and control circuit, stays floating and disconnected and latched, when power is supplied to the BICPU microcomputer power circuits until each second switch means is logically connected, by signals from the BICPU microcomputer, after power is supplied to the BICPU microcomputer power circuits.

A second switch means remains under control of the BICPU microcomputer, after power is supplied to the power circuits, and the BICPU microcomputer can logically disconnect or logically connect, each of the circuits connected to a second switch means.

The logically disconnected, floating, latched portion of the address circuits, data circuits and control circuits, connected to a second switch means, float with the information on the mechanically connected CPU address circuits, data circuits and control circuits, without changing the floating information on these connected circuits.

Each circuit connected to a second switch means, is connected to it's common junction point in the bimemory switching circuits, and contains a third switch means (arrow mark 221 in FIG. 3), controlled by the CPU of the BICPU microcomputer, to logically disconnect and latch, to logically connect and latch, the circuit connected to the third switch means, and to operate the third switch means in a bimemory manner, when power is being supplied to the CPU power circuits. These circuits that are connected to a second and a third switch means, and to a common junction point in the bimemory switching circuits, are collectively referred to as the first internal bus circuits 218, of the bimemory switching circuits 203 of FIG. 3.

Each circuit connected to a first switch means in the "A" bus circuits, is connected to it's common junction point 232 in FIG. 3, in the bimemory switching circuits, and contains a fourth switch means 222 in FIG. 3, controlled by the CPU of the BICPU microcomputer, to logically disconnect and latch, and to logically connect and latch, the circuit connected to the fourth switch means, and to operate the fourth switch means in a bimemory manner, when power is being supplied to the CPU power circuits. These circuits that are connected to a first and a fourth switch means, and to a common junction point in the bimemory switching circuits, are collectively referred to as the second internal bus circuits 205, of the bimemory switching circuits 203 of FIG. 3.

Each separate common junction point in the bimemory switching circuits, is connected to a first switch means in the "B" bus circuits, and contains a fifth switch means 223 in FIG. 3, controlled by the CPU of the BICPU microcomputer, to logically disconnect and latch, and to logically connect and latch, the circuit connected to the fifth switch means, and to operate the fifth switch means, in a bimemory manner, when power is being supplied to the CPU power circuits. These circuits that are connected to a first and a fifth switch means, and to a common junction point in the bimemory switching circuits, are collectively referred to as the third internal bus circuits 229, of the bimemory switching circuits 203.

Each separate common junction point in the bimemory switching circuits, is connected to a first switch means in the "C" bus circuits, and contains a sixth switch means 225 in FIG. 3, controlled by the CPU of the BICPU microcomputer, to logically disconnect and latch, and to logically connect and latch, the circuit connected to the sixth switch means, and to operate the sixth switch means in a bimemory manner, when power is being supplied to the CPU power circuits. These circuits that are connected to a first and a sixth switch means, and to a common junction point in the bimemory switching circuits, are collectively referred to as the fourth internal bus circuits 231, of the bimemory switching circuits 203 of FIG. 3.

Each BICPU microcomputer has "B" and "C" bus circuits 522 and 524 of FIG. 19, comprising the "B" and "C" address circuits, data circuits and control circuits, that are connected to a first switch means on one end, and connected to the common junction point in the bimemory switching circuits on the other end, each with either fifth or sixth switch means, between a first switch means and the common junction points. The bimemory switching circuits 203 in FIG. 3, contain a seventh switch means 227 in FIG. 3, connected between the first switch means of each "B" and "C" address circuit, data circuit and control circuit. When the fifth and sixth switch means (223 and 225 in FIG. 4) are logically disconnected and latched, and the seventh switch means 227 in FIG. 4, is logically connected and latched, the "B" and "C" circuits (207 and 209 in FIG. 4), are interconnected, thus bypassing the fifth and sixth switch means (223 and 225 in FIG. 4) and the common junction point 232 in FIG. 3. The seventh switch means 227 in FIG. 4, can only be logically connected and latched, when the fifth and sixth switch means (223 and 225 in FIG. 4) are logically disconnected and latched. When the seventh switch means 27 in FIG. 3, is logically disconnected and latched, the "B" and "C" bus circuits (207 and 209 in FIG. 3), connected to the seventh means, are logically disconnected, and each circuit floats with the information on the logically disconnected circuit.

Each seventh switch means, is controlled by the CPU of the BICPU microcomputer, and the CPU has the ability to logically disconnect and latch, and to logically connect and latch, the circuit connected to a seventh switch means, when power is being supplied to the BICPU microcomputer power circuits. These circuits that are connected to a seventh switch means, and to a first switch means in the "B" and "C" bus circuits in the bimemory switching circuits, are collectively referred to as the fifth internal bus circuits 233 in FIG. 4, of the bimemory switching circuits.

Especially notice that the "B" and "C" sets of BIC-CTRB circuits (627 and 629 of FIG. 19), are not connected to a seventh switch means, or to a third, fourth, fifth or sixth switch means in the bimemory switching circuits. The "B" and "C" sets of BIC-CRTB circuits are connected to new elements of the CPU on one end, and are connected to a first switch means in the "B" and "C" bus circuits, on the other end. The operation of a first switch means has been described above, and a first switch means is under the control of the BICPU microcomputer, when power is being supplied to the BICPU microcomputer power circuits.

In the independent PRM-0 mode FIG. 3, the CPU 202 of a BICPU microcomputer 201 operates in exactly the same manner, and has the same inputs and outputs on it's "A" bus circuits, connected to the standard memory circuits 217, as the CPU of the microprocessor being implemented on the BICPU microcompter invention has. A first BICPU microcomputer assumes the independent PRM-0 mode, by logically disconnecting and latching it's fifth, sixth and seventh switch means (223, 225 and 227 in FIG. 3), and logically disconnecting and latching the first switch means, connected to the fifth and sixth switch means (213 and 215 in FIG. 2), and logically connecting and latching it's second switch means, it's third switch means (221 in FIG. 3), it's fourth switch means 222, and it's first switch means in it's "A" bus circuits (124 in FIG. 1). Thus, the CPU (202 in FIG. 3), of a first BICPU microcomputer (201 in FIG. 3), is directly logically connected to the standard memory circuits (217 in FIG. 3) or (120 in FIG. 1) connected to it's "A" bus circuits (205 in FIG. 3) or (124 in FIG. 1) or (520 in FIG. 19), in the same manner, with the same inputs and outputs, as these circuits are connected to the standard memory circuits, in the microprocessor being implemented on the BICPU microcomputer invention.

In the interconnecting PRM-1 and PRM-2 modes of FIG. 4, as interconnecting first BICPU microcomputer can accept a call from a second BICPU microcomputer, directly logically connected (including through one or more interconnecting BICPU microcomputers in PRM-1 and PRM-2 modes) to the sets of BIC-BUS circuits connected to the first BICPU microcomputer's "B" bus circuits (207 in FIG. 4) or (128 in FIG. 1) or (522 in FIG. 19). The interconnecting first BICPU microcomputer can then make a logical call to a third BICPU microcomputer, directly logically connected (including through one or more interconnecting BICPU microcomputers in PRM-1 and PRM-2 modes) to the sets of BIC-BUS circuits, connected to the interconnecting first BICPU microcomputer's "C" bus circuits (132 in FIG. 1 or 524 in FIG. 19), where the third BICPU microcomputer has a known bus number in its directly logically connected "B" or "C" register (604 or 610 in FIG. 19). If the third BICPU microcomputer agrees to allow the logical bimemory hookup with the second BICPU microcomputer, the interconnecting first BICPU microcomputer confirms that it's fifth and sixth switch means (112 and 114 of FIG. 1) are logically disconnected and latched and logically connects and latches it's seventh switch means (116 of FIG. 1) in it's bimemory switching circuits, and logically connects and latches it's first switch means connected to it's seventh switch means, thus directly logically interconnecting the two sets of BIC-BUS circuits, connected to it's "B" and "C" bus circuits. If the BICPU microcomputer in the BIM mode of the logical bimemory hookup in mechanically and logically connected to it's "B" bus circuits, the interconnecting first BICPU microcomputer assumes the interconnecting PRM-1 mode. If the BICPU microcomputer in the BIM mode of the logical bimemory hookup is mechanically and logically connected to it's "C" bus circuits, the interconnecting first BICPU microcomputer assumes the interconnecting PRM-2 mode.

The interconnecting first BICPU microcomputer can then logically connect and latch it's second switch means, it's third switch means (108 in FIG. 1), it's fourth switch means (110 in FIG. 1) and it's first switch means in it's "A" bus circuits (124 in FIG. 1 or 520 in FIG. 19), and thus continue to directly logically read and write to it's "A" bus circuits (124 in FIG. 1) and the standard memory circuits (120 in FIG. 1) connected thereto, while in the PRM-1 and PRM-2 bimemory modes.

The difference in the interconnecting PRM-1 mode, and the interconnecting PRM-2 mode of FIG. 4, is the PRM-1 mode directs the standard address information from the BICPU microcomputer in the BIM mode on the "B" circuits, to the BICPU microcomputer in the FLT mode on the "C" bus circuits, and the new Interrupt Logic Units 634 and 636, direct the new Inter Connect Switch 660 of FIG. 19, to latch the "BCR" and "BEN" circuits this way.

The PRM-2 mode directs the standard address information from the BICPU microcomputer in the BIM mode on the "C" circuits, to the BICPU microcomputer in the FLT mode on the "B" bus circuits, and the new Interrupt Logic Units 634 and 636, direct the new Inter Connect Switch 660 of FIG. 19, to latch the "BCR" and "BEN" circuits this way. The new ILUs 634 and 636 in FIG. 19 use this information to direct the Inter Connect Switch 660 in FIG. 19, to latch the "BCR" 640 and 650 circuits from the BIM mode to the FLT mode and "BEN" 644 and 656 circuits from the FLT mode to the BIM mode. The PRM-1 and PRM-2 modes point to the correct "B" or "C" bus location of the BIM mode. The ILUs also use this information to check that the logical bimemory "S" or "Y" hookup has been correctly programmed by the programmer.

In the interconnecting PRM-1 and PRM-2 modes of FIG. 4, a first BICPU microcomputer can accept a call from a third BICPU microcomputer directly logically connected (including through one or more interconnecting BICPU microcomputers in PRM-1 and PRM-2 modes) to the sets of BIC-BUS circuits connected to the first BICPU microcomputer's "C" bus circuits (132 in FIG. 1 or 524 in FIG. 19). The first BICPU microcommputer can then make a logical call to a second BICPU microcomputer directly logically connected (including through one or more BICPU microcomputers in interconnecting PRM-1 and PRM-2 modes) to the sets of BIC-BUS circuits connected to the first BICPU microcomputer's "B" bus circuits (128 in FIG. 1), where the second BICPU microcomputer has a known bus number in its directly logically connected "B" or "C" register (604 or 610 in FIG. 19). If the second BICPU microcomputer agrees to allow the logical bimemory hookup with the third BICPU microcomputer, the interconnecting first BICPU microcomputer goes through a similar routine as above.

The interconnecting first BICPU microcomputer can then logically connect and latch it's second switch means, it's third switch means, it's fourth switch means and it's first switch means in it's "A" bus circuits, and thus continue to directly logically read and write to it's "A" bus circuits and the standard memory circuits (120 in FIG. 1) connected thereto, while in the interconnecting PRM-1 and PRM-2 bimemory modes.

The PRM-0 mode and the interconnecting PRM-1 and PRM-2 modes are all independent modes, where the CPU of the first BICPU microcomputer directly logically reads and writes to it's "A" bus circuits and the standard memory circuits connected thereto, including ZERO Page, STACK and STANDARD VECTOR Page, in the same way, with the same inputs and outputs, that the microporcessor that is being implemented on the BICPU microcomputer invention does.

In the BIM-0 mode FIG. 5, and in a plurality of BIM-1 modes FIG. 6, a first BICPU microcomputer directly logically reads from or directly logically writes to the "A" bus circuits and the standard memory circuits connected thereto, of a consenting second BICPU microcomputer, by taking direct logical control of some or all of the "A" bus circuits of the consenting second BICPU microcomputer—which is directly logically connected (including through one or more interconnecting BICPU microcomputers in PRM-1 and PRM-2 modes) to the sets of BIC-BUS circuits connected to the first BICPU microcomputer's "B" bus circuits (128 in FIG. 1)—by the first BICPU microcomputer logically connecting and latching it's first switch means connected to it's fifth switch means in it's "B" bus circuits, and logically connecting and latching it's first switch means in it's "A" bus circuits, and logically connecting and latching it's second switch means, and logically connecting and latching it's third switch means (108 in FIG. 1), and logically disconnecting and latching it's sixth and seventh switch means (114 and 116 in FIG. 1), and logically disconnecting and latching it's first switch means connected to it's sixth switch means in it's bimemory switching circuits, and by appropriately logically connecting and logically disconnecting in a bimemory manner, it's fourth and fifth switch means (110 and 112 in FIG. 1) in it's bimemory switching circuits 203 in FIG. 5.

In the BIM-2 mode FIG. 7, and in a plurality of BIM-3 modes in FIG. 8, a first BICPU microcomputer directly logically reads from or directly logically writes to the "A" bus circuits of a consenting third BICPU microcomputer and the standard memory circuits connected thereto, by taking direct logical control of some or all of the "A" bus circuits of the consenting third BICPU microcomputer—which is directly logically connected (including through one or more interconnecting BICPU microcomputers in PRM-1 and PRM-2 modes) to the sets of BIC-BUS circuits connected to the first BICPU microcomputer's "C" bus circuits (132 of FIG. 1)—by the first BICPU microcomputer logically connecting and latching it's first switch means connected to it's sixth switch means in it's "C" bus circuits, and logically connecting and latching it's first switch means in it's "A" bus circuits, and logically connecting and latching it's second switch means, and logically connecting and latching it's third switch means (108 in FIG. 1), and logically disconnecting and latching it's fifth and seventh switch means (112 and 116 in FIG. 1), and logically disconnecting and latching it's first switch means connected to it's fifth switch means in it's bimemory switching circuits, and by appropriately logically connecting and logically disconnecting in a bimemory manner, it's fourth and sixth switch means (110 and 114 in FIG. 1) in it's bimemory switching circuits 203 in FIG. 7.

In the BIM-4 mode FIG. 9, and in a plurality of BIM-5 modes FIG. 10, a first BICPU microcomputer directly logically reads from or directly logically writes to the "A" bus circuits of a consenting second BICPU microcomputer and the standard memory circuits connected thereto, by taking direct logical control of some or all of the "A" bus circuits of the consenting second BICPU microcomputer—which is directly logically connected (including through one or more interconnecting BICPU microcomputers in PRM-1 and PRM-2 modes) to the sets of BIC-BUS circuits connected to the first BICPU microcomputer's "B" bus circuits (128 in FIG. 1)—and to directly logically read from or directly logically write to the "A" bus circuits of a consenting third BICPU microcomputer and the standard memory circuits connected thereto, by taking direct logical control of some or all of the "A" bus circuits of the consenting third BICPU microcomputer and the standard memory circuits connected thereto—which is directly logically connected (including through one or more interconnecting BICPU microcomputers in PRM-1 and PRM-2 modes) to the sets of BIC-BUS circuits connected to the first BICPU microcomputer's "C" bus circuits (132 in FIG. 1)—by the first BICPU microcomputer logically connecting and latching it's first switch means in it's "B" and "C" bus circuits, and logically connecting and latching it's second switch means, and logically connecting and latching it's third switch means (108 in FIG. 1), and logically disconnecting and latching it's fourth switch means (110 in FIG. 1), and logically disconnecting and latching it's first switch means connected to it's fourth switch means, and logically disconnecting and latching it's seventh switch means (116 in FIG. 1) in it's bimemory switching circuits, and by appropriately logically connecting and logically disconnecting in a bimemory manner, it's fifth and sixth switch means (112 and 114 in FIG. 1) in it's bimemory switching circuits 203 in FIG. 9.

In the BIM-6 mode FIG. 11, and in a plurality of BIM-7 modes FIG. 12, a first BICPU microcomputer directly logically reads from or directly logically writes to the "A" bus circuits of a consenting third BICPU microcomputer and the standard memory circuits connected thereto, by taking direct logical control of some or all of the "A" bus circuits of the consenting third BICPU microcomputer—which is directly logically connected (including through one or more interconnecting BICPU microcomputers in PRM-1 and PRM-2 modes) to the sets of BIC-BUS circuits connected to the first BICPU microcomputer's "C" bus circuits (132 in FIG. 1)—and to directly logically read from or directly logically write to the "A" bus circuits of a consenting second BICPU microcomputer and the standard memory circuits connected thereto—which is directly logically connected (including through one or more interconnecting BICPU microcomputers in PRM-1 and PRM-2 modes) to the sets of BIC-BUS circuits connected to the first BICPU microcomputer's "B" bus circuits (128 in FIG. 1) by the first BICPU microcomputer logically connecting and latching it's first switch means in it's "B" and "C" bus circuits, and logically connecting and latching it's second switch means, and logically connecting and latching it's third switch means (108 in FIG. 1), and logically disconnecting and latching it's fourth switch means (110 in FIG. 1), and logically disconnecting and latching it's first switch means connected to it's fourth switch means, and logically disconnecting and latching it's seventh switch means (116 in FIG. 1) in it's bimemory switching circuits, and by appropriately logically connecting and logically disconnecting in a bimemory manner, it's fifth and sixth switch means (112 and 114 in FIG. 1) in it's bimemory switching circuits 203 in FIG. 11.

Moreover, it is noted that in each of the different BIM modes above, the first BICPU microcomputer has logically disconnected and latched or logically connected and latched all except two unlatched sets of switch means that will be operated in a bimemory manner. Notice that one of these two unlatched sets of switch means is always a fifth or sixth switch means (112 or 114 in FIG. 1) set, and both unlatched sets can be fifth and sixth switch means sets. The first BICPU microcomputer then logically disconnects and latches the Address High Bus circuits (AB8, AB9, AB10, AB11, AB12, AB13, AB14 and AB15 in FIG. 19), not being connected to this logical bimemory hookup in the fifth or sixth switch means (112 or 114 in FIG. 1) set. These additional logically disconnected and latched fifth and sixth switch means in the Address High Bus circuits stay logically disconnected and latched throughout the balance of the logical bimemory hookup. The remaining unlatched switch means in the two sets of unlatched switch means can now be operated in a bimemory manner by the first BICPU microcomputer in the BIM mode.

After the first BICPU microcomputer in the BIM modes above has received the signal from the BICPU microcomputer in the FLT modes to proceed with the desired logical bimemory hookup, the first BICPU microcomputer, logically disconnects one set of unlatched switch means and logically connects the other set of unlatched switch means, in a bimemory manner so that at any one time, only one set of logically connected unlatched switch means are connected to the common junction point (232 in FIG. 3 and in FIG. 9) in the bimemory switching circuits.

For example, in a logical bimemory hookup, assume that the two sets of unlatched switch means involved are the fourth and fifth switch means (110 and 112 in FIG. 1) above where the first BICPU microcomputer is in the BIM-0 mode FIG. 5, and the consenting second BICPU microcomputer is in the FLT-0 FIG. 13, or FLT-2 mode FIG. 15. The CPU of the first BICPU microcomputer can now directly logicallly connect it's address circuits, data circuits and control circuits to it's own "A" bus circuits and the standard memory circuits (120 in FIG. 1) connected thereto, by logically disconnecting it's fifth switch means (112 in FIG. 1) and logically connecting it's fourth switch means (110 in FIG. 1), and can then directly logically read the contents of a memory address therein, referred to as "first word".

The first BICPU microcomputer can now directly logically connect it's address circuits, data circuits and control circuits to "A" bus circuits of the consenting second BICPU microcomputer and to the standard memory circuits connected thereto, by logically disconnecting it's fourth switch means (110 in FIG. 1) and logically connecting it's fifth switch means (112 in FIG. 1), and can then directly logically write the above "first word" to the "A" bus circuits of the consenting second BICPU microcomputer and into a predetermined memory address in the standard memory circuits connected thereto.

By toggling two sets of unlatched switch means, logically disconnecting the first set and logically connecting the second set, then logically disconnecting the second set and logically connecting the first set, the BICPU microcomputer invention can directly logically read and write in a bimemory manner in either of two directly logically connected "A" bus circuits and the standard memory circuits connected thereto.

This logical bimemory hookup can continue for as long as the first BICPU microcomputer takes to complete the logical bimemory hookup. The consenting second BICPU microcomputer, and any other interconnecting BICPU microcomputer in a PRM-1 or PRM-2 mode in the logical bimemory hookup can cause a logical interrupt of the logical bimemory hookup, by setting the "BEN" circuit FALSE interrupt. A Directed Hang Up (DHU) signal, (128 through 255 on the BIC-AD circuits), on any of the sets of BIC-BUS circuits directly involved in this logical bimemory hookup, also cause a logical interrupt of the logical bimemory hookup.

In the bimemory BIM-4, BIM-5, BIM-6 and BIM-7 modes, where both a consenting second BICPU microcomputer, directly logically connected through the "B" bus circuits, and a consenting third BICPU microcomputer, directly logically connected through the "C" bus circuits, have agreed to allow a logical bimemory hookup, either the consenting second BICPU microcomputer (240 in FIG. 9 or FIG. 10), or the consenting third BICPU microcomputer (242 in FIG. 11 or FIG. 12), have also agreed to permit the first BICPU microcomputer, ZERO Page, STACK and STANDARD VECTOR Page privileges.

So that the BICPU microcomputer invention can adapt to different data transfer requirements, provision is made for partly connecting the high address circuits in the fifth and sixth switch means as noted above, and in the third switch means in the FLT-1 and FLT-3 modes. Notice that the first BICPU microcomputer and the consenting second or consenting third BICPU microcomputer involved in a partly connected Address Bus High mode, both logically disconnect and latch the pattern of address circuits that are being restricted. This unique feature guarantees that the consenting second or consenting third BICPU microcomputer have complete control over what address circuits they have agreed to allow the first BICPU microcomputer to perform the logical bimemory hookup with. This logically disconnecting and latching of the high address circuits in the fifth and sixth switch means not being connected to the logical bimemory hookup, by the BICPU microcomputer in the FLT modes, guarantees maximum security in all applications in general and in the SDIO application in particular.

In each BIM mode, the first BICPU microcomputer logically disconnects and latches it's seventh switch means (116 in FIG. 1), assuring it's "B" and "C" bus circuits are logically disconnected, and logically connects and latches it's second switch means, and logically connects and latches it's third switch means (108 in FIG. 1), thus logically connecting the CPU standard memory circuits to their common junction point in the bimemory switching circuits, and logically disconnects and latches and logically connects and latches the bimemory switching circuits that are to be latched in the desired bimemory mode. Then, depending on which BIM mode has been assumed, the remaining two sets of unlatched switch means are operated in a bimemory manner, where never more than one of the two sets of unlatched switch means connected to the data, address and read/write lines is connected to the common junction point at any time.

When it's unlatched set of fourth switch means (110 in FIG. 1) is logically connected in a bimemory manner, the CPU of the first BICPU microcomputer is directly logically connected to it's own "A" bus circuits (124 in FIG. 1) and the standard memory circuits (120 in FIG. 1) connected thereto, in exactly the same manner as the microprocessor being implemented on the BICPU microcomputer invention is connected to it's standard memory circuits.

When it's unlatched set of fifth switch means (112 in FIG. 1) is logically connected in a bimemory manner, the CPU of the first BICPU microcomputer is directly logically connected to the "A" bus circuits and the standard memory circuits connected thereto, of the consenting second BICPU microcomputer logically connected to the sets of BIC-BUS circuits connected to the first BICPU microcomputer's "B" bus circuits, in exactly the same manner as the microprocessor being implemented on the BICPU microcomputer invention is connected to it's standard memory circuits.

When it's unlatched set of sixth switch means (114 in FIG. 1) is logically connected in a bimemory manner, the CPU of the first BICPU microcomputer is directly logically connected to the "A" bus circuits and the standard memory circuits connected thereto, of the consenting third BICPU microcomputer, logically connected to the sets of BIC-BUS circuits connected to the first BICPU microcomputer's "C" bus circuits, in exactly the same manner as the microprocessor being implemented on the BICPU microcomputer invention is connected to it's standard memory circuits.

In the FLT-0 mode FIG. 13, and in a plurality of FLT-1 modes FIG. 15, a first BICPU microcomputer becomes a consenting first BICPU microcomputer and allows a second BICPU microcomputer in a BIM mode, logically connected to the sets of BIC-BUS circuits logically connected to the first BICPU microcomputer's "B" bus circuits (128 in FIG. 1) to perform a logical bimemory hookup by being directly logically connected to, and directly logically controlling some or all, of the first BICPU microcomputer's "A" bus circuits (124 in FIG. 1) and the standard memory circuits (120 in FIG. 1) connected thereto. The consenting first BICPU microcomputer in a FLT mode can agree to allow the second BICPU microcomputer in the BIM mode to be directly logically connected to all or some of it's high "A" address circuits, in the logical bimemory hookup. The consenting first BICPU microcomputer, after deciding to allow the second BICPU microcomputer in the BIM mode to perform the desired logical bimemory hookup, goes into one of several floating modes, by confirming it's seventh switch means is logically disconnected and latched, it's first switch means in it's "B" bus circuits are logically connected and latched, it's first switch means in it's "A" bus circuits are logically connected and latched, and logically disconnects and latches any address circuits in it's fifth switch means that are not being allowed to be controlled by the second BICPU microcomputer, and logically connects and latches any address circuits in it's third switch means that are being controlled by the consenting first BICPU microcomputer, and logically disconnects and latches it's sixth switch means, and logically disconnects and latches it's first switch means connected to it's sixth switch means and logically connects and latches the remaining address circuits in it's fifth switch means, and logically connects and latches it's fourth switch means, and logically disconnects and latches the remaining address circuits being allowed to be controlled by the second BICPU microcomputer in it's third switch means, and logically disconnects and latches it's second switch means that are connected to a logically disconnected and latched third switch means, and places the correct starting address on the Address High Bus circuits it is controlling, and then signals the second BICPU microcomputer in the BIM mode, to proceed with the allowed logical bimemory hookup.

The second BICPU microcomputer proceeds with the allowed logical bimemory hookup for as long a period of time as is required. The period of time can be for a few seconds or can be indefinitely for as long as power is supplied to the power circuits of all of the BICPU microcomputers in the logical bimemory hookup. When the second BICPU microcomputer has completed the logical bimemory hookup, the second BICPU microcomputer signals the consenting first BICPU microcomputer of this fact and the consenting first BICPU microcomputer then withdraws the TRUE "BEN" signal allowing the logical bimemory hookup. The first BICPU microcomputer then performs a return from float (FLT) mode routine and continues on with the operations the first BICPU microcomputer was doing when the interrupt requesting the allowed logical bimemory hookup occurred.

The consenting first BICPU microcomputer has the right to cause the logical bimemory hookup to be terminated in a logical manner any time during the logical bimemory hookup by withdrawing the TRUE "BEN" signal that allowed the logical bimemory hookup to occur. When the TRUE "BEN" signal allowing the logical bimemory hookup is withdrawn, the second BICPU microcomputer receives an interrupt signal and proceeds to make a logical controlled interrupt and terminates the logical bimemory hookup in such a manner that the logic of the logical bimemory hookup does not fail. A similar type of interrupt procedure occurs if a Directed Hang Up (DHU) signal is received on the sets of BIC-BUS circuits involved in the logical bimemory hookup.

In the FLT-2 mode FIG. 16, and in a plurality of FLT-3 modes FIG. 17, a first BICPU microcomputer becomes a consenting first BICPU microcomputer and allows a third BICPU microcomputer in a BIM mode, logically connected to the sets of BIC-BUS circuits logically connected to the first BICPU microcomputer's "C" bus circuits (132 in FIG. 1 or 524 in FIG. 19) to perform a logical bimemory hookup by being directly logically connected to, and directly logically controlling, the first BICPU microcomputer's "A" bus circuits (124 in FIG. 1 or 520 in FIG. 19) and the standard memory circuits (120 in FIG. 1) connected thereto. The consenting first BICPU microcomputer in a FLT mode can agree to allow the third BICPU microcomputer in the BIM mode to be directly logically connected to all or some of it's high "A" address circuits, in the logical bimemory hookup. The consenting first BICPU microcomputer, after deciding to allow the third BICPU microcomputer in the BIM mode to perform the desired logical bimemory hookup, goes into one of several floating modes, by confirming it's seventh switch means (116 in FIG. 1) are logically disconnected and latched, it's first switch means on it's "C" bus circuits are logically connected and latched, it's first switch means on it's "A" bus circuits are logically connected and latched, and logically disconnects and latches any address circuits in it's sixth switch means (114 in FIG. 1) that are not being allowed to be used by the third BICPU microcomputer, and logically connects and latches any address circuits in it's third switch means that are being controlled by the consenting first BICPU microcomputer, and logically disconnects and latches it's switch means (112 in FIG. 1), and logically disconnects and latches it's first switch means connected to it's fifth switch means and logically connects and latches the remaining address circuits in it's sixth switch means, and logically connects and latches it's fourth switch means (110 in FIG. 1), and logically disconnects and latches the remaining address circuits being allowed to be controlled by the third BICPU microcomputer in it's third switch means (108 in FIG. 1) and logically disconnects and latches it's second switch means that are connected to a logically disconnected and latched third switch means, and places the correct starting address on the Address High Bus circuits it is controlling, and then signals the third BICPU microcomputer in the BIM mode, to proceed with the allowed logical bimemory hookup.

The third BICPU microcomputer proceeds with the allowed logical bimemory hookup for as long a period of time as is required. The period of time can be for a few seconds or can be indefinitely for as long as power is supplied to the power circuits of all of the BICPU microcomputers in the logical bimemory hookup. When the third BICPU microcomputer has completed the logical bimemory hookup, the third BICPU microcomputer signals the consenting first BICPU microcomputer of this fact and the consenting first BICPU microcomputer then withdraws the TRUE "BEN" signal allowing the logical bimemory hookup. The first BICPU microcomputer then performs a return from float (FLT) mode routine and continues on with the operations the first BICPU microcomputer was doing when the interrupt requesting the allowed logical bimemory hookup occurred.

The consenting first BICPU microcomputer has the right to cause the logical bimemory hookup to be terminated in a logical manner any time during the logical bimemory hookup by withdrawing the TRUE "BEN" signal that allowed the logical bimemory hookup to occur. When the TRUE "BEN" signal allowing the logical bimemory hookup is withdrawn, the third BICPU microcomputer in the BIM mode receives an interrupt signal and proceeds to make a logical controlled interrupt and terminates the logical bimemory hookup in such a manner that the logic of the logical bimemory hookup does not fail. A similar type of interrupt procedure occurs if a Directed Hang Up (DHU) signal is received on the sets of BIC-BUS circuits involved in the logical bimemory hookup.

Having noted that a first BICPU microcomputer assumes a particular PRM, BIM, or FLT mode, it is further observed that for a logical bimemory hookup to occur, the two or more BICPU microcomputers performing a logical bimemory hookup must be in modes that allow the logical bimemory hookup to proceed properly.

The PRM-0 mode is the default mode of a first BICPU microcomputer when the first BICPU microcomputer is reset or powered on. If a first BICPU microcomputer is in the PRM-0 mode, the first BICPU microcomputer is not in a logical bimemory hookup at that moment. Even when a first BICPU microcomputer has valid bus numbers stored in it's "B" and "C" registers (604 and 610 in FIG. 19) and therefore is effectively logically connected to the sets of BIC-BUS circuits connected to it's "B" and "C" bus circuits (522 and 524 in FIG. 19), when the first BICPU microcomputer is in the PRM-0 mode, it is not participating in a logical bimemory hookup at that particular moment in time.

In the PRM-0 mode, a first BICPU microcomputer is connected to it's "A" bus circuits and the standard memory circuits connected thereto, in the same manner as the microprocessor that is being implemented on the BICPU microcomputer invention is connected to it's standard memory circuits.

When an interconnecting first BICPU microcomputer is in a PRM-1 or PRM-2 mode, it is participating in a logical bimemory hookup even though it's CPU is connected to it's "A" bus circuits and the standard memory circuits connected thereto, in the same manner as the microprocessor that is being implemented on the BICPU microcomputer invention is connected to it's standard memory circuits.

In the PRM-1 and PRM-2 modes, an interconnecting first BICPU microcomputer has made a direct logical interconnection of it's "B" and "C" address circuits, data circuits and control circuits, (but not it's "B" and "C" BIC-CTRB circuits 627 and 629 in FIG. 19), by using it's "B" and "C" BIC-CTRB circuits and it's fifth, sixth and seventh switch means (112, 114 and 116 in FIG. 1) in it's bimemory switching circuits and it's first switch means connected to it's fifth and sixth switch means. In the PRM-1 and PRM-2 modes, an interconnecting first BICPU microcomputer is not allowing any of it's "A" bus circuits and it's standard memory circuits (120 in FIG. 1) connected thereto, to be directly logically connected to and directly logically controlled by any other BICPU microcomputer. Therefore the interconnecting BICPU microcomputers in the PRM-1 and PRM-2 modes of FIG. 4 are not consenting BICPU microcomputers in a FLT mode. In the PRM-1 and PRM-2 modes, an interconnecting first BICPU microcomputer has accepted a call from a second or third BICPU microcomputer, directly logically connected to it's "B" or "C" bus circuits, and has assisted this calling BICPU microcomputer to establish a logical bimemory hookup with a consenting third or consenting second BICPU microcomputer by directly logically interconnecting it's standard memory circuits in it's "B"and "C" bus circuits referred to above. An interconnecting first BICPU microcomputer can refuse to accept the initial call from the second or third BICPU microcomputer. An interconnecting first BICPU microcomputer can accept the call from the second or third BICPU microcomputer and then refuse to assist in calling the third or second BICPU microcomputer. After assuming the requested PRM-1 or PRM-2 mode, or refusing the request, an interconnecting first BICPU microcomputer returns from interrupt and proceeds to perform the operations that the interconnecting first BICPU microcomputer was working on when interrupted by the initial call.

Any first BICPU microcomputer with both of it's "B" and "C" bus circuits (128 and 132 in FIG. 1 or 522 and 524 in FIG. 19) logically connected to sets of BIC-BUS circuits with valid bus numbers stored in it's "B" and "C" registers (604 and 610 in FIG. 19), can optionally assume an interconnecting PRM-1 or PRM-2 mode as above. A first BICPU microcomputer that agrees to interconnect two sets of BIC-BUS circuits by assuming the PRM-1 or PRM-2 mode becomes an interconnecting BICPU microcomputer to that logical bimemory hookup.

In any logical bimemory hookup, there can be as many such interconnecting BICPU microcomputers as needed in the PRM-1 and PRM-2 modes to directly logically interconnect a first BICPU microcomputer in a BIM mode and a consenting second BICPU microcomputer in a FLT mode and possibly a consenting third BICPU microcomputer in a FLT mode.

In a logical bimemory "S" hookup, there is always a first BICPU microcomputer in a BIM mode and always one consenting second or third BICPU microcomputer in a FLT mode. In a logical bimemory "Y" hookup, there is always a first BICPU microcomputer in a BIM mode, and there is always a consenting second BICPU microcomputer and a consenting third BICPU microcomputer in FLT modes. Between the first BICPU microcomputer in a BIM mode, and the consenting second or third BICPU microcomputers in FLT modes, there can be any number of other interconnecting BICPU microcomputers in the PRM-1 and PRM-2 modes.

The new Interrupt Logic Units (ILUs) (634 and 636 in FIG. 19) stop any bimemory hookup, where any of the BICPU microcomputers are in logically incompatible modes.

This ability of the ILUs to detection this type of programming error is an object of the invention. The ILUs, on detecting this logical incompatible bimemory mode combination, stops the logical bimemory hookup, sets the error bit involved, and logically hangs up the set of BIC-BUS circuits involved, and interrupts it's BICPU microcomputer. This error detection logic and action of the ILUs, prevent this type of programming error from further corrupting the program logic of this BICPU, and prevents this BICPU microcomputer's programming error from corrupting the program logic of other running parallel programs.

Only logical bimemory "S" hookups and logical bimemory "Y" hookups, are used to logically interconnect the thousands of connected BICPU microcomputers. There are billions of different ways that thousands of mechanically interconnected BICPU microcomputers can be directly logically connected to and directly logically read and write to "A" bus circuits and the standard memory circuits connected thereto, of other consenting BICPU microcomputers, allowing real time logic decisions changing the logic of a particular running parallel program, to be made at computer speeds.

This fantastic real time ability to change the logical interconnections of BICPU microcomputers in certain parallel program, based on the results of the calculations in the parallel program, will enable the SDIO computer problem to be solved in a cost effective manner. Large parts of this same SDIO computer system can be used to solve the World Climate prediction problem. Individual corporations can allow their BICPU microcomputer systems to be used by the government in times of critical needs. Highly parallel computer programs, written for one large BICPU microcomputer system, can be transferred to completely different BICPU microcomputer systems, with proper changes of just those BIC-BUS circuits directly involved in the parallel program.

Of particular significance, in a BICPU microcomputer system of one BICPU microcomputer or several thousand BICPU microcomputers, the BICPU microcomputer is the only logic circuit needed on the CPU side of the "A" bus circuits connected to standard memory circuits. This is an object of the BICPU microcomputer invention. Only standard BIC-BUS circuits, with single conductors, are used to mechanically interconnect the "B" or "C" bus circuits of two different BICPU microcomputers on the CPU side of the "A" bus circuits.

Arbitration of all conflicts among the individual, independent BICPU microcomputers concerning the use of the connected standard BIC-BUS circuits are resolved within the logic circuits of the individual BICPU microcomputers. No external arbitration logic circuits are needed in BIC-BUS circuits.

With the BICPU microcomputer invention, programmers can create hundreds of levels of hierarchy in a large multi-BICPU microcomputer system containing thousands of individual BICPU microcomputers, using only standard BIC-BUS circuits connected between the "B" or "C" bus circuits of a first BICPU microcomputer and the "B" or "C" bus circuits of a second BICPU microcomputer. This is an object of the BICPU microcomputer invention.

A first BICPU microcomputer connected to sets of BIC-BUS circuits can be powered on or reset or powered off without causing a logic failure of programs running in other BICPU microcomputers mechanically and logically connected to the same sets of BIC-BUS circuits. This is an object of the BICPU microcomputer invention.

A first BICPU microcomputer, mechanically and logically connected to sets of BIC-BUS circuits can be mechanically disconnected and removed from the remaining sets of BIC-BUS circuits without causing a logic failure of programs running in other BICPU microcomputers mechanically and logically connected to the same sets of BIC-BUS circuits. This is an object of the BICPU microcomputer invention.

A first BICPU microcomputer can be mechanically and logically connected to existing sets of BIC-BUS circuits presently mechanically and logically connected to other BICPU microcomputers in a running system, without causing a logic failure of programs running in other BICPU microcomputers. This is an object of the BICPU microcomputer invention.

An additional object of the invention is to retrofit the BICPU microcomputer invention, including "B" and "C" registers, Status Registers, Interrupt Logic Units, Inter Connect Switch, Bimemory Switching Circuits, First Switch means, Second Switch means, Third Switch means, Fourth Switch means, Fifth Switch means, Sixth Switch means, Seventh Switch means, and expanded bimemory microinstructions in the Instruction Decode unit, onto existing successful computers or microcomputers which have standard memory circuits and a plurality of available expansion microcodes that can be implemented, so that in the PRM-0 mode, most of the existing computer's software can be run without changing any of the existing software microcodes.

The new Status Registers are used to store the microcodes needed to complete this BICPU microcomputer link of a logical bimemory "S" hookup or logical bimemory "Y" hookup—the microcode for the mode of a first BICPU microcomputer being stored in one particular Status Register and the assigned bus number and mode of a linking second or third BICPU microcomputer with which a first BICPU microcomputer is to form a logical bimemory "S" or logical bimemory "Y" hookup with, being entered into other Status Registers of the first BICPU microcomputer. Other Status Registers relate to patterns of full or partly connected Address High Bus circuits for the particular logical bimemory hookup to be preformed between two BICPU microcomputers. Detected BIC-BUS "busy" conditions, "Not Active" BICPU are set in the Status Registers, as well as the "Two or More" BIC-BUS error condition, and bimemory programming error conditions of the first BICPU microcomputer.

Of particular significance, the programmers of a multi-microcomputer system, using BICPU microcomputers, can enter each individual, independent BICPU microcomputer into a logically disconnected, open, independent, bimemory operating PRM-0 mode by directing the individual, independent BICPU microcomputers to read new microinstructions storing ZERO in it's "B" and "C" registers (604 and 610 in FIG. 19). By logically disconnecting all BICPU microcomputers from the connected sets of BIC-BUS circuits, the CPUs of the BICPU microcomputers in the system can not perform any logical bimemory "S" hookup or logical bimemory "Y" hookup between each others "A" bus circuits and the standard memory circuits connected thereto. The BICPU microcomputers can perform all of their stand alone programs and can use all present programming techniques to interconnect their standard memory circuits and use IEEE type intercommunication systems and their CRT displays, key boards, disk storage devices and their telephone modems and the like.

As programs in these BICPU microcomputers, store verified valid bus numbers (not ZEROs, and not 128 through 255 using 8 bit BIC-AD circuits 600 and 652 in FIG. 19) in their individual "B" and "C" registers 604 and 610 in FIG. 19, the individual ILUs 634 and 636 in FIG. 19, are logically connected to the sets of BIC-BUS circuits connected to the "B" and "C" bus circuits, 522 and 524 in FIG. 19. After new bimemory microcode is read by the Instruction Decode unit of the BICPU microcomputers, storing verified valid bus numbers in their "B" and "C" registers 604 and 610 in FIG. 19, the BICPU microcomputers are now logically connected to BIC-BUS circuits in the PRM-0 mode. From this logically connected PRM-0 mode, any bimemory mode can be assumed by the individual, independent BICPU microcomputer, and logical bimemory "S" hookups and logical bimemory "Y" hookups can be made. A wide range of different parallel logical interconnections can be created at computer speeds between agreeing BICPU microcomputers, using these two types of logical bimemory hookups. Accordingly, it is noted that the interconnection of the CPUs of the BICPU microcomputers in a large multi-BICPU microcomputer system is logically, dynamically altered, based on the human thinking of the programmers writing the microcode for logical bimemory "S" hookups and logical bimemory "Y" hookups, interconnecting the "A" bus circuits and the standard memory circuits connected thereto, of the various CPUs of the BICPU microcomputers.

Similarly, the BIC-BUS address number stored in the "B" or "C" register (604 or 610 in FIG. 19) identifying a first BICPU microcomputer, connected to a set of BIC-BUS circuits, can be dynamically altered, without causing a logic failure of programs running in other BICPU microcomputers logically connected to the set of BIC-BUS circuits involved. Hence, a first BICPU microcomputer can be logically disconnected from the sets of BIC-BUS circuits connected to it's "B" and "C" bus circuits and, in effect, logically disconnected from the running system and the first BICPU microcomputer can store a new BIC-BUS address number in "B" and "C" registers (604 and 610 in FIG. 19) without causing a logic failure of programs running in other BICPU microcomputers logically connected to the sets of BIC-BUS circuits involved.

A first BICPU microcomputer with standard memory circuits connected to it's "A" bus circuits, can be mechanically and logically connected to a running system, without causing a logic failure of parallel programs running in other BICPU microcomputers mechanically and logically connected to the same sets of BIC-BUS circuits the first BICPU microcomputer is being mechanically and logically connected to. This is an object of the BICPU microcomputer invention.

The field application system designer determines the first target set of BIC-BUS circuits that the "B" bus circuits of the additional first BICPU microcomputer is to be connected to. A running second BICPU microcomputer, logically connected to the first target set of BIC-BUS circuits, is interrupted in a logical manner. The field application system designer then instructs the second BICPU microcomputer to take logical control of the first target set of BIC-BUS circuits. If both "BCR" and "BEN" circuits in the first target set of BIC-BUS circuits are FALSE, the field application system designer instructs the second BICPU microcomputer to drive the "BCR" circuit TRUE, and wait. The field application system designer now knows no logical bimemory hookup can be conducted on the first target set of BIC-BUS circuits until the second BICPU microcomputer drives the "BCR" circuit FALSE. The field application system designer mechanically connects the "B" bus circuits of the first BICPU microcomputer to the first target set of BIC-BUS circuits without causing a logic failure of parallel programs running in the second BICPU microcomputer or the other BICPU microcomputers mechanically and logically connected to the first target set of BIC-BUS circuits. After completing the mechanical connection of the "B" bus circuits of the first BICPU microcomputer to the first target set of BIC-BUS circuits, the field application system designer instructs the second BICPU microcomputer to drive the "BCR" circuit FALSE, in the first target set of BIC-BUS circuits, and to proceed with it's operation when it was logically interrupted to help mechanically connect the "B" bus circuits of the first BICPU microcomputer to the first target set of BIC-BUS circuits.

If the "BCR" circuit of the first target set of BIC-BUS circuits above was TRUE, the field application system designer gets a BIC-BUS "busy" signal and knows a logical bimemory hookup is being conducted on the first target set of BIC-BUS circuits, and instructs the second BICPU microcomputer to drive the "BEN" circuit FALSE in the first target set of BIC-BUS circuits. A FALSE signal on the "BEN" circuit causes the Interrupt Logic Units (ILUs) (634 and 636 in FIG. 19) involved in the logical bimemory hookup to signal their Inter Connect Switch (660 in FIG. 19) to unlatch and the ILUs then drive the opposite latched "BEN" circuit FALSE, in a domino fashion back through all of the interconnected sets of BIC-BUS circuits to the BICPU microcomputer in the BIM mode in the logical bimemory hookup.

When the BICPU microcomputer in the BIM mode of the logical bimemory hookup senses the "BEN" circuit FALSE, the BICPU microcomputer in the BIM mode interprets the "BEN" circuit FALSE signal as a signal that the BICPU microcomputer in the FLT mode has withdrawn the consent of the logical bimemory hookup, and the BICPU microcomputer in the BIM mode, makes a logical interrupt of it's logical bimemory hookup and then drives the "BCR" circuit FALSE in the logically connected set of BIC-BUS circuits. This "BCR" circuit FALSE signal causes the ILUs involved in this logical bimemory hookup to unlatch in a domino fashion back through all of the interconnected sets of BIC-BUS circuits to the BICPU microcomputer in the FLT mode in the logical bimemory hookup. The BICPU microcomputer in the FLT mode interprets the "BCR" circuit FALSE signal as a signal that the BICPU microcomputer in the BIM mode has finished with the logical bimemory hookup, and sets the "BEN" circuit FALSE and proceeds to return from FLT and continues on with it's operation when it was initially interrupted to help in the logical bimemory hookup. When the BICPU microcomputer in the FLT mode sets it's "BEN" circuit FALSE, any additional ILUs involved in the logical bimemory hookup signal their Inter Connect Switch to unlatch and the ILUs drive the opposite latched "BEN" circuit FALSE, in a domino fashion back through all of the interconnected sets of BIC-BUS circuits to the set of BIC-BUS circuits that the second BICPU microcomputer that set the "BEN" circuit FALSE is connected to. This completes the Hang Up of the logical bimemory hookup in a logical manner that does not cause a failure of the logic of any running parallel programs on the various sets of BIC-BUS circuits involved.

When the second BICPU microcomputer senses that both the "BEN" circuit is FALSE and the "BCR" circuit is FALSE, it knows the first target set of BIC-BUS circuits are now free, and drives the "BCR" circuit TRUE and takes control of the first target set of BIC-BUS circuits, and waits. The field application system designer now mechanically connects the "B" bus circuits of the first BICPU microcomputer to the first target set of BIC-BUS circuits as described above. The first target set of BIC-BUS circuits are returned to their original state and the BICPU microcomputer that made the logical interrupt in it's logical bimemory hookup can proceed to make another bimemory hookup and proceed with it's program in a logical manner, where it was interrupted for the addition of another BICPU microcomputer.

The field application system designer then determines the second target set of BIC-BUS circuits, the "C" bus circuits of the additional first BICPU microcomputer is to be mechanically connected to. A running third BICPU microcomputer, logically connected to the second target set of BIC-BUS circuits is interrupted in a logical manner and the field application system designer then uses the third BICPU microcomputer to help mechanically connect the "C" bus circuits of the first BICPU microcomputer to the second target set of BIC-BUS circuits in the same fashion as the "B" bus circuits were mechanically connected above.

A first BICPU microcomputer with standard memory circuits connected to it's "A" bus circuits, can be mechanically and logically disconnected from a running system, without causing a logic failure of parallel programs running in other BICPU microcomputers mechanically and logically connected to the same sets of BIC-BUS circuits that the individual first BICPU microcomputer is presently mechanically and logically connected to. This is an object of the BICPU microcomputer invention.

The field application system designer chooses a second BICPU microcomputer on the first target set of BIC-BUS circuits logically connected to the "B" bus circuits of the individual first BICPU microcomputer to be removed and interrupts the second BICPU microcomputer in a logical manner. The field application system designer then instructs the second BICPU microcomputer to take control of the first target set of BIC-BUS circuits as described above and wait. The field application system designer then mechanically disconnects the first BICPU microcomputer's "B" bus cirucits from the first target set of BIC-BUS circuits, and then instructs the second BICPU microcomputer to continue on the operation it was on when initially interrupted.

The field application system designer chooses a third BICPU microcomputer on the second target set of BIC-BUS circuits logically connected to the "C" bus circuits of the individual first BICPU microcomputer to be removed and interrupts the third BICPU microcomputer in a logical manner. The field application system designer then instructs the third BICPU microcomputer to take control of the second target set of BIC-BUS circuits as described above and wait. The field application system designer then mechanically disconnects the first BICPU microcomputer's "C" bus circuits from the second target set of BIC-BUS circuits, and then instructs the third BICPU microcomputer to continue on the operation it was on when initially interrupted.

Defective and damaged BICPU microcomputers in a large system of BICPU microcomputers are removed and replaced in a manner similar to that described above. The logic of the parallel programs running in the system is not further corrupted by the removal and replacement of the defective and damaged BICPU microcomputers.

It is noted that the third switch means 108, the fifth switch means 112 and the sixth switch means 114 are partly logically disconnected and latched, partly logically connected and latched and partly logically connected and unlatched in the partly connected Address Bus High circuits in BIM and FLT modes. In the partly logically disconnected and latched state, a first BICPU microcomputer is directly logically connected to some of the high address circuits, and directly logically connected to all of the low address circuits, and directly logically connected to all of the data circuits, and directly logically connected to all of the control circuits in the "A" bus circuits of the BICPU microcomputer involved. Thus the consenting second or third BICPU microcomputer in a FLT mode is directly logically connecting the first BICPU microcomputer to some of the consenting second or third BICPU microcomputer's "A" bus circuits.

For example, a consenting second or third BICPU microcomputer in a FLT mode, can directly logically connect a first BICPU microcomputer in a BIM mode to all of their standard address bus low circuits, standard data circuits and standard control circuits, retaining the standard address bus high circuits to be directly logically connected to and controlled by the consenting second or third BICPU microcomputer in a FLT mode. Thus the first BICPU microcomputer is directly logically connected to and directly logically controls what is written to a page of the "A" bus circuits and the standard memory circuits connected thereto, and the second or third BICPU microcomputers are directly logically connected to the address bus high circuits in their "A" bus circuits and directly logically control the location of the "page" the first BICPU microcomputer is directly logically connected to.

This effect is achieved where each BICPU microcomputer has high address bus circuits for determining a page in standard memory circuits and low address bus circuits for specifying a location in a page in standard memory circuits and the consenting second or third BICPU microcomputer directly logically connects only the low address bus circuits, the data bus circuits and the control circuits to a first BICPU microcomputer in a partial connection of it's "A" bus circuits and the standard memory circuits connected thereto, for example. The consenting second or third BICPU microcomputer controls the exact page (or pages) by being directly logically connected to and directly logically controlling the high address bus circuits in it's "A" bus circuits not being logically connected to it's "B" or "C" bus circuits.

Where a plurality of BICPU microcomters, as in FIG. 1, are interconnected into a system, it is readily observed that the logical disconnecting and logical connecting of the first switch means, the second switch means, the third switch means, the fourth switch means, the fifth switch means, the sixth switch means and the seventh switch means of each BICPU microcomputer from one mode to another mode—forming logical bimemory "S" hookups and logical bimemory "Y" hookups, and hanging up logical bimemory "S" hookups and logical bimemory "Y" hookups—affects the overall logical interconnection between the mechanically interconnected BICPU microcomputers of the system. Moreover, as noted below in the following discussion of the individual modes, the modes of BICPU microcomputers in a system are interrelated in a logical bimemory "S" hookup and in a logical bimemory "Y" hookup. The ability of the programmer, to form either a logical bimemory "S" hookup or a logical bimemory "Y" hookup, can create great flexibility and expansive communication within the system.

II. BICPU MICROCOMPUTER OPERATIONAL MODES

In FIGS. 2 through 17, a bimemory microcomputer apparatus 201 (such as BICPU microcomputer 101 of FIG. 1) is shown symbolically in various bimemory modes.

In FIG. 2, the critically important Deactivated mode, according to the invention, is shown. This logically "disconnected and latched, floating, power off" mode is one of the major objects of the BICPU microcomputer invention. The first switch means in the "A" bus circuits 205 are in a logically disconnected and latched, "floating" power off deactivated mode as indicated by the bracket like symbol 211. The first switch means in the "B" bus circuits 207 are in a logically disconnected and latched, "floating" power off deactivated mode as indicated by the bracket like symbol 213. The first switch means in the "C" bus circuits 209 are in a logically disconnected and latched, "floating" power off deactivated mode as indicated by the bracket like symbol 215. The second switch means in the first internal bus circuits (CPU bus circuits) 218 are in a logically disconnected and latched, "floating" power off deactivated mode as indicated by the bracket like symbol. The third, fourth, fifth, sixth and seventh switch means in the bimemory switching circuits 203 are logically disconnected and latched in the deactivated mode as indicated by the missing four small circle symbols in the bimemory switching unit 203 and the missing arrow symbol to the CPU 202.

In FIG. 3, the PRM-0 mode is shown. The PRM-0 mode is the reset mode and the power-on default mode. The PRM-0 mode can be thought of as the transition mode between the logically disconnected, open, independent mode of the BICPU microcomputer, and the logically connected bimemory mode of the BICPU microcomputer. A stand alone one unit application of one BICPU microcomputer that is not currently connected to sets of BIC-BUS circuits, is both mechanically and logically in this PRM-0 disconnected, open, independent mode. A first BICPU microcomputer connected to one or two sets of BIC-BUS circuits, with ZEROs in it's "B" and "C" registers 604 and 610 in FIG. 19, is also in this logically disconnected, open, independent PRM-0 mode. However, all that this first BICPU microcomputer has to do, to be logically connected to the sets of BIC-BUS circuits mechanically connected to it's "B" and "C" bus circuits, is to have valid bus numbers (not ZERO, and not 128 through 255 with 8 bit BIC-AD circuits 600 and 652 in FIG. 19) stored in it's "B" and "C" registers 604 and 610 in FIG. 19. This simple action, logically connects this first BICPU microcomputer, at computer speeds, to the mechanically connected sets of BIC-BUS circuits, connected to it's "B" and "C" bus circuits 522 and 524 of FIG. 19.

Returning to FIG. 3, the first and fourth switch means in the "A" bus circuits 205 are logically connected and latched as indicated by the open circle symbol 222. The first switch means connected to the fifth switch means in the "B" bus circuits 207 are in a logically disconnected and latched, "floating" deactivated mode as indicated by the bracket like symbol. The first switch means connected to the sixth switch means in the "C" bus circuits 209 are in a logically disconnected and latched, "floating" deactivated mode as indicated by the bracket like symbol. The second switch means and the third switch means in the first internal bus circuits (CPU bus circuits) 218 are logically connected and latched as indicated by the arrow symbol 221. The fifth, sixth and seventh switch means in the bimemory switching circuits 203 are logically disconnected and latched as indicated by the three small circle symbols 223, 225 and 227 with "X"s in them. The "A" bus circuits and the standard memory circuits 217 connected thereto, are logically connected and ready to take commands from the CPU 202 as indicated by the arrow symbol 219. In this PRM-0 mode, the CPU 202 is logically connected to the "A" bus circuits and the standard memory circuits 217 connected thereto, in the same way the CPU being implemented on the BICPU microcomputer invention is logically connected to it's standard memory circuits.

In FIG. 4, the interconnecting PRM-1 and PRM-2 modes are shown. The PRM-1 and PRM-2 modes make a logical connection between two different sets of BIC-BUS circuits in a unique way where the standard memory circuits of the "B" bus circuits and the "C" bus circuits, comprising the address circuits, data circuits and control circuits are directly logically connected together, but the BIC-BUS control circuits (BIC-CTRB circuits) 627 and 629 of FIG. 19, of the two different sets of BIC-BUS circuits mechanically connected to the "B" and "C" bus circuits are not directly logically connected together.

The PRM-1 mode is used where the BICPU microcomputer in the BIM mode is logically connected on the "B" bus circuits. The PRM-2 mode is used where the BICPU microcomputer in the BIM mode is logically connected on the "C" bus circuits.

(In FIG. 19, the "BCR" circuits 640 and 650, and the "BEN" circuits 644 and 656 are latched in the Inter Connect Switch 660 by the Interrupt Logic Units 634 and 636. The "BCR" circuit is latched from the BIM mode to the FLT mode, and the "BEN" circuit is latched from the FLT mode to the BIM mode in the logical bimemory hookup when there is one or more interconnecting BICPU microcomputers in the PRM-1 and PRM-2 modes in the logical bimemory hookup. The "BCR" circuits, the "BRQ" circuits and the "BEN" circuits of two different sets of BIC-BUS circuits are never directly mechanically or logically connected. The address circuits (BIC-AD circuits) 600 and 652 of two different sets of BIC-CTRB circuits 627 and 629 are never mechanically or logically connected. This is an object of the invention.

Continuing in FIG. 4, the first and fourth switch means in the "A" bus circuits 205 are logically connected and latched as indicated by the open circle symbol 222. The first switch means in the "B" bus circuits 207 are logically connected and latched as indicated by the arrow symbol 235. The first switch means in the "C" bus circuits 209 are logically connected and latched as indicated by the arrow symbol 239. The second switch means and the third switch means in the first internal bus circuits (CPU bus circuits) are logically connected and latched as indicated by the arrow symbol 221. The fifth and sixth switch means in the bimemory switching circuits 203 are logically disconnected and latched as indicated by the two small circle symbols 223 and 225 with "X"s in them. The seventh switch means in the bimemory switching circuits 203 are logically connected and latched as indicated by the small open circle 227. A second BICPU microcomputer is logically connected on the set of BIC-BUS circuits connected to the "B" bus circuits as indicated by the arrow symbol 237. A third BICPU microcomputer is logically connected on the set of BIC-BUS circuits connected to the "C" bus circuits as indicated by the arrow symbol 241. The "A" bus circuits and the standard memory circuits 217 connected thereto, are logically connected and ready to take commands from the CPU 202 as indicated by the arrow symbol 219. In these interconnecting PRM-1 and PRM-2 modes, the CPU 202 is directly logically connected to the "A" bus circuits 205 and the standard memory circuits 217 connected thereto, in the same way the CPU being implemented on the BICPU microcomputer invention is directly logically connected to it's standard memory circuits.

In FIG. 5, the BIM-0 mode is shown. The BIM-0 mode directly logically connects a first BICPU microcomputer to the "A" bus circuits and the standard memory circuits connected thereto, of a consenting second BICPU microcomputer directly logically connected to the set of BIC-BUS circuits connected to the "B" bus circuits of the first BICPU microcomputer. The first switch means in the "B" bus circuits 207 are logically connected and latched as indicated by the arrow symbol 235. The first switch means connected to sixth switch means in the "C" bus circuits 209 are logically disconnected and latched and floating as indicated by the bracket like symbol 215. The second switch means and the third switch means in the first internal bus circuits (CPU bus circuits) are logically connected and latched as indicated by the arrow symbol 221. The sixth and seventh switch means in the bimemory switching circuits 203 are logically disconnected and latched as indicated by the two small circle symbols 225 and 227 with "X"s in them. The first switch means in the "A" bus circuits are logically connected and latched, and fourth switch means in the "A" bus circuits 205 are logically connected and unlatched and the fifth switch means in the bimemory switching circuits 203 are logically connected and unlatched and ready to be operated in a bimemory manner, as indicated by the two small open circle symbols 222 and 223. A consenting second BICPU microcomputer is logical connected on the set of BIC-BUS circuits connected to the "B" bus circuits as indicated by the arrow symbol 237. The "A" bus circuits 205 and the standard memory circuits 217 connected thereto, are logically connected and ready to take commands from the CPU 202 as indicated by the arrow symbol 219. The CPU 202 is in a bimemory mode as both small circle symbols 222 and 223 are open, indicating that fourth and fifth switch means will be logically disconnected and logically connected in a bimemory fashion where at any one instant in time, only one set of the switch means connected to the data, address and read/write lines will be logically connected. In this BIM-0 mode, when the fifth switch means 223 are logically disconnected, and the fouth switch means 222 are logically connected, the CPU 202 is logically connected to the "A" bus circuits and the standard memory circuits 217 connected thereto, in the same way the CPU being implemented on the BICPU microcomputer invention is logically connected to it's standard memory circuits. In this BIM-0 mode, when the fourth switch means 222 are logically disconnected, and the fifth switch means 223 are logically connected, the CPU 202 is directly logically connected to the "A" bus circuits 205 and the standard memory circuits connected thereto, of the consenting second BICPU microcomputer at arrow symbol 237 in the same way the CPU being implemented on the BICPU microcomputer invention is connected to it's standard memory circuits.

In FIG. 6, the BIM-1 mode is shown. The BIM-1 mode directly logically connects a first BICPU microcomputer to some of the "A" bus circuits and the standard memory circuits connected thereto, of a consenting second BICPU microcomputer directly logically connected to the set of BIC-BUS circuits connected to the "B" bus circuits of the first BICPU microcomputer. This BIM-1 mode is very similar to the BIM-0 mode excepting only that the consenting second BICPU microcomputer has granted only some of the high address circuits of it's "A" bus circuits and the standard memory circuits connected thereto, for the logical bimemory hookup. The fifth switch means in the bimemory switching circuits 203 are partly logically disconnected and latched and partly logically connected and unlatched as indicated by the small open nected circle symbol 223 with the slash "/" symbol in it. The first BICPU microcomputer is in a bimemory mode as one small circle symbol 222 is open and one small circle symbol 223 is partly open, indicating that fourth and fifth switch means will be logically disconnected and logically connected in a bimemory fashion where at any one instant in time, only one set of the two sets of unlatched switch means connected to the data, address and read/write lines will be logically connected. In this BIM-1 mode, when the unlatched fifth switch means set are logically disconnected, and the unlatched fourth switch means set are logically connected, the CPU 202 is logically connected to the "A" bus circuits 205 and the standard memory circuits 217 connected thereto, in the same way the CPU being implemented on the BICPU microcomputer invention is logically connected to it's standard memory circuits. In this BIM-1 mode, when the unlatched set of fourth switch means are logically disconnected, and the unlatched set of fifth switch means, that are not logically disconnected and latched, are logically connected, the CPU 202 is directly logically connected to part of the "A" bus circuits and the standard memory circuits connected thereto, of the consenting second BICPU microcomputer at arrow symbol 237 in the same way the CPU being implemented on the BICPU microcomputer invention can be logically connected to part of it's standard memory circuits.

In FIG. 7, the BIM-2 mode is shown. The BIM-2 mode directly logically connects a first BICPU microcomputer to the "A" bus circuits and the standard memory circuits connected thereto, of a consenting third BICPU microcomputer directly logically connected to the set of BIC-BUS circuits connected to the "C" bus circuits of the first BICPU microcomputer. The first switch means connected to the fifth switch means in the "B" bus circuits 207 are logically disconnected and latched and floating as indicated by the bracket like symbol 213. The first switch means in the "C" bus circuits 209 are logically connected and latched as indicated by the arrow symbol 239. The second switch means and the third switch means in the first internal bus circuits (CPU bus circuits) are logically connected and latched as indicated by the arrow symbol 221. The fifth and seventh switch means in the bimemory switching circuits 203 are logically disconnected and latched as indicated by the two small circle symbols 223 and 227 with "X"s in them. A consenting third BICPU microcomputer is logical connected on the set of BIC-BUS circuits connected to the "C" bus circuits as indicated by the arrow symbol 241. The first switch means in the "A" bus circuits 205 are logically connected and latched, and the fourth switch means and the sixth switch means in the bimemory switching circuits 203 are logically connected and unlatched in a bimemory manner as indicated by the two small open circle symbols 222 and 225 and the arrow symbol 221. The "A" bus circuits 205 and the standard memory circuits 217 connected thereto, are logically connected and ready to take commands from the CPU 202 as indicated by the arrow symbol 219. The CPU is in a bimemory mode as both small circle symbols 222 and 225 are open with arrow symbol 221, indicating that the unlatched fourth switch means set and the unlatched sixth switch means set will be logically disconnected and logically connected in a bimemory fashion where at any one instant in time, only one set of the unlatched switch means will be logically connected. In this BIM-2 mode, when the unlatched sixth switch means 225 set are logically disconnected, and the unlatched fourth switch means 222 set are logically connected, the CPU 202 is directly logically connected to it's "A" bus circuits 205 and the standard memory circuits 217 connected thereto, in the same way the CPU being implemented on the BICPU microcomputer invention is directly logically connected to it's standard memory circuits. In this BIM-2 mode, when the unlatched fourth switch means 222 set are logically disconnected, and the unlatched sixth switch means 225 set are logically connected, the CPU 202 is directly logically connected to the "A" bus circuits and the standard memory circuits connected thereto, of a consenting third BICPU microcomputer at arrow symbol 241, in the same way the CPU being implemented on the BICPU microcomputer invention is directly logically connected to it's standard memory circuits. This BIM-2 mode is a mirror image of the BIM-0 mode.

In FIG. 8, the BIM-3 mode is shown. The BIM-3 mode directly logically connects a first BICPU microcomputer to some of the "A" bus circuits and the standard memory circuits connected thereto, of a consenting third BICPU microcomputer directly logically connected to the set of BIC-BUS circuits connected to the "C" bus circuits of the first BICPU microcomputer. This BIM-3 mode is very similar to the BIM-2 mode excepting only that the consenting third BICPU microcomputer has directly logically connected some of it's "A" bus circuits and the standard memory circuits connected thereto, for the logical bimemory hookup as explained in the BIM-1 mode above. This BIM-3 mode is a mirror image of the BIM-1 mode.

In FIG. 9, the BIM-4 mode is shown. The BIM-4 mode directly logically connects a first BICPU microcomputer to the "A" bus circuits and the standard memory circuits connected thereto, of a consenting second BICPU microcomputer directly logically connected to the set of BIC-BUS circuits connected to the "B" bus circuits of the first BICPU microcomputer, and directly logically connects a first BICPU microcomputer to the "A" bus circuits and the standard memory circuits connected thereto, of a consenting third BICPU microcomputer directly logically connected to the set of BIC-BUS circuits connected to the "C" bus circuits of the first BICPU microcomputer. The first and fourth switch means in the "A" bus circuits 205 are logically disconnected and latched as indicated by the open circle symbol 222 with an "X" in it. The first switch means in the "B" bus circuits 207 are logically connected and latched as indicated by the arrow symbol 235. The first switch means in the "C" bus circuits 209 are logically connected and latched as indicated by the arrow symbol 239. The second switch means and the third switch means in the first internal bus circuits (CPU bus circuits) are logically connected and latched as indicated by the arrow symbol 221. The seventh switch means in the bimemory switching circuits 203 are logically disconnected and latched as indicated by the small circle symbol 227 with an "X" in it. The fifth switch means are logically connected and unlatched, and the sixth switch means are logically connected and unlatched, in a bimemory manner as indicated by the two small open circle symbols 223 and 225 and the arrow 221. A consenting second BICPU microcomputer is logical connected on the set of BIC-BUS circuits connected to the "B" bus circuits as indicated by the arrow symbol 237 and has also granted ZERO Page, STACK and STANDARD VECTOR Page to the logical bimemory hookup as indicated by the standard memory circuits symbol 240. A consenting third BICPU microcomputer is logical connected on the set of BIC-BUS circuits connected to the "C" bus circuits as indicated by the arrow symbol 241. The "A" bus circuits 205 and the standard memory circuits 217 connected thereto, are logically disconnected and latched as indicated by the small circle 222 with the "X" symbol. The CPU is in a bimemory mode as both small circle symbols 223 and 225 are open with the arrow symbol 221, indicating that the unlatched fifth switch means set and the unlatched sixth switch means set will be logically disconnected and logically connected in a bimemory fashion where at any one instant in time, only one set of the unlatched switch means connected to the data, address and read/write lines will be logically connected. In this BIM-4 mode, when the unlatched set of sixth switch means are logically disconnected, and the unlatched set of fifth switch means are logically connected, the CPU 202 is directly logically connected to the "A" bus circuits and the standard memory circuits 240 connected thereto, of the consenting second BICPU microcomputer in the same way the CPU being implemented on the BICPU microcomputer invention is directly logically connected to it's standard memory circuits. In this BIM-4 mode, when the unlatched set of fifth switch means are logically disconnected, and the unlatched set of sixth switch means are logically connected, the CPU 202 is directly logically connected to the "A" bus circuits and the standard memory circuits connected thereto, of the consenting third BICPU microcomputer at arrow symbol 241 in the same way the CPU being implemented on the BICPU microcomputer invention is directly logically connected to it's standard memory circuits.

In FIG. 10, the BIM-5 mode is shown. The BIM-5 mode directly logically connects a first BICPU microcomputer to some or all of the "A" bus circuits and the standard memory circuits connected thereto, of a consenting second BICPU microcomputer directly logically connected to the set of BIC-BUS circuits connected to the "B" bus circuits of the first BICPU microcomputer, and directly logically connects a first BICPU microcomputer to some of the "A" bus circuits and the standard memory circuits connected thereto, of a consenting third BICPU microcomputer directly logically connected to the set of BIC-BUS circuits connected to the "C" bus circuits of the first BICPU microcomputer. This BIM-5 mode is very similar to the BIM-4 mode excepting only that the consenting third BICPU microcomputer has directly logically connected only some of it's "A" bus circuits and the standard memory circuits connected thereto, for the logical bimemory hookup, as indicated by the small circle symbol 225 with the slash "/" symbol in it.

In FIG. 11, the BIM-6 mode is shown. The BIM-6 mode directly logically connects a first BICPU microcomputer to the "A" bus circuits and the standard memory circuits connected thereto, of a consenting third BICPU microcomputer directly logically connected to the set of BIC-BUS circuits connected to the "C" bus circuits of the first BICPU microcomputer, and directly logically connects a first BICPU microcomputer to the "A" bus circuits and the standard memory circuits connected thereto, of a consenting second BICPU microcomputer directly logically connected to the set of BIC-BUS circuits connected to the "B" bus circuits of the first BICPU microcomputer. This BIM-6 mode is a mirror image of the BIM-4 mode above. In this BIM-6 mode, when the unlatched set of fifth switch means are logically disconnected, and the unlatched set of sixth switch means are logically connected, the CPU 202 is directly logically connected to the "A" bus circuits and the standard memory circuits connected thereto, of the consenting third BICPU microcomputer at arrow symbol 241 in the same way the CPU being implemented on the BICPU microcomputer invention is directly logically connected to it's standard memory circuits. In this BIM-6 mode, when the unlatched set of sixth switch means are logically disconnected, and the unlatched set of fifth switch means are logically connected, the CPU 202 is directly logically connected to the "A" bus circuits and the standard memory circuits connected thereto, of the consenting second BICPU microcomputer at arrow symbol 237 in the same way the CPU being implemented on the BICPU microcomputer invention is directly logically connected to it's standard memory circuits.

In FIG. 12, the BIM-7 mode is shown. The BIM-7 mode directly logically connects a first BICPU microcomputer to some or all of the "A" bus circuits and the standard memory circuits connected thereto, of a consenting third BICPU microcomputer directly logically connected to the set of BIC-BUS circuits connected to the "C" bus circuits of the first BICPU microcomputer, and directly logically connects a first BICPU microcomputer to some of the "A" bus circuits and the standard memory circuits connected thereto, of a consenting second BICPU microcomputer directly logically connected to the set of BIC-BUS circuits connected to the "B" bus circuits of the first BICPU microcomputer. This BIM-7 mode is very similar to the BIM-6 mode excepting only that the consenting second BICPU microcomputer has directly logically connected only some of it's "A" bus circuits and the standard memory circuits connected thereto, for the logical bimemory hookup as indicated by the small circle symbol 223 with the slash "/" symbol in it. This BIM-7 mode is a mirror image of the BIM-5 mode above.

In FIG. 13, the FLT-0 mode is shown. A consenting first BICPU microcomputer in the FLT-0 mode has directly logically connected it's "A" bus circuits and the standard memory circuits connected thereto, to a second BICPU microcomputer directly logically connected to the set of BIC-BUS circuits connected to the consenting first BICPU microcomputer's "B" bus circuits, and gone into a FLT mode waiting for the second BICPU microcomputer to finish the logical bimemory hookup. The first and fourth switch means in the "A" bus circuits 205 are logically connected and latched as indicated by the open circle symbol 222. The first switch means in the "B" bus circuits 207 are logically connected and latched as indicated by the arrow symbol 235. The first switch means connected to the sixth switch means in the "C" bus circuits 209 are logically disconnected and latched and floating as indicated by the bracket like symbol 215. The second switch means and the third switch means in the first internal bus circuits (CPU bus circuits) are logically disconnected and latched and floating as indicated by the bracket like symbol 255. The fifth switch means in the bimemory switching circuits 203 are logically connected and latched as indicated by the small open circle 223. The sixth and seventh switch means in the bimemory switching circuits 203 are logically disconnected and latched as indicated by the two small circle symbols 225 and 227 with "X"s in them. A second BICPU microcomputer in a BIM mode is logical connected on the set of BIC-BUS circuits connected to the "B" bus circuits as indicated by the arrow symbol 237. The "A" bus circuits 205 and the standard memory circuits 217 connected thereto, are logically connected and ready to take commands from the second BICPU microcomputer in the BIM mode as indicated by the two arrow symbols 219 and 237. The CPU 202 is in a bimemory FLT mode as both small circle symbols 222 and 223 are open without an arrow symbol 221 and with the floating symbol 255, indicating that fourth and fifth switch means are logically connected and latched in a bimemory fashion to the "B" bus circuits. In this FLT-0 mode, the first BICPU microcomputer waits in a floating mode until the second BICPU microcomputer in the BIM mode signals it has completed it's logical bimemory hookup, and then the first BICPU microcomputer executes a return from FLT logical bimemory hookup and continues with it's program where it was interrupted for the logical bimemory hookup.

In this FLT-0 mode, the consenting first BICPU microcomputer can, at any time, signal the second BICPU microcomputer to make a logical interrupt and terminate it's logical bimemory hookup and return the "A" bus circuits and the standard memory circuits 217 connected thereto, to the consenting first BICPU microcomputer. This FLT-0 mode can be used with BICPU microcomputers in the PRM-1, PRM-2, BIM-0, BIM-2, BIM-4, and BIM-6 modes, and can be used with BIM-5 and BIM-7 modes where the first BICPU microcomputer is granting ZERO Page, STACK and STANDARD VECTOR Page to the logical bimemory hookup.

In FIG. 14, a logical bimemory "S" hookup is shown between two BICPU microcomputers. A first BICPU microcomputer 201 is shown on the left in a BIM-0 mode. (Notice that one must always look at the symbol representing the BICPU microcomputer in such a manner that the square or rectangle representing the standard memory circuits is below the circle symbols representing the bimemory switching circuits. In FIG. 14, the page must be turned through an angle of 180 degrees, or upside down, to have the correct locations of the "B" bus circuits on the left and the "C" bus circuits on the right.) A consenting second BICPU microcomputer 201' is shown on the right in a FLT-0 mode. The first BICPU microcomputer 201 is in a BIM-0 mode as indicated by the arrow symbol 221, the two small open circle symbols 222 and 223, the arrow symbol 219, the arrow symbol 235, the arrow symbol 235', the two small open circle symbols 223' and 222', the arrow symbol 219' and the floating symbol 255', thus directly logically connecting the first BICPU microcomputer to both it's own "A" bus circuits 205 and the standard memory circuits 217 connected thereto, and "A" bus circuits 205' and the standard memory circuits 217' connected thereto, of the consenting second BICPU microcomputer 201'. The consenting second BICPU microcomputer 201' is in a FLT-0 mode as indicated by the floating symbol 255'. Further, it is seen that other BICPU microcomputers logically connected to the "C" bus circuits 209 of the first BICPU microcomputer 201 are logically disconnected from this logical bimemory hookup, as the first switch means logically connected to the sixth switch means in the "C" bus circuits 209 are logically disconnected and latched and floating as indicated by the float symbol 215, and the sixth and seventh switch means are logically disconnected and latched as indicated by the two small circle symbols 225 and 227 with "X"s in them. Other additional BICPU microcomputers logically connected to the "C" bus circuits of the consenting second BICPU microcomputer 201' are logically disconnected from this logical bimemory hookup, as the first switch means logically connected to the sixth switch means in the "C" bus circuits 209' are logically disconnected and latched and floating as indicated by the bracket like symbol 215', and the sixth and seventh switch means are logically disconnected and latched as indicated by the two small circle symbols 225' and 227' with "X"s in them. Other BICPU microcomputers in the system can cause a logical bimemory hookup to be interrupted in a logical manner by sending a DHU (Directed Hang Up) signal on the BIC-CTRB circuits involved, but other BICPU microcomputers in the system can not cause a program logic failure of a logical bimemory hookup.

Referring now to FIG. 15, a FLT-1 mode is shown. A consenting first BICPU microcomputer in the FLT-1 mode has directly logically connected some of it's "A" bus circuits and the standard memory circuits connected thereto, to a second BICPU microcomputer directly logically connected to the set of BIC-BUS circuits connected to the consenting first BICPU microcomputer's "B" bus circuits, and gone into a FLT mode waiting for the second BICPU microcomputer to finish the logical bimemory hookup. This FLT-1 mode is very similar to the FLT-0 mode excepting only that the consenting first BICPU microcomputer has directly logically connected only some of it's "A" bus circuits and the standard memory circuits connected thereto, to it's "B" bus circuits and the second BICPU microcomputer for the logical bimemory hookup, as indicated by the slash symbol "/" in the small circle symbol 223, and the small arrow symbol 259, indicating that the consenting first BICPU microcomputer is directly logically connected to and controlling the high address circuits not being logically connected to the second BICPU microcomputer in the BIM mode in the logical bimemory hookup. The first and fourth switch means in the "A" bus circuits 205 are logically connected and latched as indicated by the open circle symbol 222. The first switch means in the "B" bus circuits 207 are logically connected and latched as indicated by the arrow symbol 235. The first switch means connected to the sixth switch means in the "C" bus circuits 209 are logically disconnected and latched and floating as indicated by the bracket like symbol 215. The second switch means and the third switch means in the first internal bus circuits (CPU bus circuits) are partly logically disconnected and latched and floating as indicated by the half bracket like symbol 255, and are partly logically connected and latched as indicated by the half size arrow symbol 259. The fifth switch means in the bimemory switching circuits 203 are partly logically disconnected and latched and partly logically connected and latched as indicated by the small open circle symbol 223 with a slash "/" symbol in it. The sixth and seventh switch means in the bimemory switching circuits 203 are logically disconnected and latched as indicated by the two small circle symbols 225 and 227 with "X"s in them. A second BICPU microcomputer in a BIM mode is logical connected on the set of BIC-BUS circuits connected to the "B" bus circuits as indicated by the arrow symbol 237. The "A" bus circuits 205 and the standard memory circuits 217 connected thereto, are logically connected and ready to take commands from the second BICPU microcomputer in the BIM mode, as indicated by the two arrow symbols 219 and 237. The consenting first BICPU microcomputer 201, is in a bimemory mode as the small circle symbols 222 and 223 are open or partly open with a half floating symbol 255 and a half sized arrow symbol 259, indicating that the fourth and fifth switch means are logically connected and latched in a bimemory fashion to the "B" bus circuits 207. In this FLT-1 mode, the consenting first BICPU microcomputer waits in a floating mode waiting for the second BICPU microcomputer in the BIM mode to signal it has completed it's logical bimemory hookup, and then the consenting first BICPU microcomputer executes a return from FLT logical bimemory hookup and continues with it's program where it was interrupted for the logical bimemory hookup. In this FLT-1 mode, the consenting first BICPU microcomputer can at any time signal the second BICPU microcomputer in the BIM mode to make a logical interrupt and terminate it's logical bimemory hookup and return the "A" bus circuits 205 and the standard memory circuits 217 connected thereto, to the consenting first BICPU microcomputer. The FLT-1 mode can be used with the PRM-1, PRM-2, BIM-1, BIM-3, BIM-5, and BIM-7 modes.

FIG. 16 shows a FLT-2 mode which is a mirror image mode of the FLT-0 mode. A consenting first BICPU microcomputer in the FLT-2 mode has directly logically connected it's "A" bus circuits and the standard memory circuits connected thereto, to a third BICPU microcomputer directly logically connected to the set of BIC-BUS circuits connected to the consenting first BICPU microcomputer's "C" bus circuits, and gone into a FLT mode waiting for the third BICPU microcomputer to finish the logical bimemory hookup. This FLT-2 mode can be used with BICPU microcomputers in the PRM-1, PRM-2, BIM-0, BIM-2, BIM-4, and BIM-6 modes, and can be used with BIM-5 and BIM-7 modes where the consenting first BICPU microcomputer is granting ZERO Page, STACK and STANDARD VECTOR Page to the logical bimemory hookup.

Similarly, the FLT-3 mode of FIG. 17 is a mirror image of the FLT-1 mode. A consenting first BICPU microcomputer in the FLT-3 mode has directly logically connected some of it's "A" bus circuits and the standard memory circuits connected thereto, to a third BICPU microcomputer directly logically connected to the set of BIC-BUS circuits connected to the consenting first BICPU microcomputer's "C" bus circuits, and gone into a FLT mode waiting for the second BICPU microcomputer to finish the logical bimemory hookup. This FLT-3 mode is very similar to the FLT-2 mode excepting only that the consenting first BICPU microcomputer has logically connected some of the high address circuits in it's "A" bus circuits and the standard memory circuits connected thereto, to the third BICPU microcomputer for the logical bimemory hookup, as indicated by the slash symbol "/" in the small circle symbol 225, and the small arrow symbol 259. This FLT-3 mode can be used with BICPU microcomputers in the PRM-1, PRM-2, BIM-1, BIM-3, BIM-5, and BIM-7 modes.

The speed of electric signals in BIC-BUS circuits and the synchronous clock rate, of the BICPU microcomputer determine the total allowable distance between a BICPU microcomputer in the BIM mode and the "A" bus circuits of a consenting BICPU microcomputer in the FLT mode in a logical bimemory "S" hookup. The same concept applies to the logical bimemory "Y" hookup.

Especially notice that the logical bimemory "Y" hookups can allow essentially twice the total allowable distance, between the "A" bus circuits of the BICPU microcomputer in the FLT mode with the logical bimemory STACK, and the "A" bus circuits of the BICPU microcomputer in the FLT mode without the STACK, in a logical bimemory hookup, in comparison to the total allowable distance between the BICPU microcomputer in the BIM mode and the "A" bus circuits of the BICPU microcomputer in the FLT mode in a logical bimemory "S" hookup.

Because of the limiting speed of electric signals in BIC-BUS circuits, the total allowable distance is the distance between the BICPU microcomputer in BIM mode and the "A" bus circuits in the BICPU microcomputer in the FLT mode. In the logical bimemory "S" hookup, there is only one such allowable distance, but in the logical bimemory "Y" hookup, there are two such allowable distances. Therefore a programmer of a "Short" BICPU microcomputer can arrange the microcode being written and read through it's "A" bus circuits and the standard memory circuits connected thereto, as if the "Short" BICPU microcomputer is going to do a logical bememory "S" hookup with a "Long" BICPU microcomputer that is over the allowable "S" distance, but less than the allowable "Y" distance away. Then the programmer has the "Short" BICPU microcomputer call a "Medium" BICPU microcomputer that is less than one allowable "S" distance from the "Short" BICPU microcomputer and that is less than one allowable "S" distance from the "Long" BICPU micorcomputer, with a request for a BIM-4, BIM-5, BIM-6 or BIM-7 mode logical bimemory "Y" hookup.

In a large multi-BICPU microcomputer system, the BICPU microcomputers can be closely packaged in three dimensions. Therefore the essentially doubling of the above allowable "S" distance, using the logical bimemory "Y" hookups will increase, by a factor of 8, the total number of BICPU microcomputers that the "Short" BICPU microcomputer can effectively do an interacting direct logical bimemory hookup with. In other words, if the "Short" BICPU microcomputer above can do a logical bimemory "S" hookup with 50,000 BICPU microcomputers in a system of given density of BICPU microcomputers, the logical bimemory "Y" hookup will enable the "Short" BICPU microcomputer to do either a logical bimemory "S" hookup or a logical bimemory "Y" hookup with about 400,000 BICPU microcomputers. This is an object of the invention.

SPECIFIC DESCRIPTION OF THE BICPU MICROCOMPUTER

A. THE BIMEMORY SWITCHING UNIT

FIG. 19 is an overall drawing of a BICPU microcomputer 400 adapted from a conventional microcomputer of the MCS650X chip family. The BICPU microcomputer 400, as hereafter discussed, adds various elements onto the MCS650X chip to achieve the Bimemory Independent CPU effects of the invention and thereby create an improved microcomputer chip. It will also be recognized by those skilled in the art that other commercially available microcomputer chips (or computers in general) can be adapted and implemented in accordance with the invention. In any case, the improved microcomputer chip substantially represents the BICPU microcomputer referred to in the previous figures.

Referring first to the conventional elements, it is noted that the conventional microprocessor (referred to hereafter as the "processor") is outlined by a dashed line, depicted by the numeral 402. Specifically, the processor 402 includes an Instruction Decode element 404 receiving instructions from an 8-bit Instruction Register 406. The instructions create appropriate control signals to (a) two index registers 408, 410; (b) a stack pointer register 412; (c) an arithmetic logic unit 414; (d) an accumulator 416; (e) a program counter 418; (f) an input data latch 420; and (g) a data bus buffer 422, each element being connected to an internal data bus 424. Connected between the internal data bus 424 and the instruction decode element 404 is a processor status register 426.

Data enters and exits the data bus buffer 422 and the instruction register 406 via a data bus 430 identified by lines DB0 through DB7.

An address bus 431 is shown to be divided into a low address bus (ABL) 432 comprising lines AB0 through AB7 and a high address bus (ABH) 434 comprising lines AB8 through AB15.

The execution of instructions in the instruction decode element 404 is subject to several interrupt inputs (RES, IRQ, NMI) from an interrupt logic element 454.

A clock generator 450 creates timing signals to the instruction decode element 404 via a control element 452, as well as to other sections of the processor 402.

The instruction decode element 404 also has a ready input line 456 and directs a read or write operation signal to the data bus buffer 422 as appropriate on a read/write line 458.

A data bus enable line (DBE) 460 is connected to the data bus buffer 422. The signal on the DBE line 460 controls the transfer of data in the data bus buffer 422 on some MCS650X processors, but not on the MCS6502 microcomputer.

The IRQ interrupt request line, the RES reset interrupt line, the NMI nonmaskable interrupt line, the RDY line 456, inputs to and outputs from the clock generator 450, the R/W line 458, and the DBE line 460 are all part of a control section which creates control signals.

The operation of these known elements is set forth in the above-referenced MOS Technology HARDWARE and SOFTWARE MANUALS.

Turning now to the new elements in FIG. 19, it is specially noted that the CPU control signals are grouped to form the control circuits 500. In accordance with the invention, the CPU control circuits 500, the ABL circuits 432, the ABH circuits 434, and the data circuits 430 are each connected to the main switching unit 100 through the second switch means 104 in FIG. 1. Control switch 502, ABL switch 504, ABH switch 506, and data switch 508, illustrated in FIG. 19, form a part of switching unit 100.

In effect, the switches 502, 504, 506 and 508 correspond to sets of bimemory switching circuits 100 depicted in FIG. 1. That is, the bimemory switching circuits 502, 504, 506 and 508 determine which, if any, of the circuits in the "A", "B" or "C" bus circuits 520, 522 or 524, the processor 402 is directly logically connected to at any one moment in time. When the bimemory switching circuits 100 are operated in a bimemory manner, at any one moment in time, the address, data and read/write circuits from the processor 402 are directly logically connected to only one of the three bus circuits, the "A" bus circuits, the "B" bus circuits, or the "C" bus circuits.

In FIG. 19, the "A" bus circuits are shown at 520, the "B" bus circuits are shown at 522, and the "C" bus circuits shown at 524. The "A" bus circuits 520, comprises the "A" ABL circuits, the "A" ABH circuits, the "A" data circuits, and the "A" control circuits for the BICPU microcomputer 400. The power circuits for the BICPU microcomputer are the same as for the processor 402 and for clarity have been omitted from FIG. 19, the same as they have been omitted from the drawing of the basic processor 402 in the MOS HARDWARE MANUAL on page 29, referred to above. The "B" bus circuits 522, comprises the "B" ABL circuits, the "B" ABH circuits, the "B" data circuits, the "B" control circuits and the "B" BIC-CTRB circuits 627 (control lines). The "C" bus circuits 524, comprises the "C" ABL circuits, the "C" ABH circuits, the "C" data circuits, the "C" control circuits and the "C" BIC-CTRB circuits 629 (control lines). When power is being supplied to the power circuits, the bimemory switching circuits 502, 504, 506 and 508 can logically disconnect and float each standard memory circuit from the processor 400, or can logically connect each standard memory circuit to one of the "A", "B" or "C" bus circuits 520, 522 or 524, depending on the bimemory mode the BICPU microcomputer 400 is in.

For example, the low data circuit DB0, of the processor 400, can either be logically disconnected and floated, or can be directly logically connected to the DB0 circuit in the "A" bus circuits 520, or to the DB0 circuit in the "B" bus circuits 522, or to the DB0 circuit in the "C" bus circuits 524, at any one moment in time, depending on the logically disconnected or logically connected positions of the first 126, 130 and 134, second 104, third 108, fourth 110, fifth 112, sixth 114 and seventh 116 switch means in the bimemory switching circuits 504.

When processor 400 is directly logically writing data to a specific address in the "A" bus circuits 520 and the standard memory circuits connected thereto, the 8 data circuits 430, (including the DB0 circuit), the 16 address circuits 431, and the read/write circuit 458, are all directly logically connected to these circuits in the "A" bus circuits 520, at the same moment in time.

When processor 400 is directly logically writing data to a specific address in the "A" bus circuits and the standard memory circuits connected thereto, of a consenting second BICPU microcomputer, connected to the "B" bus circuits 522, the 8 data circuits 430, (including the DB0 circuit), the 16 address circuits 431 (or the logically connected ABH circuits and the 8 ABL circuits), and the read/write circuit 458, are all directly logically connected to these circuits in the "A" bus circuits of the consenting second BICPU microcomputer, at the same moment in time.

When processor 400 is directly logically writing data to a specific address in the "A" bus circuits and the standard memory circuits directly connected thereto, of a consenting third BICPU microcomputer, connected to the "C" bus circuits 524, the 8 data circuits 430, (including the DBO circuit), the 16 address circuits 431 (or the logically connected ABH circuits and the 8 ABL circuits), and the read/write circuit 458, are all directly logically connected to these circuits in the "A" bus circuits of the consenting third BICPU microcomputer, at the same moment in time.

Especially notice the new "B" BIC-CTRB circuits 627 and the new "C" BIC-CTRB circuits 629 are not connected to the bimemory switching circuits 100 in FIG. 1. Each of the "B" BIC-CTRB circuits 627 and the "C" BIC-CTRB circuits 629 contain a first switch means, controlled by the BICPU microcomputer 400, to logically disconnect and float and latch and to logically connect and latch each circuit to the new Interrup Logic Units 634 and 636. The "B" BIC-CTRB circuits 627 run parallel with the "B" standard memory circuits and both sets of circuits are shown as "B" bus circuits 522, in FIG. 19, and the "B" BIC-CTRB circuits are referred to as "control lines" in 522. The "C" BIC-CTRB circuits 629 run parallel with the "C" standard memory circuits and both sets of circuits are shown as "C" bus circuits 524, in FIG. 19, and the "C" BIC-CTRB circuits 629 are referred to as "control lines" in 524. These BIC-CTRB circuits are included in the sets of standard BIC-BUS circuits along with the other circuits in the "B" bus circuits 522 and the "C" bus circuits 524.

For example, assume first BICPU microcomputer 400 is in a BIM-1 mode as shown in FIG. 6 and a consenting second BICPU microcomputer has directly logically connected it's ABL circuits, DATA circuits and Control circuits in it's "A" bus circuits and the standard memory circuits connected there to, to the first BICPU microcomputer 400. The consenting second BICPU microcomputer has continued to be directly logically connected to the Address Bus High (ABH) circuits and therefore directly logically controls the location of the one page of memory the first BICPU microcomputer is directly connected to and directly controls, in the logical bimemory "S" hookup. The first BICPU microcomputer's bimemory switching circuits ABL 504, ABH 506, data 508, and control 502, logically disconnect and latch their first switch means connected to their sixth switch means, and their sixth and seventh switch means (114 and 116 in FIG. 1), and logically connect and latch their second and third switch means 108, and their first switch means connected to their fourth and fifth switch means.

The bimemory switching circuits ABL 504, ABH 506, data 508, and some of the control circuits 502, logically connect and unlatch their fourth switch means 110, and logically connect and unlatches their fifth switch means 112 in a bimemory manner. Then BICPU microcomputer 400 logically disconnects and latches the first and fifth switch means (112 in FIG. 1) in the Address Bus High circuits that are not being connected to this logical bimemory hookup in the ABH bimemory switching circuits 506. Now BICPU microcomputer 400 has two sets of unlatched switch means that are to be operated in a bimemory manner. The logically connected unlatched fourth switch means make one set and the logically connected unlatched fifth switch means make the second set.

Specially notice that fifth switch means (112 in FIG. 1) connected to the Address Bus High circuits (506 in FIG. 19) that are not being connected to this logical bimemory hookup have been logically disconnected and latched and will stay logically disconnected and latched during this entire logical bimemory hookup. A consenting second BICPU microcomputer in a FLT mode is on BIC-BUS circuits connected to the "B" bus circuits 522, and is directly logically connected to and directly logically controls those Address Bus High circuits not being connected to this logical bimemory hookup. The consenting second BICPU microcomputer in the FLT mode, thus directly logically controls the page in memory that BICPU microcomputer 400 is directly logically connected to. First BICPU microcomputer 400 can directly logically control what is being written to the "A" bus circuits of a certain page in the consenting second BICPU microcomputer's standart memory circuits, while the consenting second BICPU microcomputer directly logically controls the exact location of the certain page in which BICPU microcomputer 400 is writing.

The standard memory circuits connected to the "A" bus circuits of the consenting second BICPU microcomputer in the FLT mode, obey the signals on the "A" bus circuits to which they are connected. Although some of the high address circuits are being driven with signals from the consenting second BICPU microcomputer and the balance of the high address circuits are being driven with signals from BICPU microcomputer 400, the standard memory circuits connected to the "A" bus circuits of the consenting second BICPU microcomputer, operate the same as if all signals were being directly generated by the consenting second BICPU microcomputer.

BICPU microcomputer 400 now has two sets of unlatched switch means to operate in a bimemory manner. The unlatched fourth switch means set include those circuits needed to control all of the "A" bus circuits and the standard memory circuits connected thereto, of BICPU microcomputer 400. The unlatched fifth switch means set includes those circuits needed to control the connected portion of the "A" bus circuits and the standard memory circuits connected thereto, of the consenting second BICPU microcomputer.

When first BICPU microcomputer 400 logically disconnects the unlatched fifth switch means set and logically connects the unlatched fourth switch means set, in a bimemory manner, the processor 402 is directly logically connected to it's "A" bus circuits 520 and the standard memory circuits connected thereto, of first BICPU microcomputer 400. When first BICPU microcomputer 400 logically disconnects the unlatched fourth switch means set and logically connects the unlatched fifth switch means set, in a bimemory manner, the processor 402 is directly logically connected to the connected "A" bus circuits and the standard memory circuits connected thereto, of the second BICPU microcomputer directly logically connected to the "B" bus circuits 522 of first BICPU microcomputer 400.

First BICPU microcomputer 400 can now toggle, in a bimemory manner, the unlatched sets of switch means one way and be directly logically connected to it's "A" bus circuits 520 and the standard memory circuits connected thereto, and toggle, in a bimemory manner, the unlatched sets of switch means the other way and be directly logically connected to some of the "A" bus circuits and the standard memory circuits connected thereto, of a second BICPU microcomputer logically connected to the "B" bus circuits 522. The present logical switching techniques utilized to direct data flow to specific address locations within a single memory can be utilized in the present invention to switch data flow to a specific memory of a selected BICPU microcomputer.

Flexible, direct logical bimemory hookup, as simple as toggling two sets of unlatched switch means.

This is how the bimemory manner works. The BICPU microcomputer in the BIM mode is able to logically disconnect and latch or logically connect and latch five sets of the seven sets of switch means in the bimemory switching circuits. The two remaining unlatched sets of switch means can then be toggled in a full connection of the "A" bus circuits and the standard memory circuits connected thereto, of two different BICPU microcomputers in bimemory manner.

Or the BICPU microcomputer in the BIM mode can first logically disconnect and latch a partly connected pattern in the high address circuits in one of the two unlatched sets of switch means and then proceed to toggle the modified two unlatched sets of switch means in the same effective bimemory manner. Thus the same bimemory toggling arrangement works for the partly connected "A" bus circuits and the standard memory circuits connected thereto, just as it works for the full connection of "A" bus circuits and the standard memory circuits connected thereto.

The logically disconnected and logically connected states of the switch means in bimemory switching circuits 502, 504, 506 and 508, it is noted, is determined by a decode switching circuit 530, which sets switch means in the bimemory switching circuits 502, 504, 506 and 508 based on coded input from the instruction decode element 404. In accordance with the invention, new microinstructions to the instruction decode element 404 are defined which determine the transmitting of the prescribed coded input to the decode switch 530.

B. ThE Stamdard Sets of BIC-BUS Circuits Between BICPU Microcomputers

Having defined BIC-BUS circuits, that are to be used to connect the "B" or "C" bus circuits of a first BICPU microcomputer to the "B" or "C" bus circuits of a second BICPU microcomputer, the present invention makes further provision for interconnecting thousands of BICPU microcomputers with thousands of BIC-BUS circuits and sets of BIC-BUS circuits.

Since standard memory circuits must be connected to the BICPU microcomputer "A" bus circuits, standard BICPU microcomputer symbols can identify the standard memory circuits connected to the "A" bus circuits of a BICPU microcomputer by the same unique name used to identify the BICPU microcomputer.

A BICPU microcomputer, as illustrated in the exemplary embodiment can be connected to two sets of BIC-BUS circuits. Further Busses can be accommodated through addition of D, E, etc. registers. The BICPU microcomputer can be identified by the unique names of the two sets of BIC-BUS circuits connected to it's "B" and "C" bus circuits. Since it is possible for two or more different BICPU microcomputers to be connected to the same two sets of BIC-BUS circuits, one can use an arbitrary initial bus number to identify the exact BICPU microcomputer connected to these two sets of BIC-BUS circuits.

The Programmer of the BICPU microcomputer can always cause the BICPU microcomputer Instruction Register 406 in FIG. 19 to read microcodes changing the initial bus number to any other verified valid bus number, or to the logical power-on default, reset or logically disconnected number (ZERO), when power is being supplied to the BICPU microcomputer, during a running program. However, using arbitrary initial bus numbers that can be stored in the "B" and "C" registers 604 and 610 in FIG. 19, gives a unique starting point name for this BICPU microcomputer and it's "A" bus circuits and the standard memory circuits connected thereto.

The standard BICPU microcomputer number should not prevent or be confused with nick-names and other names for this same BICPU microcomputer. The assigned names of the two sets of BIC-BUS circuits, connected to the "B" and "C" bus circuits, and arbitrary initial assigned "B" and "C" register (604 and 610 in FIG. 19) numbers can be used in a unique way that will also help the Programmers.

For example, in FIG. 20 the BICPU microcomputer with nick-name "HB", can have a standard number of BICPU# 4.CAT-15.DOG. The "BICPU#", states this is a standard BICPU microcomputer number, not to be confused with nick-names or pet names programmers and field application system designers might give this particular BICPU microcomputer. 4.CAT-15.DOG identifies the BICPU microcomputer with it's "B" bus circuits 522 in FIG. 19, connected to the set of BIC-BUS circuits named "CAT" with arbitrary assigned initial bus number (4) in it's "B" register 604, and with it's "C" bus circuits 524 in FIG. 19, connected to the set of BIC-BUS circuits named "DOG" with arbitrary assigned initial bus number (15) in it's "C" register 610.

In FIG. 20, the square or rectangle indicate the standard memory circuits connected to "A" bus circuits. Programmers of many CPUs presently use squares and rectangles to represent memory circuits. Rectangles can be made long enough to contain very long names for thousands of different sets of BIC-BUS circuits in a World Climate system or in a SDIO system.

The BICPU microcomputer nick-named "ALONE" in FIG. 22, is in the logically disconnected, open, independent PRM-0 mode. The large circle symbol represents the BICPU microcomputer. The five small circle symbols represent the five major switch means in the bimemory switching circuits. A clear small circle indicates that the switch means is logically connected. Small circles with "X"s added indicate logically disconnected switch means. Small circles with a single slash "/" added indicate partly logically connected/disconnected switch means. The small circle in the center represents the CPU of the BICPU microcomputer. When the small circle in the center is clear, it indicates this CPU is directly logically connected to a set of "A" circuits and the standard memory circuits connected thereto, and when there are two clear small circles with a logical connected CPU (total of three clear small circles with the CPU), this BICPU microcomputer is in a BIM mode and the two clear small circles on the larger circle indicate these switch means are being operated in a bimemory manner where only one set of circuits are logically connected to the CPU at any one moment in time.

It is noted that the common junction point of the bimemory switching circuits is represented by the cross point, where the larger circle representing the BICPU microcomputer crosses the straight line that connects the memory rectangle and the small circle representing the CPU of the BICPU microcomputer.

For example in FIG. 22, the BICPU# 16.JOHN-28.CAT is in a BIM-2 mode and the three clear small circles represent the third switch means (which connects the CPU to the common junction point) vis the first internal bus circuits, and the fourth and sixth switch means that are being operated in a bimemory manner. The fourth switch means are logically connected in the second internal bus circuits and the sixth switch means are logically connected in the fourth internal bus circuits.

Continuing describing the symbols of the BICPU microcomputer "ALONE", the "ears" on the larger circle represent the "B" and "C" bus circuits, which are not connected to any set of BIC-BUS circuits at the moment. This is indicated by the omission of the large black dot at the intersection of the lines at the end of the "ears". The standard BICPU microcomputer number of "ALONE" is BICPU# 0.??-0.??, because "ALONE" is not connected to any BIC-BUS circuit and it does not have arbitrary assigned initial bus numbers.

The positions of BICPU microcomputer "HB" and "EB" in FIG. 22, have been intentionally reversed from FIG. 20, to make the set of BIC-BUS circuits, named "DOG", cross the set of BIC-BUS circuits named "CAT". The large black dot at the end of an "ear" indicates the "B" or "C" bus circuits are connected to a set of BIC-BUS circuits.

The sets of BIC-BUS circuits are the long curved lines with each end connected to one of the large black dots. As many BIC-BUS circuits can be connected to one large black dot as needed to interconnect the desired BICPU microcomputers, (but not more than 127 large black dots to be interconnected on one set of BIC-BUS circuits when eight bits are being used in the BIC-AD address circuits 600 and 652). Especially note that all large black dots that are interconnected by lines (not counting the lines of the symbolic BICPU microcomputer) are on one particular set of BIC-BUS circuits. The two large black dots on the "ears" of one symbolic BICPU microcomputer should not be interconnected by lines connected to one set of large black dots as that would mean both the "B" and "C" bus circuits of the BICPU microcomputer are connected to the same set of BIC-BUS circuits. The interconnection of the "B" and "C" BIC-BUS circuits of a single BICPU microcomputer, will not cause a failure of the program logic of the single BICPU microcomputer, or of running parallel programs in other logically connected BICPU microcomputers, but will limit the flexibility of the single BICPU microcomputer involved.

By writing the "B" bus circuits initial bus number and name of the set of BIC-BUS circuits first on the top line in the memory square or rectangle and the "C" bus circuits initial bus number and name of the set of BIC-BUS circuits on the second line in the memory square or rectangle, the programmer can check that the "B" and "C" bus circuits are not connected to the same set of BIC-BUS circuits.

A BIC-BUS circuit is represented by a single long curved line connecting one large black dot on one "ear" of one BICPU microcomputer to another large black dot on one "ear" of a different BICPU microcomputer. When four curved lines come together without a large black dot, two BIC-BUS circuits are crossing each other without being interconnected.

Up to 127 lines can come together at a large black dot, using 8-bit BIC-AD circuits. These BIC-BUS circuits are all on the same set of BIC-BUS circuits. Any two different sets of BIC-BUS circuits can be interconnected by a BICPU microcomputer.

In a large system of a thousand interconnected BICPU microcomputers, there will tend to be about the same number of single BIC-BUS circuits (one thousand), and about one fourth as many different "sets" of BIC-BUS circuits (two hundred and fifty). Generally, the best performance of a very large multicomputer system using BICPU microcomputers will tend to be when 3 to 5 BICPU microcomputers are connected to an average set of BIC-BUS circuits. There can be parallel problems where very little logical intercommunication is required between the individual BICPU microcomputers. In these cases, it can be possible to effectively have 25 to 50 or more BICPU microcomputers connected to one set of BIC-BUS circuits, but this will tend to be the exception. In many cases, there will be only two or three BICPU microcomputers mechanically connected to a particular set of BIC-BUS circuits.

The arbitrary initial bus number and the name of the set of BIC-BUS circuits connected to the "B" bus circuits is shown on the first line in the memory rectangle, and the arbitrary initial bus number and the name of the set of BIC-BUS circuits connected to the "C" bus circuits is shown on the second line in the memory rectangle for standard BICPU microcomputer numbers.

In FIG. 23, the BICPU microcomputers with nick-names "HALF", "BUSY" and "ME" have been added to FIG. 22. The names of the sets of BIC-BUS circuits have been removed as they are redundant. When FIG. 23 is rotated 180 degrees so the larger circle of the BICPU microcomputer symbol is above the memory square of "BUSY", with a standard BICPU# 77.CAT-60.DOG, the left hand "ear" represents "B" bus circuits 207 of FIGS. 2 through 17, and "B" bus circuits 522 of FIG. 19. The right hand "ear" represents "C" bus circuits 209 of FIGS. 2 through 17, and "C" bus circuits 524 of FIG. 19. The BICPU microcomputer BICPU# 3.JOHN-18.CAT with the nick-name "ME" is in a BIM-1 mode with BICPU microcomputer BICPU# 17.SUE-4.JOHN with nick-name "ALSO" which is in a FLT-3 mode.

The BICPU microcomputer BICPU# 77.CAT-60.DOG with nick-name "BUSY" is in a PRM-0 mode. "BUSY" can or can not be logically connected to the set of BIC-BUS circuits named "CAT" connected to it's "B" bus circuits or to the set of BIC-BUS circuits named "DOG" connected to it's "C" bus circuits. If BICPU# 77.CAT-60.DOG with nick-name "BUSY" has a "ZERO" stored in it's "B" or "C" registers 604 or 610, that "B" or "C" bus circuit is effectively logically disconnected from the BIC-BUS circuit it is mechanically connected to.

The "Stick" drawings in FIG. 23 convey an enormous amount of information in a unique, simple, concise and flexible manner.

In FIG. 24, three additional BICPU microcomputers, nick-named "YES", "BIC" and "PU" have been arbitrarily added, as well as three additional sets of BIC-BUS circuits named "SANDY", "BILL" and "TOM".

The small arrow symbol superimposed on 30.SANDY-28.SUE, nick-named "YES", "B" bus circuits, or left "ear", indicates that the "STACK" of this BIM-4 logical bimemory hookup is on the "A" bus circuits and the standard memory circuits connected thereto, of BICPU# 58.SANDY-49.BILL with a nick-name of "BIC".

BICPU# 34.TOM-44.SUE, with a nick-name of "PU", is in a FLT-2 mode, connecting it's "A" bus circuits and the standard memory circuits connected thereto, without "STACK" privileges to BICPU# 30.SANDY-28.SUE.

The small arrow symbol superimposed on the "A" bus line leading to the memory rectangle symbol of BICPU# 58.SANDY-49.BILL indicates granting of STACK privileges to BICPU# 30.SANDY-28.SUE with nick-name "YES". "YES" is in a BIM-4 mode.

The small arrow symbol superimposed on larger circle symbol of BICPU# 4.CAT-15.DOG, nick-named "HB", pointing toward the "B" bus circuits, indicates the BIM mode of this logical bimemory hookup is located on the "B" bus circuits, and that this is the PRM-1 mode.

In FIG. 24, with correct logical bimemory "S" or logical bimemory "Y" hookup microcode being read by the Instruction Register 406, any logically connected BICPU microcomputer in a BIM mode can be directly logically connected to the "A" bus circuits and standard memory circuits connected thereto, of any other logically connected consenting BICPU microcomputer in a FLT mode except "ALONE" who currently is not connected by BIC-BUS circuits to any other BICPU microcomputer.

Without modification of any running parallel program in the system, and without making any change in the present mechanical interconnections of the various sets of BIC-BUS circuits, the BICPU microcomputer "ALONE" can be symbolically mechanically connected to any black dot in the system of standard BIC-BUS circuits, by putting a large black dot on either it's "B" or "C" bus "ear" and drawing a line to any other large black dot in the system.

In any large system of thousands of mechanically interconnected BICPU microcomputers, another added BICPU microcomputer can be mechanically connected to any "B" or "C" bus circuit of any of the thousands of mechanically interconnected BICPU microcomputers, by mechanically connecting one end of the added BIC-BUS circuits to the "B" or "C" bus circuit of the added BICPU microcomputer and mechanically connecting the other end of the added BIC-BUS circuits to the target set of existing sets of BIC-BUS circuits. This can be done without causing a failure of the existing parallel program logic of the tens of thousands of running parallel programs in the system. This added BICPU microcomputer can mechanically interconnect any two different existing sets of BIC-BUS circuits, without causing a failure of the existing logic of the parallel programs presently running in those two existing different sets of BIC-BUS circuits. The added BICPU microcomputer can be mechanically connected to any set of BIC-BUS circuits in the existing system using either it's "B" bus circuits or it's "C" bus circuits and a new set of BIC-BUS circuits can be mechanically added to the existing system by mechanically connecting the new set of BIC-BUS circuits to the unconnected "B" or "C" bus circuits of the added BICPU microcomputer.

Thus this new BICPU microcomputer invention can be used to mechanically interconnect any two different levels of hierarchy out of several hundred levels of hierarchy, without causing a logic failure in the tens of thousands of running parallel programs between the different logic levels. The procedure is just the same as above.

The BICPU microcomputer invention permit such unbelievable flexibility in mechanically interconnecting thousands of BICPU microcomputers in one large, running, interacting system of parallel programs because "all of the interconnection logic circuits required on the CPU side of the "A" bus circuits are contained in the BICPU microcomputer invention". One simple, single conductor, group of standard BIC-BUS circuits, without logic circuits, can interconnect any two existing "B" or "C" bus circuits of two different BICPU microcomputers as long as the "B" or "C" bus circuits are located on two different sets of BIC-BUS circuits.

C. Rules for Interconnecting Sets of BIC-BUS Circuits

Several simple rules must be observed to interconnect thousands of BICPU microcomputers in one of several billions of different possible ways using one standard set of BIC-BUS circuits.

Standard BIC-BUS circuits, using an eight bit BIC-AD bus, can connect the "B" or "C" bus circuits of any first BICPU microcomputer to any set of BIC-BUS circuits with less than 127 currently connected BICPU microcomputers. The other "B" or "C" bus circuits of the first BICPU microcomputer can be connected to any different set of BIC-BUS circuits with less than 127 currently connected BICPU microcomputers.

Each set of interconnected BIC-BUS circuits is logically just a larger group of BIC-BUS circuits with more connection points where "B" or "C" bus circuits of additional BICPU microcomputer's can be connected. Each set of interconnected BIC-BUS circuits can be logically disconnected from all of the BICPU microcomputers "B" and "C" bus circuits that are presently connected to it, and the resulting set of interconnected BIC-BUS circuits are electrically the same as one single group of BIC-BUS circuits.

Either end of BIC-BUS circuits can be connected to either end of different BIC-BUS circuits. Either end of BIC-BUS circuits can be connected to either "B" bus circuits or "C" bus circuits of an BICPU microcomputer.

Neither end of BIC-BUS circuits can ever be connected to the "A" bus circuits of any BICPU microcomputer. (Only standard memory circuits are connected to the "A" bus circuits of an BICPU microcomputer).

The "B" and "C" bus circuits of on BICPU microcomputer should not be connected to the same set of BIC-BUS circuits.

Each logical connected ILU 634 or 636 in FIG. 19 (Interrupt Logic Unit), on a given set of BIC-BUS circuits must have a different verified valid bus number stored in it's logically connected "B" or "C" register 604 or 610 in FIG. 19.

Each logically connected ILU contains logic circuits to verify that the valid bus number stored in it's logically connected "B" or "C" register 604 or 610 of FIG. 19 is the only logically connected ILU with this valid bus number stored in it's logically connected "B" or "C" register, on this set of BIC-BUS circuits.

In eight bit CPUs being implemented on the invention, BICPU microcomputers can have valid bus numbers from 1 through 127. Bus number ZERO is reserved for reset, default power on, and to logically disconnect the ILU from the connected BIC-BUS circuits in PRM-0 mode. Bus numbers 128 through 255 all set the highest order bit in the BIC-AD circuits 600 or 652 in FIG. 19, TRUE, and are reserved for the DHU (Directed Hang Up) interrupt.

The DHU interrupt occurs when the highest order bit in BIC-AD circuits 600 or 652 is TRUE. This is when the number on the BIC-AD circuits is 128 through 255. All of the DHU numbers from 128 through 255 can be assigned any additional special meaning that creative Programmers can think of, to implement various programming concepts, in addition to the DHU interrupt. Each BICPU microcomputer in a large BICPU microcomputer system can have different additional special meanings for the same DHU interrupt number.

In the SDIO BICPU microcomputer environment, one can expect some BICPU microcomputers to obtain critical information about an enemy attack occurring in one air defense zone. Programmers can create very secure DHU interrupt codes with additional special meanings programmed into the tens of thousands of parallel running programs. For example, a 188 DHU interrupt code can be assigned a special additional meaning that each BICPU microcomputer receiving it, changes it's assigned bus number in it's "B" and "C" registers to a predetermined different number, or to load and run completely different programs from disk memory. One very secure BICPU microcomputer can logically interrupt and very quickly reprogram dozens of other BICPU microcomputers with new and different microcode based on other parallel programs that are being more effective in destroying enemy missiles. The possibilities are so immense for creative programmers, it is difficult to properly describe the potential value of these DHU codes whose additional double meaning is completely controlled by the Programmers.

Assigning the highest order bit in the BIC-AD circuits 600 or 652 in FIG. 19, to the DHU interrupt, causes the ILUs to react very quickly to the DHU signal. Creative programmers can control the double meaning of the DHU signal and more effectively improve the data processing ability of the BICPU microcomputer invention.

The Instruction Register of the "calling" BICPU microcomputer reads the bimemory hookup microcode from it's "A" bus circuits and the standard memory circuits connected thereto. The "BCR" circuit is always set TRUE by the "calling" BICPU microcomputer.

The "BCR" circuit is always set FALSE by the BICPU microcomputer in the BIM mode after logically completing a logical bimemory hookup with a NHU (Normal Hang Up) or after logically interrupting a logical bimemory hookup with a DHU (Directed Hang Up) or a "BEN" circuit FALSE interrupt.

When the "calling" BICPU microcomputer is different than the BICPU microcomputer in the BIM mode in a logical bimemory "Y" hookup, the "calling" BICPU microcomputer passes control of the TRUE "BCR" circuit to the BICPU microcomputer in the BIM mode, after the BICPU microcomputer in the BIM mode sets it's "BEN" TRUE for this logical bimemory "Y" hookup.

The BICPU microcomputer in the BIM mode, when interrupted, always makes a logical Hang Up, where the logic of the logical bimemory hookup is retained, in a manner desired by the Programmer. The BICPU microcomputer in the BIM mode always sets the "BCR" circuit FALSE, after making a logical Hang Up when either a NHU (Normal Hang Up), a DHU interrupt or a "BEN" circuit FALSE interrupt is being made.

The "BCR" circuit is latched from the BICPU microcomputer in the BIM mode to the BICPU microcomputer in the FLT modes.

In a logical bimemory "Y" hookup, there are two "BCR" circuits. One "BCR" circuit is latched from the BICPU microcomputer in the BIM mode to the BICPU microcomputer in the FLT mode where the FLT mode has granted ZERO page, STACK and STANDARD VECTOR Page privileges. The second "BCR" circuit is latched from the BICPU microcomputer in the BIM mode to the BICPU microcomputer in the FLT mode without ZERO Page, STACK and STANDARD VECTOR Page privileges.

The "BEN" circuit is latched from the BICPU microcomputer in the FLT mode back to the BICPU microcomputer in the BIM mode.

The "BCR" circuit in bimemory hookups containing one or more interconnecting PRM-1 and PRM-2 modes, is latched in sets of BIC-BUS circuits segments from the BICPU microcomputer in the BIM mode to the BICPU microcomputer in the FLT mode. The "BEN" circuit is latched in sets of BIC-BUS circuits segments from the BICPU microcomputer in the FLT mode to the BICPU microcomputer in the BIM mode.

When the BICPU microcomputer in the BIM mode, sets the "BCR" circuit FALSE, the "BCR" circuits unlatch from the BICPU microcomputer in the BIM mode to the BICPU microcomputer in the FLT mode in domino fashion.

When the BICPU microcomputer in the FLT mode recognizes the "BCR" circuit is FALSE, the BICPU microcomputer in the FLT mode sets the "BEN" circuit FALSE. The "BEN" circuits unlatch from the BICPU microcomputer in the FLT mode back to the BICPU microcomputer in the BIM mode in domino fashion.

On a DHU signal, all BICPU microcomputers with either "B" or "C" bus circuits connected to the set of BIC-BUS circuits with the DHU signal logically hang up both their "B" and "C" bus circuits. (When a BICPU microcomputer is "busy" on it's "B" bus circuits, it is also "busy" as far as it's "C" bus circuits are concerned).

BICPU microcomputers logically connected to a set of BIC-BUS circuits with a DHU signal, set both their "B" and "C" "BEN" circuits FALSE.

The "BEN" circuit FALSE interrupt causes the "BEN" circuit to unlatch in sets of BIC-BUS circuits to the BICPU microcomputer in the BIM mode. The BICPU microcomputer in the BIM mode recognizes the FALSE "BEN" circuit as a signal the BICPU microcomputer in the FLT mode has withdrawn the privilege to use the standard memory circuits connected to it's "A" bus circuits, and the BICPU microcomputer in the BIM mode does a logical "BEN" circuit FALSE interrupt as described above.

The "BEN" circuit is set TRUE for each set of BIC-BUS circuits by the current linking BICPU microcomputer. The "BEN" circuit is set TRUE for this logical bimemory hookup by the "consenting" BICPU microcomputer in the FLT mode. The "BEN" circuit can be set FALSE by any logically connected BICPU microcomputer on detecting an error condition on any set of BIC-BUS circuits.

The BICPU microcomputer in a FLT mode or in an interconnecting PRM-1 or PRM-2 mode in a logical bimemory hookup, can set the "BEN" circuit FALSE at any time.

A basic rule of the BICPU microcomputer invention is, the "consenting" BICPU microcomputer in the FLT mode, after directly logically connecting all or part of it's "A" bus circuits and the standard memory circuits connected thereto, and setting the "BEN" circuit TRUE to a logical bimemory hookup, always has the right, at any time, to set it's "BEN" circuit FALSE, thus causing a logical "BEN" circuit FALSE interrupt of the logical bimemory hookup.

Especially notice that the BICPU microcomputer invention requires the programmer to write individual instructions telling each BICPU microcomputer, how to logically respond to any "call" received on it's "B" or "C" bus circuits. This new and unique feature of the BICPU microcomputer invention, can be used by creative programmers to create programs that have REAL computer security.

Further, using this new and unique feature, creative programmers can write programs that change the bimemory mode of this consenting BICPU microcomputer, that has been stored in it's BICPU Bus Status Registers #1, #2 and #3, by it's "B" or "C" ILU "answering" the call, to some different bimemory mode that is still logically compatible with the "calling" BICPU microcomputer. For example, assume a "calling" BICPU microcomputer in a BIM-0 mode has requested this consenting BICPU microcomputer to directly logically connect all of it's "A" bus circuits to it's "B" or "C" bus circuits with a FLT-0 or FLT-2 mode. This consenting BICPU microcomputer, is interrupted by it's "B" or "C" ILU, to give the final approval of this logical bimemory hookup before the "B" or "C" ILU sets the "BEN" circuit TRUE for this logical bimemory hookup. This consenting BICPU microcomputer examines the information stored in it's seven Status Registers and based on instructions written in it's "A" bus circuits and the standard memory circuits connected thereto, logically decides that instead of connecting all of it's "A" bus circuits to it's "B" or "C" bus circuits as requested, to only directly logically connect four pages of it's "A" bus circuits to it's "B" or "C" bus circuits. This consenting BICPU microcomputer can than store FLT-1 or FLT-3 in it's BICPU Bus Status Register #1, 706, and store the number for logically connecting four pages of it's "A" bus circuits to it's "B" or "C" bus circuits in it's BICPU Bus Status Register #2,707 and store the starting page address for the four pages in it's BICPU Bus Status Register #3, 708, and signal it's "B" or "C" ILU to grant the logical bimemory hookup and to set the "BEN" circuit TRUE. The "B" or "C" ILU then only directly logically connects the four pages of it's "A" bus circuits to it's "B" or "C" bus circuits according to the numbers stored in it's BICPU Bus Status Registers #1, #2 and #3, (706, 707 and 708), and sets the "BEN" circuit TRUE. The "calling" BICPU microcomputer in the BIM mode is not required to be made aware of the change directly logically connecting it to only four pages of the consenting BICPU microcomputer's "A" bus circuits, unless the consenting BICPU microcomputer's programmer wanted the "calling" BICPU microcomputer in the BIM mode to be made aware of the change.

The consenting BICPU microcomputer can now receive what ever microcode the "calling" BICPU microcomputer reads or writes in the four pages, and then arbitrarily stop the logically bimemory hookup by setting the "BEN" circuit FALSE interrupt. The consenting BICPU microcomputer can now read whatever the "calling" BICPU microcomputer in the BIM mode wrote in the four pages, and logically decide if this "calling" BICPU microcomputer should be considered a friend or a foe. This is exactly the way humans think and act. The new and unique BICPU microcomputer can mimic this human thinking at computer speeds. This is an object of the BICPU microcomputer invention.

To make a large array of BICPU microcomputers act like a large mainframe, programmers can direct each BICPU microcomputer "answering" a "call" to immediately agree to the request. Again, this is the same way humans think and act. When known friends request help, help is provided now without waiting to make carefully thought out future economic or health consequences, before granting that help. If a stranger requests help, first, careful consideration of the consequences of that help on future economic and health situations is made. This is an object of the BICPU microcomputer invention.

D. Operation of the Interrupt Logic Units (ILUs)

The two Interrupt Logic Units (ILUs) 634 and 636 in FIG. 19 are additional major keys of the BICPU microcomputer invention. The ILUs contain special logical bimemory "S" and "Y" hookup error detecting circuits that interrupt a logical bimemory hookup before the "BEN" circuit is set TRUE for the logical bimemory hookup. This stops a programming error from corrupting the program logic of other parallel running programs. The ILUs monitor the "B" and "C" BIC-AD circuits 600 and 652 for matching "B" and "C" registers 604 and 610.

The ILUs monitor, and control the BIC-BUS control circuits (BIC-CTRB circuits) 627 or 629 in FIG. 19, when these circuits are logically connected to the sets of BIC-BUS circuits connected to the "B" and "C" bus circuits 522 and 524 of FIG. 19 of an individual BICPU microcomputer.

The overall operation of the ILUs 634 and 636 in FIG. 19, might be simply compared to two secretaries ("B" and "C" ILUs) helping their bosses (BICPU microcomputers) call each other on the phone (BIC-BUS circuits).

Each BICPU microcomputer has a "B" ILU 634 for the "B" BIC-CTRB circuits 627 and a "C" ILU 636 for the "C" BIC-CTRB circuits 629.

The "B" ILU 634 makes all "calls" and answers all "calls" on the "B" BIC-CTRB circuits 627.

The "C" ILU 636 makes all "calls" and answers all "calls" on the "C" BIC-CTRB circuits 629.

When a first BICPU microcomputer is powered on or reset, the first BICPU microcomputer defaults to the logically disconnected, open, independent, floating PRM-0 mode, with ZEROs in both "B" and "C" registers 604 and 610 in FIG. 19. When ZERO is stored in the "B" and "C" registers 604 and 610, the first switch means in the "B" and "C" bus circuits are logically disconnected, floated and latched, thus logically disconnecting and floating the "B" and "C" bus circuits 522 and 524 from BIC-BUS circuits connected thereto. The "B" and "C" ILUs 634 and 636 are in idle routines, waiting for a valid bus number (not ZERO or 128 through 255) to be stored in the "B" and "C" registers 604 and 610. Until a Programmer directs the Instruction Register 406 in FIG. 19 to read a microcode storing a valid bus number in the "B" or "C" registers 604 and 610, the first BICPU microcomputer remains in the logically disconnected, open, independent PRM-0 mode and is not effectively logically connected to the sets of BIC-BUS circuits connected to the first BICPU microcomputer's "B" and "C" bus circuits 522 and 524.

The connected sets of BIC-BUS circuits of the multi-BICPU microcomputer system effectively has a logical "open" link between the two sets of BIC-BUS circuits where the logically "disconnected" BICPU microcomputer is connected. The logically "disconnected" BICPU microcomputer is in the "disconnected, open, independent" PRM-0 mode.

This logically disconnected, open, independent mode of the BICPU microcomputer is an object of the invention. This logically disconnected, open, independent mode combined with the "deactivated" power off mode, and the fifteen standard bimemory modes, make the BICPU microcomputer invention "be capable of mimicking human thinking" of the creative programs involved, to the required degree to make the World Climate Prediction system and the SDIO computer problem, as well as any other problem requiring "human-like" thinking for its solutions, feasible.

When the Instruction Register 406 reads microinstructions storing a valid bus number in the "B" or "C" registers 604 or 610, the ILU 634 or 636 involved, logically connects and latches the first switch means connected to the "B" or "C" BIC-CTRB circuits 627 or 629 and goes through an ILU verify "B" or "C" register number routine. This routine verifies that no other ILU logically connected to this set of BIC-BUS circuits has the same bus number stored in it's logically connected "B" or "C" register 604 or 610.

If one or more other logically connected ILUs on this set of BIC-BUS circuits have this same number stored in their logically connected "B" or "C" register, a programming error condition exists. The ILU, on detecting this bimemory bus number programming error, sets the "Two or More" error bit in the correct "B" or "C" BIC-BUS Status Register 703 or 705 and logically disconnects and latches the first switch means in the "B" or "C" BIC-CTRB circuits 627 or 629 involved, preventing this bus number programming error from contaminating the logic of other running parallel programs. The ILU then interrupts it's BICPU microcomputer, retaining the present information in it's Status Registers 702, 703, 704, 705, 706, 707 and 708 so that the "Two or More" programming error can be corrected. Particularly notice that this "Two or More" error is detected before the "BEN" circuit is set TRUE for this logical bimemory hookup.

In many types of parallel programs, this type of programming error will be able to be corrected by logical programs at computer speeds, with the information in the various Status Registers. For example, in the SDIO environment, enemy action and damage can be the basic cause of such errors. Programs can be written that detect which BICPU microcomputers have been damaged and "knocked out" and which sets of BIC-BUS circuits have cut and damaged circuits. These damage logic programs can logically reconfigure the remaining undamaged interconnected BICPU microcomputers and undamaged connected BIC-BUS circuits so that the logically reconfigured multi-BICPU microcomputer system can effectively continue to run various parts of the independent parallel running programs of the remaining working BICPU microcomputers.

Over half of the BICPU microcomputers and interconnected BIC-BUS circuits in a large multi-BICPU microcomputer system, can be damaged and knocked out and the remaining undamaged BICPU microcomputers can continue to effectively run all of their independent parallel programs and many of their logical bimemory hookup parallel programs.

After the ILU involved, verifies the valid bus number stored in it's logically connected "B" or "C" register, the ILU goes it's normal routine as described later on.

The first BICPU microcomputer is now effectively logically directly connected to the BIC-CTRB circuits 627 or 629 and this set of BIC-BUS circuits connected to it's "B" "C" bus circuits. After verified valid bus numbers are stored in both it's "B" and "C" registers 604 and 610, the first BICPU microcomputer is in the logically connected, independent PRM-0 mode, and is logically connected to the sets of BIC-BUS circuits, connected to it's "B" and "C" bus circuits 522 and 534.

In FIG. 21 assume Instruction Register 406 of BICPU# 5.JEFF-16.HOLLY with nick-name "RB" reads the following mnemonic logical bimemory "S" hookup microcodes:

| Table of Microcode in FIG. 21 |
| --- |
| GBH |
| Next |
| Instruction |
| BIM-2 |
| (4) |

This is read as:

1st microcode - GBH (Go Bimemory Hookup);

2nd microcode - Next (low byte of program counter after this logical bimemory hookup is terminated for what ever cause).

3rd microcode - Instruction (high byte of program counter after this logical bimemory hookup is terminated for what ever cause).

4th microcode - BIM-2 (bimemory mode of "calling" BICPU microcomputer);

5th microcode - (4) (number of BICPU microcomputer being "called");

6th microcode - FLT-0 (bimemory mode to be assumed by "called" BICPU microcomputer, if this logical bimemory "S" hookup is granted).

These six simple microcodes cause a series of bimemory logic checking routines to occur automatically, at computer speeds. When these routines are successfully completed, BICPU# 5.JEFF-16.HOLLY is connected in a verified logical bimemory "S" hookup with BICPU# 4.HOLLY-7.JOHN as shown in FIG. 21.

The programmer now writes as much bimemory microcode as desired. The bimemory microcode can be just a few microcodes long and take less than a second to execute it, or the bimemory microcode can be extensive parallel programs requiring hours to complete. No further logical bimemory hookup codes are read until the NHU microcode is read. Both BICPU# 5.JEFF-16.HOLLY and BICPU# 4.HOLLY-7.JOHN automatically logically Hang Up the "HOLLY" set of BIC-BUS circuits when the NHU microcode is read, and the program jumps to the Next Instruction, as specified in 2nd and 3rd microcode, and continues to do what ever the programmer decides to do.

In FIG. 20, BICPU 800 Instruction Register 406, on reading the following Go Bimemory Hookup microcode, interconnect BICPU# 16.JOHN-28.CAT, 800, BICPU# 4.CAT-15.DOG, 802, and BICPU# 2.DOG- 7.SUE, 804, in the logical bimemory "S" hookup shown.

| Table of Microcode in FIG. 20 |
|---|
| GBH |
| Next |
| Instruction |
| BIM-2 |
| (4) |

As before, BICPU# 16.JOHN-28.CAT in the BIM mode, can execute as much bimemory microcode as the programmers desired. Then automatically Hand Up the logical bimemory "S" hookup by reading the NHU microcode, and the program jumps to the Next Instruction in the first two memory locations after the GBH (Go Bimemory Hookup).

These simple microcode logical bimemory hookups, work just as effectively in a multi-BICPU microcomputer system containing over one thousand microcomputers, as in these simple systems containing two and three BICPU microcomputers. There can be several hundred parallel logical bimemory "S" hookups and logical bimemory "Y" hookups being executed at the same moment in time in any large BICPU microcomputer system. The interconnected hardware, and the logical bimemory "S" and "Y" hookup software, do not become more complicated, more complex or more burdensome as additional BICPU microcomputers are added. Additional levels of hierarchy can be created at any time, between any BICPU microcomputers, and the BICPU microcomputers and the standard BIC-BUS circuits do not change and become more complex. This is an object of the invention.

E. Operation of New BICPU Bus Status Registers

The invention calls for three new BICPU Bus Status Registers 706, 707 and 708 to be connected between the Instruction Decode element 404 and the Internal Data Bus 424 to store information needed by the ILUs 634 and 636 and Instruction Decode element 404 for completing the logical bimemory "S" and "Y" hookups of BICPU microcomputer 400 and other BICPU microcomputers logically connected to BIC-BUS circuits connected to the "B" and "C" bus circuits. The registers, 706, 707 and 708 are referred to as the BICPU Bus Status Registers #1, #2 and #3.

BICPU Bus Status Register #1, 706 contains codes for the 15 bimemory modes illustrated in FIGS. 3 through 13 and FIGS. 15 through 17 using four bits. The other four bits are status bits of this logical bimemory hookup of this BICPU microcomputer 400.

TABLE 1

FOUR BIT CODE PATTERNS FOR BIMEMORY MODE OF
BICPU MICROCOMPUTER 400 IN BICPU BUS STATUS REGISTER 706

| 4 Bit Mode Pattern in Register 706 | BICPU Mode Mnemonic | Mode Shown in FIG. No. | Basic Type of Bimemory Mode |
|---|---|---|---|
| 0 0 0 0 | PRM-0 | 3 | Independent CPU —FUL |
| 0 0 0 1 | PRM-1 | 4 | "IBM" - BIM on "B" bus —FUL |
| 0 0 1 0 | PRM-2 | 4 | "IBM" - BIM on "C" bus —FUL |
| 0 0 1 1 | | | Future Expansion |
| 0 1 0 0 | FLT-0 | 13 | FLT - BIM on "B" Bus —FUL |
| 0 1 0 1 | FLT-1 | 15 | FLT - BIM on "B" Bus —PAR |
| 0 1 1 0 | FLT-2 | 16 | FLT - BIM on "C" Bus —FUL |
| 0 1 1 1 | FLT-3 | 17 | FLT - BIM on "C" Bus —PAR |
| 1 0 0 0 | BIM-0 | 5 | "S" BIM - FLT on "B" Bus —FUL |
| 1 0 0 1 | BIM-1 | 6 | "S" BIM - FLT on "B" Bus —PAR |
| 1 0 1 0 | BIM-2 | 7 | "S" BIM - FLT on "C" Bus —FUL |
| 1 0 1 1 | BIM-3 | 8 | "S" BIM - FLT on "C" Bus —PAR |
| 1 1 0 0 | BIM-4 | 9 | "Y" BIM - STACK on "B" Bus —FUL |
| 1 1 0 1 | BIM-5 | 10 | "Y" BIM - STACK on "B" Bus —PAR |
| 1 1 1 0 | BIM-6 | 11 | "Y" BIM - STACK on "C" Bus —FUL |
| 1 1 1 1 | BIM-7 | 12 | "Y" BIM - STACK on "C" Bus —PAR |

"IBM" is Interconnecting BICPU Microcomputer in PRM-1 or PRM-2 mode.
"FUL" and "PAR" under Basic Type of bimemory mode indicates "full" or "partly" connected "A" bus circuits and standard memory circuits connected thereto, of BICPU microcomputer in a FLT mode in logical bimemory hookup.

PRM-1
(2)
FLT-0

The BICPU Bus Status Register #2, 707 contains a three bit code defining eight different patterns of partly connected "A" bus circuits in the BIM-1, BIM-3, BIM-5, BIM-7, FLT-1, and FLT-3 modes.

TABLE II

THREE BIT CODES IN STATUS REGISTER 707 BY
BICPU MICROCOMPUTERS IN BIM AND FLT MODES
WITH PARTLY CONNECTED ABH CIRCUITS IN
STANDARD MEMORY CIRCUITS
CONNECTED TO "A" BUS CIRCUITS

| 3 bit code in Register 707 | BICPUs in BIM and FLT modes with partly connected codes, disconnect and latch the ABH circuits in fifth and sixth switch means coded 1 | Contiguous pages of memory released |
|---|---|---|
| 0 0 0 | 1 1 1 1   1 1 1 1 | One Page |
| 0 0 1 | 1 1 1 1   1 1 1 0 | 2 Pages |
| 0 1 0 | 1 1 1 1   1 1 0 0 | 4 Pages |
| 0 1 1 | 1 1 1 1   1 0 0 0 | 8 Pages |
| 1 0 0 | 1 1 1 1   0 0 0 0 | 16 Pages |
| 1 0 1 | 1 1 1 0   0 0 0 0 | 32 Pages |
| 1 1 0 | 1 1 0 0   0 0 0 0 | 64 Pages |
| 1 1 1 | 1 0 0 0   0 0 0 0 | 128 Pages |

Code - 0 0 0 - stored in BICPU Bus Status Register #2, 707 of BICPU microcomputer in BIM-1 mode, logically connects "B" bus circuits to one Page of memory of "A" bus circuits of consenting second BICPU microcomputer. Consenting second BICPU microcomputer controls high address circuits in it's "A" bus circuits thus controlling the location of the one Page of memory directly logically connected to this BICPU microcomputer in the BIM-0 mode.

Code - 0 1 1 - in the case above, logically connects "B" bus circuits to 8 contiguous pages of "A" bus circuits of consenting second BICPU microcomputer, starting at 32 different locations controlled by the consenting second BICPU microcomputer.

Code - 1 0 1 - in the case above, logically connects "B" bus circuits to 32 contiguous pages of "A" bus circuits of consenting second BICPU microcomputer, starting at 8 different locations controlled by the consenting second BICPU microcomputer.

The other five bits in BICPU Bus Status Register #2, 707 are BICPU Bus status bits of this logical bimemory hookup.

The 8-bit number stored in BICPU Bus Status Register #3, 708 controls the starting page of the contiguous pages, for the three bit memory patterns stored in BICPU Bus Status Register #2, 707.

For example, when a first BICPU microcomputer's Instruction Register 406 reads microcodes storing the Code for FLT-1 in BICPU Bus Status Register #1, 706, and storing - 0 1 1 - or (3), in the three bit partly connected pattern in BICPU Bus Status Register #2, 707, and storing (32) in BICPU Bus Status Register #3, 708, then BICPU Bus Instruction Decode Switch 530, logically disconnects and latches the fifth switch means (112 in FIG. 1) in the five highest ABH (Address Bus High) circuits 434 in FIG. 19 to "B" bus circuits 522 and logically connects and latches the third switch means (108 in FIG. 1) in the five highest ABH circuits 434 of FIG. 19 to it's "A" bus circuits 520, thus directly logically connecting it's five highest ABH circuits to it's own CPU circuits. Then 32 is placed on Internal ABH circuits 434 and first BICPU microcomputer drives it's ABH circuits 434 in it's "A" bus circuits with 32 and latches ABH. The first BICPU microcomputer has directly logically connected 8 contiguous Pages, starting at page 32, of it's "A" bus circuits to it's "B" bus circuits and to a second BICPU microcomputer in a BIM mode connected to "B" bus circuits for a logical bimemory hookup.

Especially notice the "A" bus circuits controlling these 8 contiguous Pages of memory are directly logically connected to the "B" bus circuits of the first BICPU microcomputer. Therefore the second BICPU microcomputer is directly logically connected to "A" bus circuits of 8 contiguous pages of the consenting first BICPU microcomputer's "A" bus circuits. The second BICPU microcomputer has complete, direct, total, logical control of these 8 contiguous pages of "A" bus circuits, for as long as the logical bimemory hookup is allowed to proceed by the first BICPU microcomputer, or for as long as the DHU signal is not received or for as long as the "BEN" circuit is TRUE.

F. Operation of New "B" and "C" BIC-BUS Status Registers

According to the invention, information needed by the ILUs and Instruction Decode Unit, for "calling" and "answering" calls on the "B" and "C" BIC-CTRB circuits 627 and 629 in FIG. 19, is stored in four new BIC-BUS Status Registers. "B" BIC-BUS Status Registers #1 and #2, 702 and 703, store the number and bimemory mode of the first linking BICPU microcomputer connected to the "B" bus circuits and "C" BIC-BUS Status Registers #1 and #2, 704 and 705, store the number and bimemory mode of the first linking BICPU microcomputer connected to the "C" bus circuits.

These four new BIC-BUS Status Registers are connected between the Internal Data Bus 424 of FIG. 19, and the Instruction Decode Unit 404.

The "B" and "C" BIC-BUS Status Registers #2, 703 and 705 store the requested bimemory mode of the first linking BICPU microcomputer, using the same four bit pattern to identify the fifteen different modes as is used in BICPU Bus Status Register #1, 706 in Table I. The other four bits are "B" and "C" BIC-BUS status bits.

The seven Status Registers 702, 703, 704, 705, 706, 707 and 708 store the information needed by ILUs 634 and 636 to complete the next link in a logical bimemory "S" hookup or a logical bimemory "Y" hookup to the next linking BICPU microcomputer.

G. Fault Tolerant Logic of BICPU Invention

According to the invention, in a multi-BICPU microcomputer system, standard BIC-BUS circuits are used to interconnect the "B" or "C" bus circuits of any first BICPU microcomputer to the "B" or "C" bus circuits of any second BICPU microcomputer.

Further, the "B" and "C" bus circuits of a first BICPU microcomputer are not to be connected to the same set of BIC-BUS circuits, or to be connected to each other.

These two statements are quite clear and straight forward.

In a large multi-BICPU microcomputer system, when a Programmer writes logical bimemory "S" or "Y" hookup code calling for a "B" ILU of a first BICPU microcomputer to connect those "B" bus circuits through sets of BIC-BUS circuits and other interconnecting BICPU microcomputers in PRM-1 and PRM-2 modes to the "C" bus circuits of the same first BICPU microcomputer, the logical bimemory hookup can not be completed.

The "B" ILU of the first BICPU microcomputer takes control of the first set of BIC-BUS circuits it is connected to and follows the logically bimemory hookup microcode to the point where an interconnecting BICPU microcomputer in a PRM-1 or PRM-2 mode takes control of the set of BIC-BUS circuits that are connected to the "C" bus circuits of the first BICPU microcomputer. When this linking interconnecting BICPU microcomputer in a PRM-1 or PRM-2 mode attempts to "call" the "C" ILU of the first BICPU microcomputer, the "C" ILU of the first BICPU microcomputer is always "BUSY" as the "B" ILU being "BUSY" automatically causes the "C" ILU of the same BICPU microcomputer to be "BUSY". Thus this always busy signal prevents this programming error from further corrupting the program logic of the first BICPU microcomputer, or the program logic of other running parallel programs in the system.

Therefore the BICPU microcomputer invention is completely fault tolerant for the bimemory programming error where the Programmer mistakenly attempts to have a first BICPU microcomputer do a logical bimemory hookup with itself. This is an object of the invention.

If the Programmer actually wants to read or write to it's own "A" bus circuits and the standard memory circuits connected thereto, the Programmer has the BICPU microcomputer do that read or write operation directly in either the PRM-0 mode or the PRM-1 and PRM-2 modes.

H. Error Detecting Logic of the Interrupt Logic Units (ILUs)

As described above, when power is supplied to the power circuits, the BICPU microcomputer does a power on default operation that places ZEROs in the "B" register 604, and in the "C" register 610. When ZEROs are in the "B" and "C" registers, the ILUs 634 and 636 are in idle routines. The "B" ILU 634 monitors the "B" register 604, and the "C" ILU 636 monitors the "C" register 610.

When the Instruction Register 406 reads a microinstruction storing a number in the "B" register 604, the Instruction Decode Unit signals the "B" ILU to do a verify valid bus number routine, and goes into a wait routine, waiting for the "B" ILU 634 to complete it's valid bus number routine. In FIG. 21, when the Instruction Decode Unit 404 stored (5) in BICPU# 5.JEFF-16.HOLLY's "B" register 604, the "B" ILU 634 did it's verify valid bus number routine to determine that no other ILU logically connected to the "JEFF" set of BIC-BUS circuits was monitoring a "B" or "C" register with the number (5) stored in it.

ILU (5.JEFF) 634 connects and latches the first switch means connected in the "B" BIC-CTRB circuits 627, logically connecting the "B" BIC-CTRB circuits 627 to the "JEFF" set of BIC-BUS circuits, connected to the "B" bus circuits.

ILU (5.JEFF) 634 checks if "BEN" circuit 644 is FALSE. If "BEN" circuit is FALSE, ILU (5.JEFF) 634 checks if "BCR" circuit 640 is FALSE. When "BCR" and "BEN" circuits are both FALSE, ILU (5.JEFF) 634 sets the "BCR" circuit 640 TRUE.

ILU (5.JEFF) 634 places the number from "B" register 604 (5) in the "B" buffer 602, via the new "B" Address Bus 606 and drives the "B" BIC-AD circuits 600 with the number from the "B" register (5), and then compares the number on the "B" BIC-AD circuits 600 with the number in the "B" register 604.

The drivers, latches and buffers 602 and 614 and ILUs 634 and 636 are designed so the following Truth Table results:

If one or more ILUs connected to a set of BIC-BUS circuits are driving a BIC-AD circuit to logic 0, their ILUs read this BIC-AD circuit as logic 0.

If one or more ILUs connected to a set of BIC-BUS circuits are driving a BIC-AD circuit to logic 1, their ILUs read this BIC-AD circuit as logic 1.

If one or more ILUs connected to a set of BIC-BUS circuits are driving a BIC-AD circuit to logic 0, and one or more additional ILUs are driving this same BIC-AD circuit to logic 1, their ILUs read this BIC-AD circuit as logic 1.

When many ILUs, like ILU (5.JEFF) above, are on one set of BIC-BUS circuits, it is possible two or more ILUs will set their "BCR" circuit 640 or 650 TRUE at exactly the same split nanosecond. All of these ILUs think only they are in control of this set of BIC-BUS circuits with this TRUE "BCR" circuit.

An object of the BICPU microcomputer invention is to detect such a "BCR" circuit conflict and resolve it automatically with logic circuits in the individual BICPU microcomputers involved, without additional external logic circuits.

A further object of the BICPU microcomputer invention is to put the Programmer in direct control of all logical decisions. The following Truth Table is an example of how these two objectives are accomplished in the BICPU microcomputer invention:

On any particular set of BIC-BUS circuits, ILUs assigned "ODD" BIC-BUS numbers have priority over ILUs assigned "EVEN" BIC-BUS numbers.

ILUs assigned higher "ODD" BIC-BUS numbers have priority over ILUs assigned lower "ODD" BIC-BUS numbers.

ILUs assigned higher "EVEN" BIC-BUS numbers have priority over ILUs assigned lower "EVEN" BIC-BUS numbers.

These two Truth Tables allow the Programmer and the new BICPU microcomputer invention to establish which ILU with it's "BCR" circuit set TRUE has logical control of the set of BIC-BUS circuits as follows:

ILU (5.JEFF) 634 compares the number on the BIC-AD circuits 600 with the number in "B" register 604, (5). If this comparison is TRUE, ILU (5.JEFF) knows ILU (5.JEFF) is in control of the "JEFF" set of BIC-BUS circuits.

If this comparison in FALSE, ILU (5.JEFF) knows a conflict on the "BCR" circuit has occurred. The logic question now becomes which ILU with it's "BCR" circuit set TRUE has logical control of the "JEFF" set of BIC-BUS circuits, and ILU (5.JEFF) proceeds as follows:

ILU (5.JEFF) compares the lowest order bit on the "B" BIC-AD circuits 600 with the lowest order bit in the "B" register 604. (In bus number 5, the lowest order bit is set to 1).

If this comparison is FALSE, the ILU involved knows at least one other ILU connected to the "JEFF" set of BIC-BUS circuits with "BCR" circuit set TRUE has priority. (The only way for lowest order bit not to match is for the number in the logically connected "B" or "C" register 604 or 610, to be EVEN and at least one other ILU on the "JEFF" set of BIC-BUS circuits, with it's "BCR" circuit set TRUE, is ODD with a lowest order bit set to 1 and is driving the lowest order bit of BIC-AD circuits 600 or 652 to a logic 1). ILU (5.JEFF) passes this first round comparison with it's low order bit set to 1.

ILUs who's low order bits do not match, immediately set their "BCR" circuit 640 or 650 FALSE, and stop driving their BIC-AD circuits 600 and 652. These ILUs set their BIC-BUS Busy bit and signal NHU (Normal Hangup) interrupt to their BICPU microcomputers and return to their ILU idle or normal routine.

When the lowest order bits compare, as they do at this point, all ILUs on the "JEFF" set of BIC-BUS circuits, with their "BCR" circuit set TRUE, are either ODD or EVEN. The logic question now becomes which ILU has the highest ODD or EVEN assigned bus number. This is determined as follows:

ILUs with their "BCR" circuit set TRUE compare the highest order bit of a valid bus number, (the bit that represents 64 when valid bus numbers are 1 through 127) with the 64 bit in the "B" register 604.

If this comparison is FALSE, at least one other ILU on the "JEFF" set of BIC-BUS circuits with their "BCR" circuit set TRUE has priority. (Only way for the highest order bits not to match is for the number in the "B" register 604 to be less than 64 and at least one other ILU on the "JEFF" set of BIC-BUS circuits to have an assigned bus number of 64 or larger).

All ILUs who's highest order bits do not match the BIC-AD circuits, immediately set their "BCR" circuit FALSE and stop driving their BIC-AD circuits. These ILUs set their BIC-BUS Busy bit and signal NHU (Normal Hangup) interrupt and return to their ILU idle or normal routine.

This same routine continues using bits representing 32, 16, 8, 4, and 2 if necessary. A single match must occur by comparison of the "2" bit. When BIC-AD circuits 600 match "B" register 604, ILU (5.JEFF) then drives the "BRQ" circuit in the "JEFF" set of BIC-BUS circuits with one standard ILU force to confirm that only one logical connected ILU with the bus number currently assigned to this ILU (5) is connected to the "JEFF" set of BIC-BUS circuits.

This new and unique "BCR" conflict arbitration routine is an object of the invention.

The ILUs 634 and 636 obey the following Rules. When the "B" and "C" registers 604 and 610 contain valid bus numbers, if "B" or "C" BIC-AD circuits 600 or 652, match "B" or "C" Register 604 or 610, then the "B" or "C" ILU 634 or 636 automatically logically connects one standard ILU load to the "BRQ" circuit and logically connects the ILU to the "BEN" and "BRQ" circuits in the set of BIC-BUS circuits logically connected to the ILU.

When an ILU drives it's "BRQ" circuit with one standard ILU force, depending on the number of logical connected ILU loads connected to the "BRQ" circuit, the following Truth Table is TRUE:

A "Not Active" signal is generated, when no ILU load is connected to the "BRQ" circuit.

An "Active BICPU" signal is generated, when one ILU load is connected to the "BRQ" circuit.

A "Two or More" signal is generated, when two or more ILU loads are connected to the "BRQ" circuit.

Assume an "Active BICPU" signal is generated, confirming ILU (5.JEFF) is the only ILU with (5) stored in its logically connected "B" or "C" register 604 or 610. ILU (5.JEFF) signals the Instruction Decode element to proceed. ILU (5.JEFF) now goes to the normal ILU routine, checking the "B" BIC-AD circuits 600 and comparing these to the number in "B" register 604.

If "B" register is changed to ZERO, the Instruction Decode element signals "B" ILU 634, and goes into a wait routine. "B" ILU 634 logically disconnects the first switch means in the "B" BIC-CTRB circuits and signals the Instruction Decode element to proceed, and goes into it's idle routine. If "B" register is changed to a new number from 1 through 127, the Instruction Decode element signals "B" ILU 634, and goes into a wait routine, and "B" ILU 634 goes through the verify valid bus number routine again.

If the highest "B" BIC-AD circuit in 600 goes TRUE for at least a certain minimum number of machine cycles, the DHU (Directed Hang Up) signal is detected. When the DHU signal is detected, the DHU bit is set, and the "BEN" circuit in the "JEFF" set of BIC-BUS circuits is set FALSE, with the help of the Inter Connect Switch 660. When the "B" "BCR" circuit 640 goes FALSE, the DHU number on the "JEFF" set of BIC-AD circuits 600 is stored in "B" BIC-BUS Status Register #1, 702. The programmer can direct the Instruction Register 406 to read the DHU number in BIC-BUS Status Registers 702 and 704 and determine the exact number and location of DHU and take the action desired by the programmer.

When the Instruction Decode Unit 404 stores (16) in the "C" register 610, replacing the ZERO, the "C" ILU (16.HOLLY) goes through the same kind of verify valid bus number as above to verify that no other logically connected ILU on the "HOLLY" set of BIC-BUS circuits has a logically connected "B" or "C" register 604 or 610 with (16) stored in it.

The specific execution of the commands which lead to the logical bimemory "S" hookup of FIG. 20 are now described in detail. First, a GBH (Go Bimemory Hookup) code in accordance with the invention is read by the Instruction Register 406 of the "calling" BICPU" microcomputer. The "calling" BICPU microcomputer is the BICPU microcomputer which reads the logical bimemory hookup microcode. In FIG. 20, either BICPU# 16.JOHN-28.CAT, 800, in the BUIM mode or BICPU# 2.DOG-7.SUE, 804, in the FLT mode can be the "calling" BICPU microcomputer. Assume BICPU# 16.JOHN-28.CAT, the microinstruction GBH (Go Bimemory Hookup). The logical bimemory hookup microcode for FIG. 20, in mnemonics are as follows:

| TABLE OF MICROCODE FOR FIG. 20 |
| --- |
| GBH |
| Next |
| Instruction |
| BIM-2 |
| (4) |
| PRM-1 |
| (2) |
| FLT-0 |

GBH-(Go Bimemory Hookup) tells the Instruction Decode element this is a logical bimemory hookup subroutine, and to logically save the address of the GBH instruction, as the program count will return from the logical bimemory hookup subroutine and go to the Next Instruction whose jump address is in the next two memory locations following the completion of the GBH instruction. The 3rd next code is the mode of this BICPU microcomputer.

Instruction Decode element 404, on reading BIM-2, Code 1 0 1 0, stores this code in BICPU Bus Status Register#1, 706. The fourth bit set to "1" states this is a BIM mode. The third bit set to "0" states this is a BIM logical bimemory "S" hookup. The second bit set to "1" states this BIM logical bimemory "S" hookup is on the set of BIC-BUS circuits connected to the "C" bus circuits 524 of this BICPU microcomputer. The first bit set to "0" states this is a BIM logical bimemory "S" hookup, on the "C" bus circuits 524 and is a full connection of ABH circuits, and Instruction Decode element 404, of BICPU# 16. JOHN-28.CAT, 800, stores ZEROs in BICPU Bus Status Registers #2 and #3, 707 and 708. Instruction Decode element 404, knows the next code is the number of the ILU of the BICPU microcomputer on the "C" bus circuits to be called.

Instruction Decode element 404, reads and stores this code in "C" BIC-BUS Status Register #1, 704. Instruction Decode element 404, knows the next code is mode of the next linking BICPU microcomputer on "C" bus circuits being called.

Instruction Decode element 404, reads PRM-1 and stores this code in "C" BIC-BUS Status Register #2, 705. PRM-1 code is, 0 0 0 1. The fourth bit set to "0" states this is a FLT mode or a PRM mode. The third bit set to "0" states this is a PRM mode. The second bit set to "0" states this is PRM-0 mode or PRM-1 mode. The first bit set to "1" states that this is a PRM-1 mode with the BIM mode on the "B" bus circuits. Instruction Decode element 404, knows "C" ILU 636 now has enough stored information to make the "call" and signals "C" ILU 636 to make the call, and waits.

(Especially notice that in the present implementation of the BICPU microcomputer invention, in the interconnecting PRM-1 and PRM-2 modes, there is always a direct logical interconnection of all of the "B" and "C" address circuits in the fifth internal bus circuits of the BICPU microcomputer in the PRM-1 mode or the PRM-2 mode).

Returning to the above logical bimemory "S" hookup, "C" ILU (28.CAT) 636 now has the required information to make the desired call. "C" ILU (28.CAT) 636 confirms BIM-2 mode in BICPU Bus Status Register #1, 706, and PRM-1 mode in "C" BIC-BUS Status Register #2, 705, can logically work together.

"C" ILU (28.CAT) 636 checks if the "BEN" circuit 656 is FALSE. IF "BEN" circuit is FALSE, "C" ILU (28.CAT) 636 checks if "BCR" circuit 650 is FALSE. If "BCR" circuits is FALSE, "C" ILU (28.CAT) 636 set the "BCR" circuit 650 TRUE.

"C" ILU (28.CAT) 636 places the number (28) from "C" register 610, in "C" buffer 614, via new C Address Bus 612, and drives "C" BIC-AD circuits 652 with (28), and then compares the number on the "C" BIC-AD circuits 652 and with the number in the "C" register 610.

If this comparison is TRUE, "C" ILU (28.CAT) 636 knows "C" ILU (28.CAT) 636 is in control of the "CAT" set of BIC-BUS circuits. If this comparison is FALSE, "C" ILU (28.CAT) 636 knows a "BCR" conflict has occurred, and goes through the ILU "BCR" conflict arbitration routine described above.

When BIC-AD circuits 612 match "C" register 610, "C" ILU (28.CAT) 636 uses the number (4) in "C" BIC-BUS Status Register #1, 704, to drive the BIC-AD circuits 652, to equal (4). This causes any logically connected ILU with (4) in it's logically connected "B" or "C" register 604 or 610 to automatically connect one ILU load to the "BRQ" circuit and logically connect it's "BRQ" and "BEN" circuits. "C" ILU (28.CAT) 636 then drives the "BRQ" circuit in "CAT" set of BIC-BUS circuits with one standard ILU force to confirm that only one ILU with (4) in it's logical connected "B" or "C" register 604 or 610 is logically connected to the "CAT" set of BIC-BUS circuits.

Particularly notice that the CPUs of the BICPU microcomputers that are not directly involved in the logical bimemory hookup, do not monitor the BIC-BUS circuits, or do anything to indirectly interfered with their individual, independent parallel programs.

The above new and unique BICPU interrupt concepts, where only the BICPU microcomputer being directly called on BIC-BUS circuits is interrupted in a manner that does not slow down or logically interfere with the program operation of other logically connected BICPU microcomputers on the same set of BIC-BUS circuits is an object of the invention.

Returning to the logical operation of the ILUs 634 and 636, "C" ILU (28.CAT) 636 listens for signal generated by one standard ILU force on the "BRQ" circuit. Assume "C" ILU (28.CAT) 636 receives "Active BICPU" signal. "C" ILU (28.CAT) 636 now knows that one logically connected ILU of a BICPU microcomputer logically connected to the "CAT" set of BIC-BUS circuits has an assigned bus number of (4) in the logically connected "B" or "C" register 604 or 610.

The generation of this new and unique "Active BICPU" signal above is an object of the invention.

If "C" ILU (28.CAT) 636 had detected a "Not Active" signal, "C" ILU (28.CAT) 636 would know no logically connected ILU on the "CAT" set of BIC-BUS circuits has an assigned bus number of (4), and would have set the "Not Active" bit in the "C" BIC-BUS Status Register #2, 705, and interrupted BICPU# 16.JOHN-28.CAT, 800, so that the program could proceed to take the action desired by the programmer when the "Not Active" signal is encountered.

Especially notice that the "Not Active" signal is not a programming error. Instead, it is a key to the ability of any BICPU microcomputer connected to the various sets of BIC-BUS circuits being able to assume the logically "disconnected, open, independent" mode, without causing a failure of the program logic of other running parallel programs in the multi-BICPU microcomputer system.

The generation of this new and unique "Not Active" signal above is an object of the BICPU microcomputer invention.

If "C" ILU (28.CAT) 636 detected a "Two or More" signal, two or more ILUs logically connected to the "CAT" set of BIC-BUS circuits have an assigned bus number of (4) in their logically connected "B" or "C" register 604 or 610. "C" ILU (28.CAT) 636 would have set the "Two or More" error bit in the "C" BIC-BUS Status Register #2, 705, and terminated this logical bimemory hookup without setting the Status Registers 702, 703, 704, 705, 706, 707 and 708 to ZERO. "C" ILU (28.CAT) 636 would have logically disconnected and latched the first switch means in the "C" bus circuits, and logically disconnected and latched the sixth switch means and interrupted BICPU# 16.JOHN-28.CAT, 800. The interrupt allows the programmer to direct the program to take any action desired by the programmer when the "Two or More" signal is encountered.

Notice this "Two or More" error detection occurs before the consenting BICPU microcomputer in the FLT mode sets the "BEN" circuit TRUE for this logical bimemory hookup. This early "Two or More" detection, prevents failure of the program logic of other running parallel programs, and stops further corruption of the program logic of this BICPU# 16.JOHN-28.CAT, 800.

The generation of this new and unique "Two or More" signal above is an object of the BICPU microcomputer invention.

Upon receipt of an "Active BICPU" signal, "C" ILU (28.CAT) 636 knows ILU (4.CAT)'s BICPU# 4.CAT-15.DOG is logically connected to the "CAT" set of BIC-BUS circuits.

When "B" ILU (4.CAT) 634's "B" register 604 (4) matches the BIC-AD circuits 600, "B" ILU (4.CAT) 634 automatically logically connects one ILU load to the "BRQ" circuit and logically connects the "BRQ" and "BEN" circuits, and checks of BICPU# 4.CAT-15.DOG is "BUSY" on "C" bus circuits 524. Assume BICPU# 4.CAT-15.DOG is not busy on "C" bus circuits (Status Register 706 is ZERO).

"B" ILU (4.CAT) 634 sets maskable interrupt for BICPU# 4.CAT-15.DOG, and drives "BEN" circuit TRUE in "CAT" set of BIC-BUS circuits for the first time.

When the "BEN" circuit goes TRUE in the "CAT" set of BIC-BUS circuits, "C" ILU (28.CAT) 636 knows BICPU# 4.CAT-15.DOG is not "BUSY" on the other "B" or "C" set of BIC-BUS circuits, and that "B" ILU (4.CAT) 634 has set maskable interrupt to BICPU# 4.CAT-15.DOG, 802.

"C" ILU (28.CAT) 636 logically connects the first and sixth switch means in the "C" bus circuits 524 and waits until signaled by "B" ILU (4.CAT) 634, to proceed.

"B" ILU (4.CAT) 634 waits until BICPU# 4.CAT-15.DOG recognizes the maskable interrupt. BICPU#

4.CAT-15.DOG recognizes the interrupt and signals "B" ILU (4.CAT) 634 to synchronize BICPU# 4.CAT-15.DOG's clock signals with BICPU# 16.JOHN 28.CAT, 800 clock signals which are now on BICPU# 4.CAT-15.DOG's "B" circuits 522, and to accept BICPU# 16.JOHN-28.CAT's logical bimemory hookup microcode.

"B" ILU (4.CAT) 634 logically connects and latches the first and fifth switch means in the "B" bus circuits 522, and "B" ILU (4.CAT) 634 synchronizes BICPU# 4.CAT-15.DOG's clock signals with the clock signals of BICPU# 16.JOHN-28.CAT, 800.

(The original "calling" BICPU microcomputer's clock signals are used by the logical bimemory "S" or "Y" hookup. All "answering" BICPU microcomputers synchronize logical bimemory hookup microcode data is sent over the standard data circuits).

The logic signals on the "B" and "C" BIC-CTRB circuits 627 and 629 are asynchronous, and therefore do not depend on synchronous clock signals.

On pages 41 and 42 of the above referenced MOS Technology Inc. microcomputer HARDWARE MANUAL, in section 1.4.2.2. *Device Timing—Requirements and Generation,* several methods are described to synchronize the clocks of the MCS650X family type of microcomputers. As soon as the logical bimemory hookup is completed, the BICPU microcomputers involved in the logical bimemory hookup revert to individual clock signals again.

In a large multi-BICPU microcomputer system, there are as many sets of synchronized clock signals as there are current individual logical bimemory "S" and "Y" hookups in progress.

An object of the BICPU microcomputer invention is that only the clock signals of each individual logical bimemory "S" or "Y" hookup are synchronized and the original "calling" BICPU microcomputer's clock signals are used for synchronization of the clocks for the logical bimemory hookup.

When "B" ILU (4.CAT) 634 has synchronized the clock signals of BICPU# 4.CAT-15.DOG with those of BICPU# 16.JOHN-28.CAT, "B" ILU (4.CAT) 634 sets the "BEN" circuit in the "CAT" set of BIC-BUS circuits FALSE.

Especially notice, after the clock signals of latest linking BICPU microcomputer in a logical bimemory "S" or logical bimemory "Y" hookup are synchronized with the clock signals of the original "calling" BICPU microcomputer, the standard data circuits, and standard control circuits in the logically connected sets of BIC-BUS circuits are used to transmit additional linking logical bimemory "S" hookup and logical bimemory "Y" hookup microcode from the original "calling" BICPU microcomputer to the latest linking BICPU microcomputer, "calling" the next linking BICPU microcomputer. The asynchronous BIC-CTRB circuits are used to "call" and logically add an additional linking set of BIC-BUS circuits and their logically connected linking BICPU microcomputer up until the additional linking BICPU microcomputer has synchronized it's clock signals, as described above, with the original "calling" BICPU microcomputer's clock signals in the logical bimemory "S" hookup or logical bimemory "Y" hookup.

The above logical bimemory "S" hookup and logical bimemory "Y" hookup linking logic allows very long logical bimemory "S" hookups and logical bimemory "Y" hookups. The original "calling" BICPU microcomputer can have five or ten or more sets of BIC-BUS circuits to be interconnected with interconnecting BICPU microcomputers in PRM-1 and PRM-2 modes. Only the logical bimemory hookup microcode for the first next logically linking BICPU microcomputer on the "B" and "C" bus circuits needs to be transmitted and stored in the latest linking BICPU microcomputer's "B" and "C" BIC-BUS Status Registers #1 and #2, and BICPU Bus Status Registers #1, #2 and #3.

The above new and unique BICPU microcomputer logical bimemory "S" and "Y" hookup procedure is an object of the invention.

In FIG. 20, BICPU# 16.JOHN-28.CAT's new Status Registers contain hookup information about itself and the logical bimemory hookup to BICPU# 4.CAT-15.DOG on it's "C" bus circuits. BICPU# 4.CAT-15.DOG's new Status Registers contain hookup information about itself and the logical bimemory hookup to BICPU# 16.JOHN-28.CAT on it's "B" bus circuits and the logical bimemory hookup to BICPU# 2.DOG-7.SUE on it's "C" bus circuits. BICPU# 2.DOG-7.SUE's new status Registers contain hookup information about itself and the logical bimemory hookup to BICPU# 4.CAT-15.DOG on it's "B" bus circuits.

When "C" ILU (28.CAT) 636 receives "B" ILU (4.CAT) 634's "BEN" circuit FALSE signal that the clock signals are now synchronized, "C" ILU (28.CAT) 636 puts the number in "C" register 610 (28), on the Internal Data Bus 424 and drives Data Bus Buffer 422 with (28). "C" ILU (28.CAT) 636 waits until signaled by "B" ILU (4.CAT) 634 to send the next Data.

"B" ILU (4.CAT) 634 stores the (28) in "B" BIC-BUS Status Register #1, 702 in FIG. 19, and signals "C" ILU (28.CAT) 636 for the next Data.

"C" ILU (28.CAT) 636 puts BIM-2 mode code from BICPU Bus Status Register #1, 706 in FIG. 19, on the Internal Data Bus 424 and drives Data Bus Buffer 422 with (BIM-2). "C" ILU (28.CAT) 636 waits until signaled by "B" ILU (4.CAT) 634 to send the next Data.

"B" ILU (4.CAT) 634 puts the (BIM-2) in "B" BIC-BUS Status Register #2, 703 in FIG. 19, and signals "C" ILU (28.CAT) 636 for the next Data.

"C" ILU (28.CAT) 636 puts PRM-1 mode code from "C" BIC-BUS Status Register #2, 705 on the Internal Data Bus 424 and drives Data Bus Buffer 422 with (PRM-1).

"B" ILU (4.CAT) 634 ILU puts the (PRM-1) in "B" BICPU Bus Status Register #1, 706 in FIG. 19. "B" ILU (4.CAT) 634 checks the fourth and third order bits of PRM-1 mode. Since the fourth, third, and second order bits are set to 0 and the first order bit is set to 1, "B" ILU (4.CAT) 634 knows this is a PRM-1 mode. There are no partial address Codes in any PRM mode so no partial address codes follow. The lowest order bit is set to 1 so "B" ILU (4.CAT) 634 knows the BIM mode in this logical bimemory hookup is logically connected to it's "B" bus circuits. "B" ILU (4.CAT) 634 recognizes this as the last microcode in this logical bimemory hookup link, and signals BICPU# 4.CAT-15.DOG for okay to proceed with the requested logical bimemory hookup.

BICPU# 4.CAT-15.DOG checks BICPU Bus Status Register #1, 706 for PRM-1 mode and "B" BIC-BUS Status Register #1, 702 for (28) and BIC-BUS Status Register #2, 703 for BIM-2 mode. Assume BICPU #4.CAT-15.DOG agrees to "C" ILU (28.CAT) 636's request. BICPU# 4.CAT-15.DOG signals "B" ILU (4.CAT) 634 to agree to "C" ILU (28.CAT) 636 request.

"B" ILU (4.CAT) 634, drives "B" BIC-AD circuits 600 with the number from "B" BIC-BUS Status Register #1, 702 (28). Then "B" ILU (4.CAT) 634 drives the "BRQ" circuit in the "CAT" set of BIC-BUS circuits with one standard ILU force, and listens for the "Active BICPU" signal. Assume that "Active BICPU" signal is detected. "B" ILU (4.CAT) 634 now knows only one logically connected ILU to the "CAT" set of BIC-BUS circuits has (28) in it's logically connected "B" or "C" register 604 or 610. "B" ILU (4.CAT) 634 then directs the Inter Connect Switch 600 to latch the "BCR" circuit from the "B" bus circuits to the "C" bus circuits and the "BEN" circuit is latched from the "C" bus circuits to the "B" bus circuits. "B" ILU (4.CAT) 634 then sets the "BEN" circuit TRUE for the second time agreeing to this logical bimemory "S" hookup, and signals over the "B" BIC-BUS standard control circuits to the original "calling" BICPU microcomputer in the BIM mode for this logical bimemory hookup to continue.

The above logical procedure to confirm the exact logical number in the "calling" BICPU microcomputer's "B" or "C" register as an object of the invention.

"B" ILU (4.CAT) 634 had been waiting for the "B" BIC-AD circuits 652 to go to the number in it's "C" register 610, (28), and the "C" "BEN" circuit 656 to go TRUE for the second time as the signal to proceed with the desired logical bimemory "S" hookup on the "C" BIC-BUS standard memory control circuits. "C" ILU (28.CAT) 636 signals the Instruction Decode element 404 to read the next microcode and put it on the "C" bus circuits.

Instruction Decode element 404 reads (2) and puts (2) on the "C" data circuits, and waits for a signal to send the next code.

"B" ILU (4.CAT) 634 stores the (2) in "C" BIC-BUS Status Register #1, 704, and signals for next code.

Instruction Decode element 404 reads FLT-0 and puts FLT-0 on the "C" data circuits, and waits for a signal to send the next code.

"B" ILU (4.CAT) 634 stores FLT-0 in "C" BIC-BUS Status Register #2, 705. "B" ILU (4.CAT) 634 now signals BICPU #4.CAT-15.DOG to approve or disapprove of this requested bimemory hookup. BICPU #4.CAT-15.DOG examines Status Registers 702, 703, 704, 705, 706, 707 and 708. The PRM-1 mode with BIM mode on "B" bus circuits logically works with FLT-0 mode on "C" bus circuits. Assume BICPU #4.CAT-15.DOG approves of this requested logical bimemory hookup, and signals "C" ILU (15.DOG) 636 to proceed with the requested bimemory hookup.

"C" ILU (15.DOG) 636 proceeds with the standard ILU routine to take control of the "BCR" circuit of the "DOG" set of BIC-BUS circuits as described above for "C" ILU (28.CAT) 636 taking control of the "CAT" set of BIC-BUS circuits. "C" ILU (15.DOG) 636 then calls "B" ILU (2.DOG) as described above for "C" ILU (28.CAT) 636 calling "B" ILU (4.CAT) 634, through the point when "B" ILU (4.CAT) 634 set the "BEN" circuits TRUE for the second time, and signalled for the bimemory hookup to continue on the "C" BIC-BUS control circuits which are now logically directly connected to BICPU #16.JOHN-28.CAT, 800, through BICPU #4.CAT-15.DOG in the PRM-1 mode.

BICPU #2.DOG-7.SUE, 804 has assumed the requested FLT-0 mode, waiting for "B" ILU (2.DOG) to signal a return from FLT interrupt after the logical bimemory hookup has been logically completed with either a NHU, a DHU, or a "BEN" set FALSE interrupt. The "A" bus circuits and the standard memory circuits 806 connected thereto, of BICPU #2.DOG-7.SUE, 804 are now logically directly connected to BICPU #16.JOHN-28.CAT's, 800 "C" bus circuits, through interconnecting BICPU #4.CAT-15.DOG, 802.

On "BEN" circuit being set TRUE the second time in the "DOG" set of BIC-BUS circuits, "C" ILU (15.DOG) 636, signalled BICPU #4.CAT-15.DOG to continue with the program where BICPU #4.CAT-15.DOG was interrupted to interconnect this logical bimemory "S" hookup.

BICPU #16.JOHN-28.CAT, 800 is now logically directly connected in a bimemory manner in a logical bimemory "S" hookup to it's "A" bus circuits, 520 of FIG. 19 and to the standard memory circuits, 810, connected thereto, and logically directly connected to the "A" bus circuits and the standard memory circuits 806, connected thereto, of BICPU #2.DOG-7.SUE, 804.

BICPU #16.JOHN-28.CAT, 800 now continues with the logical bimemory hookup as long as it takes to complete the bimemory microcode. When BICPU #16.JOHN-28.CAT, 800 reads the NHU (Normal Hang Up) microcode, BICPU# 16.JOHN-28.CAT, 800 will direct "C" ILU (28.CAT) to set the "BCR" circuit in the "CAT" set of BIC-BUS circuits FALSE, and go into a wait routine. When "B" ILU (4.CAT) 634 recognizes the FALSE "BCR" circuit in the "CAT" set of BIC-BUS circuits, "B" ILU (4.CAT) 634 signals the Inter Connect Switch 660 of BICPU# 4.CAT-15.DOG, 802 to set the "BCR" circuit in the "DOG" set of BIC-BUS circuits FALSE. When "B" ILU (2.DOG) recognizes the FALSE "BCR" circuit in the "Dog" set of BIC-BUS circuits, "B" ILU (2.DOG) sets the "BEN" circuit in the "Dog" set of BIC-BUS circuits FALSE and interrupts BICPU microcomputer 804 to return from FLT mode. When "C" ILU (15.DOG) recognizes the FALSE "BEN" circuit in the "Dog" set of BIC-BUS circuits, "C" ILU (15.DOG) signals the Inter Connect Switch 660 of BICPU microcomputer 802 to set the "BEN" circuit in the "Cat" set of BIC-BUS circuits FALSE, and "C" ILU 15.DOG will hang up the "Dog" set of BIC-BUS circuits, and interrupt BICPU# 4.CAT-15.DOG, 802 to return from PRM-1 mode. When "C" ILU (28.CAT) 636 recognizes the FALSE "BEN" circuit in the "Cat" set of BIC-BUS circuits, "C" hangs up the "Cat" set of BIC-BUS circuits, and signals BICPU# 16.JOHN-28.CAT, 800 to return from logical bimemory hookup, and to continue with the programmer specified Next Instruction after the original GBH instruction, who's location was logically saved on initially reading GBH (Go Bimemory Hookup).

The above procedure to hang up a logical bimemory hookup is an object of the invention.

To discontinue the logical bimemory "S" hookup in FIG. 20 above, BICPU# 16.JOHN-28.CAT, 800's Instruction Decode element 404 reads a NHU (Normal Hang Up) code. This single code returns all the BICPU microcomputers in the bimemory hookup to the PRM-0 mode as described above, and directs this BICPU to the Next Instruction in the program.

A Programmer writes eight codes to set up the above logical bimemory hookup, then writes as much bimemory microcode as is desired, and then writes one code and all of the BICPU microcomputers in the bimemory hookup return to PRM-0 mode. The "bimemory microcode" is that set of instructions executed by the BIM mode BICPU microcomputer after the logical bimemory hookup is made and before the NHU (Normal Hang Up) instruction is read.

Conflict on the "BCR" circuit is automatically logically resolved by the buffers and ILUs in each BICPU microcomputer. Other methods of logically resolving conflict on the "BCR" circuit can, of course, be practiced as long as all of the logic circuits are contained within the individual BICPU microcomputers.

FIG. 18 is a block diagram, illustrating one way for the new "B" and "C" Interrupt Logic Units 634 and 636 to create the "Not Active", "Active BICPU" and "Two or More" signals. An object of the invention is to interrupt or slow down only BICPU microcomputers that are in or are going to be directly involved with the logical bimemory "S' hookup bimemory "Y" hookup. Other running parallel programs in other BICPU microcomputers on the same BIC-BUS circuits are not interrupted or slowed down, unless they are to be directly involved on this set of BIC-BUS circuits.

It is contemplated that the one standard ILU load will be as follows. If no ILU load is connected to the "BRQ" circuit in a set of BIC-BUS circuits, the voltage on the "BRQ" circuit when being driven by one standard ILU force will remain essentially the same, without more than an allowable dip in voltage. If one ILU load is connected to the "BRQ" circuit in a set of BIC-BUS circuits, and the "BRQ" circuit is being driven by one standard ILU force, the voltage will initially drop slightly and after the capacitance load is satisfied, the voltage will return to the initial allowable voltage. The circuits are designed to measure the time that is taken to fill one standard ILU capacitance load when being driven by one standard ILU force. The time that is taken to fill one standard ILU capacitance load to the desired voltage, will be less than the time taken to fill two or more standard ILU capacitance loads. These three different delay times, no delay time, one ILU load delay time and two or more ILU loads delay time, determine the detection of "Not Active", "Active BICPU" and "Two or More" signals.

The above new and unique technique for generating the "Not Active", "Active BICPU" and "Two or More" signals are objects of the invention.

The simple block diagram in FIG. 18 illustrates one way to logically connect one standard ILU load to the "BRQ" circuit and logically connect and latch the "BRQ" and 'BEN" circuits after the "C" ILU 636 has detected a match between the "C" BIC-AD circuits 652 and the "C" register 610.

In forming mechanical networks of BICPU microcomputers, it is observed that certain rules apply. First, the "B" bus circuits and "C" bus circuits of each BICPU microcomputer must be compatible with the sets of BIC-BUS circuits connected to them and no sets of BIC-BUS circuits are ever connected to the "A" bus circuits of any BICPU microcomputer.

Each logically connected ILU of a BICPU microcomputer on a set of BIC-BUS circuits has a verified valid bus number, 1 through 127, in it's logically connected "B" or "C" register 604 or 610, in the exemplary embodiment (with 8 BIC-AD circuits, 600 and 652), ZERO being reserved for power on default, reset, and the logically disconnected mode, and 128 through 255 are reserved for Directed Hang Up (DHU).

Any BICPU microcomputer in a BIM mode in a logical bimemory "S" or "Y" hookup can, at any time, institute a logical hang-up or disconnect, by setting the "BCR" circuit FALSE in the logically connected set of BIC-BUS circuits.

A "BCR" circuit is latched indirectly, in sets of BIC-BUS circuits, in the Inter Connect Switch 660, from the BICPU microcomputer in the BIM mode to the BICPU microcomputer in the FLT modes, in a domino fashion.

A "BEN" circuit is latched indirectly, in sets of BIC-BUS circuits, in the Inter Connect Switch 660, from the BICPU microcomputer in a FLT mode to the BICPU microcomputer in the BIM mode, in a domino fashion.

This indirect latching of the "BCR" circuit and the "BEN" circuit in the BICPU microcomputer invention are objects of the invention.

To make multi-BICPU microcomputer systems act like a large mainframe computer, each BICPU microcomputer can be directed to immediately agree to a logical bimemory hookup request.

Most significantly, a consenting BICPU microcomputer in a FLT mode, after logically connecting some or all of it's "A" circuits and the standard memory circuits connected thereto, to it's "B" or "C" bus circuits and setting the "BEN" circuit TRUE the second time, in a logical bimemory hookup, always has the right to logically interrupt and discontinue the logical bimemory hookup at any time by setting the "BEN" circuit FALSE. The "BEN" circuit being set FALSE causes the "BEN" circuit to unlatch in BIC-BUS circuit segments, back through interconnecting BICPU microcomputers in PRM-1 or PRM-2 modes to the BICPU microcomputer in the BIM mode. When the BICPU microcomputer in the BIM mode recognizes the FALSE "BEN" circuit, the BICPU microcomputer in the BIM mode, makes a logical interrupt of the current logical bimemory hookup and completes the hang up of the sets of BIC-BUS circuits.

The right of the consenting BICPU microcomputer in a FLT mode to terminate the logical bimemory hookup at any time as described above is an object of the invention.

In reviewing the logical bimemory "S" and "Y" hookups, it is noted that a BICPU microcomputer in a BIM mode in a logical bimemory "S" hookup is directly logically connected to, and has direct logical control of some or all of the "A" bus circuits and the standard memory circuits connected thereto, of a single other consenting BICPU microcomputer in a FLT mode. The BICPU microcomputer in a BIM mode in a logical bimemory "Y" hookup is directly logically connected to, and has direct logical control of some or all of the "A" bus circuits and the standard memory circuits connected thereto, of two other consenting BICPU microcomputers in FLT modes—one one the "B" bus circuits and one on the "C" bus circuits of the BICPU microcomputer in the BIM mode.

The direct logical connection of some or all of the "A" bus circuits and the standard memory circuits connected thereto, of two different BICPU microcomputers to a single CPU of one of the BICPU microcomputers at the same time in a logical bimemory "S" hookup is an object of the invention.

The direct logical connection of some or all of the "A" bus circuits and the standard memory circuits connected thereto, of two different BICPU microcomputers to a single CPU of a third BICPU microcomputer at the same time in a logical bimemory 'Y" hookup is an object of the invention.

BICPU microcomputers and BIC-BUS circuits are subject to the same limiting speed of electric signals in circuits as other multiprocessor systems are. The significant difference is, with the truly, highly parallel programs of the BICPU microcomputer, within the limiting speed of electric signals, a slower rate of microinstruction operations per seconds of each BICPU microcomputer actually increases the total effective logical interacting floating point calculations that can be done in the overall system. The slower speed of execution of instructions in a logical bimemory "S" hookup creates more time for the electric signals to travel a longer distance in BIC-BUS circuits before they must be directly logically connected to the "A" bus circuits and the standard memory circuits connected thereto, of the consenting BICPU microcomputer. This gives a longer total combined allowable distance between the BICPU microcomputer in the BIM mode and the BICPU microcomputer in the FLT mode.

At about one million cycles per second, in the logical bimemory "S" hookup, the total distance between the BIM mode and the FLT mode BICPU microcomputers can logically be in the order of 20 meters, or about 65 feet. Allowing for zig-zags in the electrical paths, this probably gives a rough straight line distance of about 45 feet.

Assume the average packaging volume needed for each BICPU microcomputer with "A" bus circuits and the standard memory circuits connected thereto, and the usual peripherals connected to the standard memory circuits, arbitrarily is one cubic foot. In such a closely packaged array of BICPU microcomputers, an initial BICPU microcomputer in the middle of the three dimensional array can make an effective direct logical bimemory "S" hookup with the "A" bus circuits of any consenting BICPU microcomputer in roughly a 45 foot radius. Using the arbitrary one cubic foot packaging volume, the initial BICPU computer can be directly logically connected to about 380,000 different sets of "A" bus circuits of consenting BICPU microcomputers.

However, by using logical bimemory "Y" hookups, this same initial BICPU microcomputer can assume the position of an initial consenting second BICPU microcomputer a FLT mode granting Stack privileges, and make a request for a BIM-4 mode from a first BICPU microcomputer that is located about 45 feet from the initial consenting second BICPU microcomputer, where the first BICPU microcomputer in the BIM-4 mode in turn makes a logical connection to a consenting third BICPU in a FLT mode, that is an additional 45 feet further away. This creates a total allowable distance of about 90 feet between the initial consenting second BICPU microcomputer and the consenting third BICPU microcomputers in the FLT modes. Using one cubic foot packaging volume, the initial BICPU microcomputer can be directly logically connected to about 3,000,000 different sets of "A' circuits of consenting BICPU microcomputers.

Thus the use of the logical bimemory "Y" hookup will allow about eight times as many BICPU microcomputers to be directly logically interconnected, over using the logical bimemory "S" hookups, for any given speed and given average packaging volume. This is an object of the invention.

Therefore, with the BICPU microcomputer invention, when the speed of instructions per second of the basic BICPU microcomputer is cut in half, the total number of direct interacting micro instructions that can be done per second by the total multi-BICPU microcomputer system, actually goes up by a factor of four. This is an object of the invention.

The packaging considerations above are the limiting factor in large BICPU microcomputer systems. More than hundred million mechanically interconnected logically interacting BICPU microcomputers can be used to solve the World Climate Prediction system. Several billion mechanically interconnected logically interacting BICPU microcomputers can be used to solve the SDIO computer problem.

As field operating experience is gained in determining the one hundred or so most effective mechanical ways of interconnecting BICPU microcomputers with standard BIC-BUS circuits, out of the billions of possible ways, and experience is gained in creating better parallel computer programs, the packaging volume for each BICPU microcomputer will tend to drop to lower volumes.

Solving the packaging problem will be relatively simple in the World Climate Prediction System and in the SDIO computer problem. The BICPU microcomputers that need to share information can be placed within the allowable distance described above. For example, the hundreds of thousands of BICPU microcomputers needed to track incoming warheads near Washington, D.C. have little need to exchange that particular tracking information instantaneously with the hundreds of thousands of BICPU microcomputers tracking incoming warheads near Los Angeles, and vice versa. When the distance between the BIM mode and the FLT mode is greater than currently allowable with logical bimemory "S" hookups and the logical bimemory "Y" hookups, BIC-BUS circuits and BICPU microcomputers can be mechanically interconnected so that one set of logical bimemory "S" and "Y" hookups carry the data information part of the way, and another set of logical bimemory "S" and "Y" hookups carry the data information the rest of the way, in relay type program operations.

Some BICPU microcomputers, with the same set of microinstructions, will be run at slower speeds when the distance between the BIM mode and the FLT mode are greater than allowable. By decreasing the speed by a factor of two, you potentially are increasing the operating radius of logical bimemory "S" hookups by a factor of two. This doubling of the radius causes the total number of BICPU microcomputers that can be effectively directly logically interconnected to be increased by a factor of eight, (the cube of two). Thus you can reduce the speed of the BICPU microcomputers by one/half and increase the total number of BICPU microcomputers directly logically interacting by eight times. Therefore, twelve million BICPU microcomputers running at one/half maximum speed, logically will be able to do twice as many directly logically interacting floating point calculations, as three million BICPU microcomputers running at maximum speed. This is an object of the BICPU microcomputer invention.

Some of the data transfers, at very great distances will use the slower data transfer rates from present peripherals located in the standard memory circuits.

FIGS. 5–8 disclose the logical bimemory "S" hookups where a BICPU microcomputer in the BIM mode has been directly logically connected to some or all of the "A" bus circuits can the standard memory circuits connected thereto, of a single other consenting BICPU microcomputer in a FLT mode.

FIGS. 9–12 disclose the logical bimemory "Y" hookups where a BICPU microcomputer in the BIM mode has been directly logically connected to some or all of the "A" bus circuits and the standard memory circuits connected thereto, of two other consenting BICPU microcomputers in FLT modes.

The use of logical bimemory "S" hookups and logical bimemory "Y" hookups permit tremendous latitude in transferring data and optimizing memory use in various multi-microcomputer systems using BICPU microcomputers.

In reviewing the networks of FIGS. 20, 21, 22, 23, and 24, it is noted that when power is first switched on, the "B" Register 604 and the "C" Register 610 of each BICPU microcomputer 400 in a network contains ZERO. Each BICPU microcomputer 400 is in a logically disconnected, open, independent PRM-0 mode and is not logically connected to any set of BIC-BUS circuits that are connected to the "B" or "C" bus circuits 522 or 524 of FIG. 19. If no instructions are performed to store valid numbers in "B" and "C" registers 604 and 610, each BICPU microcomputer 400 acts independently as a conventional microcomputer with it's "A" circuits connected to standard memory circuits.

Upon fetching microinstructions that store valid numbers in it's "B" and "C" registers 604 and 610, a first BICPU microcomputer is dynamically, directly logically connected to one or both sets of BIC-BUS circuits connected to it's "B" and "C" bus circuits 522 and 524.

Further, it is noted that skilled programmers can make the BICPU microcomputer system work the way they think they want the system to work. Programmers and field application system designers create the mechanical interconnection of the BICPU microcomputers in a multi-BICPU microcomputer system. Programmers can add or remove mechanically connected BICPU microcomputers in a multi-BICPU microcomputer system. Programmers create each and every logical bimemory "S" and "Y" hookup. Programmers create the additional double meaning the 128 DHU codes have. This adds to the flexibility of the invention by expanding the logical operations BICPU microcomputers can perform in a network. An object of the BICPU microcomputer invention is to put the Programmer in control of the mechanical and logical interconnection of the BICPU microcomputers in a multi-BICPU microcomputer system.

It should further be realized that the present invention can create tremendous security and flexibility by means of the direct logical connection of some of the "A" bus circuits and the standard memory connected thereto, in the BIM-1, BIM-3, BIM-5, BIM-7, FLT-1 and FLT-3 modes. For example, in the BIM-5 or BIM-7 modes, one BICPU microcomputer in a FLT mode has granted ZERO Page, STACK, and STANDARD VECTOR Page to the BICPU microcomputer in the BIM mode. (ZERO Page, STACK, and STANDARD VECTOR Page implementation and operations are discussed in the above-noted MOS HARDWARE and SOFTWARE MANUALS). In FLT-1 or FLT-3 modes, separate ZERO Page, STACK, and STANDARD VECTOR Page are automatically created, when "A" bus circuits of four or more contiguous pages are directly logically connected to the "B" or "C" bus circuits the BIM mode is logically connected to. Hence, a programmer can create different ZERO Page, STACK and STANDARD VECTOR Page for the BICPU microcomputer in a BIM mode, by logically connecting "A" bus circuits for four to 128 pages to the "B" or "C" bus circuits connected to the BICPU microcomputer in a BIM mode, and at the same time, the Programmer can retain the same initial starting ZERO Page, STACK and STANDARD VECTOR Page of the consenting BICPU microcomputer in the FLT mode in the same standard memory space.

It should, of course, be recognized that the registers added in accordance with the invention, are similar to those registers already employed in conventional MCS650X family of microcomputers. Similarly, the sets of BIC-BUS circuits and additional internal circuits match the standard circuits in the conventional MCS650X family of microcomputers. The precise manner of mechanically connecting the elements of the BICPU microcomputer, or mechanically interconnecting thousands of BICPU microcomputers and standard memory circuits and standard BIC-BUS circuits and sets of standard BIC-BUS circuits in a BICPU multi-microcomputer system, is known in the art and need not be elaborated. For example, the physical mechanical connecting of a standard set of BIC-BUS circuits to the "B" or "C" bus circuits of a BICPU microcomputer can be done by any of various known techniques of connecting off-chip elements to on-chip pins. That is, each circuit of a standard set of BIC-BUS circuits is conventionally connected to an on-chip pin which also represents a circuit on a particular internal bus.

Other improvements, modifications and embodiments will become apparent to one of ordinary skill in the art upon review of this disclosure. Such improvements, modifications and embodiments are considered to be within the scope of this invention as defined by the following claims. For example, it is, of course, contemplated that sets of BIC-BUS circuits can comprise any conventional means such as electrical, optical, and magnetic circuits which operate equivalently in conveying signals between two data processing elements. Moreover, although directed most beneficially to a microcomputer improvement, the invention applies equally to other computers comprised of similar components. That is, although each BICPU microcomputer preferable corresponds to an improved microcomputer chip—including the various additional registers, switch means, error checking means, and the like—the invention also can be applied to other data processing apparatus. Moreover, reference to a chip is intended to include microcomputer units which can be detached or contained on a single substrate, the term chip being used to define the microcomputer as an operable unit with known inputs and outputs.

Further, although the "B" and "C" bus circuits are preferably connected to sets of BIC-BUS circuits, it is also contemplated that the "B" and "C" bus circuits can extend integrally into the sets of BIC-BUS circuits.

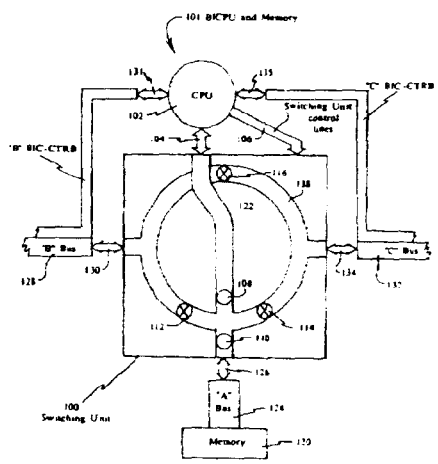

I claim:

1. A microcomputer data processing apparatus, comprising:
   a Central Processing Unit (CPU),
   a path configuring means,
   path control circuits connecting said CPU to said path configuring means,
   a plurality of contacts comprised of a plurality of distinct sets,
   wherein said CPU further comprises a dedicated memory address circuit, a dedicated memory data circuit, a dedicated memory control circuit and a dedicated power circuit, wherein said path configuring means further comprises a dedicated memory address circuit, a dedicated memory data circuit and a dedicated memory control circuit, wherein each said dedicated memory address, data, and control circuit includes a plurality of dedicated memory address, data, and control lines respectively, wherein said memory control lines are comprised of a read/write line, timing lines and status lines, first switch means comprised of at least three distinct parts for connecting said dedicated memory address, data, and control circuits of said path configuring means to each of said first three sets of contacts, and second switch means for connecting said dedicated memory address, data, and control lines of said path configuring means to said dedicated memory address, data, and control lines of said CPU respectively.

wherein said first and second switch means assume a non signal-conducting state when said CPU power circuit is not supplied with power, wherein said lines of said CPU and said contacts assume a non-signal conducting state when said first and second switch means are in said non-signal conducting state, means for causing said first and second switch means to remain in said non signal-conducting state upon application of power to said CPU power circuit and to assume a signal-conductive state upon receipt of an appropriate signal from said CPU, and to assume a non signal-conducting state upon receipt of an appropriate signal from said CPU.

2. A microcomputer data processing apparatus according to claim 1, wherein said path configuring means further includes, a first internal buss, a second internal buss, and a third internal buss, a first junction connecting said first, second, and third internal busses, wherein said first internal buss connects said second switch means to said first junction, wherein a first part of said first switch means connects a first set of said contacts to said second internal buss, a second part of said first switch means connects a second set of said contacts to said third internal buss, wherein each of said busses is comprised of a plurality of signal carrying lines, with a first group of said lines dedicated to memory address signals, a second group dedicated to memory data signals and a third group dedicated to memory control signals.

3. A microcomputer data processing apparatus according to claim 2, wherein said path configuring means is further comprised of, a third switch means for controlling the signal-conducting state of said lines of said first internal buss, a fourth switch means for controlling the signal-conducting state of said lines of said second internal buss, a fifth switch means for controlling the signal-conducting state of said lines of said third internal buss, said third, fourth, and fifth switch means receive signals from said CPU through said path control circuits for determining the signal conducting state of each of said switch means.

4. A microcomputer data processing apparatus, according to claim 3, further including; an addressable memory means connected to said first set of contacts, means for establishing said signal-conducting state of said third switch means, means for establishing said signal-conducting state of said fourth switch means, means for establishing said signal-conducting state of said first part of said first switch means between said fourth switch means and said first set of contacts, means for accessing said addressable memory from said CPU.

5. A microcomputer data processing apparatus according to claim 3, wherein;

said third set of contacts, includes system-address and system-buss-status contacts, and further comprising a system-address register for storing a first system-address code of said microcomputer, buffer means for connecting said system-address register to a third part of said first switch means, system-buss-status circuits connected to said third part of said first switch means, system processing means for processing system-address requests, wherein said third part of said first switch means connects said buffer to said system-address contacts and connects said system-buss-status circuits to said system-buss-status contacts, said system processing means is connected to and controls said buffer means, and said system-buss-status circuits, and said CPU defines said system-address code and is connected to and controls said system processing means.

6. A first microcomputer data processing apparatus according to claim for interaction with a second microcomputer, wherein said first set of contacts of said first microcomputer is connected to an addressable memory, said second microcomputer having second and third sets of contacts physically connected to a system buss having dedicated memory address, data and control lines, dedicated system-address lines and dedicated system-buss-status lines, wherein said second set of contacts of said first microcomputer is further connected to said memory address, data and control lines of said system buss, and said third set of contacts of said first microcomputer is further connected to said system-address and said system-buss-status lines of said system buss.

7. A method for establishing a link between a first microcomputer data processing apparatus, according to claim 6, and said second microcomputer according to claim 6, each of said microcomputers connected to said system buss via said respective second and third sets of contacts, wherein said link is established by the process comprised of the steps of;

supplying power to said power circuits, obtaining the system operating mode of said first microcomputer, obtaining the system-address code of said second microcomputer, obtaining the system operating mode of said second microcomputer, obtaining control of said system-buss-status lines, placing the system-address code of said second microcomputer onto said system-address lines, monitoring said system-buss-status lines, receiving a signal on said system-buss-status lines from said second microcomputer, preventing signal-conduction through a portion of said first part of said first switch means, preventing signal-conduction through a portion of said fourth switch means, establishing signal-conduction through said second, third and fifth switch means, and said second part of said first switch means, supplying the system operating mode of said second microcomputer to said second microcomputer, monitoring said system-buss-status lines, receiving a signal on said system-buss-status lines from said second microcomputer.

8. A method according to claim 7, further including the steps of;

preventing signal-conduction through said second part of said first switch means and said fifth switch means, establishing signal-conduction through said first part of said first switch means and said fourth switch means, accessing said addressable memory of said first microcomputer, and accessing said addressable memory of said second microcomputer by preventing signal-conduction through said data, address and read/write lines of said first part of first switch means and said fourth switch means and establishing signal-conduction through said second part of said first switch means and said fifth switch means.

9. A method according to claim 7, further including the steps of;

preventing signal-conduction through said second part of said first switch means and said fifth switch means, establishing signal-conduction through said first part of said first switch means and said fourth switch means, accessing said addressable memory of said first microcomputer, and accessing a portion of said addressable memory of said second microcomputer by preventing signal-conduction over a portion of said first part of said first switch means and said fourth switch means and establishing signal-conduction through a portion of said second part of said first switch means and said fifth switch means.

10. A method for storing a system address in said system-address register and for determining if said system address is unique to said system-address buss, comprising the steps of;

supplying a first microcomputer as defined in claim 6, supplying power to said CPU power circuits, establishing signal-conduction through said second switch means, said third switch means, said fourth switch means and said first part of said first switch means, obtaining said system address from said addressable memory connected to said first set f contacts, storing said system address in said system-address register, establishing signal-conduction through said third part of said first switch means, altering the state of said system-buss-status lines, placing said system address on said system-address lines of said system buss, monitoring said system-buss-status lines, analyzing the state of said system-buss-status lines in response to said system address, retaining or modifying said stored system address in response to said state of said system-buss-status lines.

11. A first microcomputer data processing apparatus, according to claim 6, further comprising;

means for terminating a link with said second microcomputer connected to said system buss, wherein said terminating means includes;

means for altering the signal-conductive state of said system-buss-status lines, means for preventing signal-conduction through said second part of said first switch means, means for preventing signal-conduction through said fifth switch means, means for establishing signal-conduction through said fourth switch means, and said first part of said first switch means, and means for accessing said addressable memory from said CPU.

12. A first microcomputer data processing apparatus, according to claim 6, with means for terminating a link between a second and third microcomputer each connected to said system buss, wherein said first microcomputer includes;

means for obtaining the system-address code corresponding to link termination, means for placing said system-address code onto said system-address lines, said second microcomputer includes;

means for receiving said system-address code from said system-address lines, means for altering the signal-conducting state of said system-buss-status lines, and means for preventing signal-conduction between the path configuring means of said second microprocessor and said system buss, said third microcomputer includes means for detecting said altered state of said system-buss-status lines, and means for preventing signal-conduction between the path configuring means of said third microprocessor and said system buss.

13. A method for a first microcomputer data processing apparatus, according to claim 6, to acknowledge a link initiated by said second microcomputer connected to said system buss, wherein said link is acknowledged by the process comprised of the steps of;

storing a system-address code in said system-address register, establishing signal-conduction through said third part of said first switch means, monitoring said system-address lines, detecting an address on said system-address lines corresponding to said stored system-address, altering the state of said system-buss-status lines in response to said detection, preventing signal-conduction over a portion of said first part of said first switch means, preventing signal-conduction over a portion of said fourth switch means, establishing signal-conduction through said fifth switch means, and said second part of said first switch means, receiving said system operating mode of said first microcomputer, configuring said first microcomputer in said operating mode, altering the state of said system-buss-status lines, placing the system-address code of said second microcomputer onto said system-address lines, and monitoring said system-address and system-buss-status lines.

14. A method according to claim 13, wherein
the step of receiving said system operating mode includes the steps of;
accepting input from said second microcomputer via said memory address, data and control lines connected between said first and second microcomputers,
storing said data in a system configuration storage register,
preventing signal-conduction through said second part of said first switch means and said fifth switch means,
establishing signal-conduction through said fourth switch means and said first part of said first switch means, and
evaluating said data, wherein
the step of configuring said first microcomputer includes the steps of;
preventing signal-conduction through a portion of said second and third switch means, and
establishing signal-conduction through said fifth switch means and said second part of said first switch means.

15. A method according to claim 13 wherein
the step of receiving said system operating mode includes the steps of;
accepting input from said second microcomputer via said memory address, data and control lines connected between said first and second microcomputers,
storing said data in a system configuration storage register,
preventing signal-conduction through said second part of said first switch means and said fifth switch means,
establishing signal-conduction through said fourth switch means and said first part of said first switch means, and
evaluating said data, wherein
the step of configuring said first microcomputer includes the steps of;
preventing signal-conduction through a portion of said second and third switch means, and
establishing signal-conduction through a portion of said fifth switch means and said second part of said first switch means.

16. A microcomputer data processing apparatus according to claim 1, wherein
said path configuring means is further comprised of,
a first internal buss, a second internal buss, a third internal buss, and a fourth internal buss,
a first junction connecting said first, second, third and fourth internal busses,
said first internal buss connects said second switch means to said first junction,
a first part of said first switch means connects a first set of said contacts to said second internal buss,
a second part of said first switch means connects a second set of said contacts to said third internal buss,
a fourth part of said first switch means connects a fourth set of said contacts to said fourth internal buss, and
said first set of contacts is connected to an addressable memory, wherein
each of said internal busses is comprised of a plurality of signal carrying lines, with a first group of said lines dedicated to memory address signals, a second group dedicated to memory data signals and a third group dedicated to memory control signals.

17. A microcomputer data processing apparatus according to claim 16, wherein
said path configuring means is further comprised of,
a third switch means for controlling the signal-conduction state of said lines of said first internal buss,
a fourth switch means for controlling the signal-conduction state of said lines of said second internal buss,
a fifth switch means for controlling the signal-conduction state of said lines of said third internal buss,
a sixth switch means for controlling the signal-conduction state of said lines of said fourth internal buss, and
said third, fourth, fifth, and sixth switch means receive signals from said CPU for determining the signal-conductive state of each of said switch means.

18. A microcomputer data processing apparatus according to claim 17, further comprising;
a third set of contacts, including first system-address and first system-buss-status contacts,
a fifth set of contacts, including second system-address and second system-buss-status contacts,
a first system-address register for storing a first system-address code of said microcomputer,
a second system-address register for storing a second system-address code of said microcomputer,
a first buffer means for connecting said first system-address register to a third part of said first switch means,
second buffer means for connecting said second system-address register to a fifty part of said first switch means,
first system-buss-status circuits connected to said third part of said first switch means,
second system-buss-status circuits connected to said fifth part of said first switch means,
first system processing means for processing system-address requests, and
second system processing means for processing system-address request, wherein
said third part of said first switch means connects said first buffer to said first system-address contacts and connects said first system-buss-status circuits to said first system-buss-status contacts,
said fifth part of said switch means connects said second buffer to said second system-address contacts and connects said second system-buss-status circuits to said second system-buss-status contacts, said first system processing means is connected to and controls said first buffer means, and said first system-buss-status circuits, and said second system processing means is connected to and controls said second buffer means, and said second system-buss-status circuits, and said CPU defines said first and second system-address codes and controls said first and second system processing means.

19. A first microcomputer data processing apparatus according to claim 18, for interaction with second and third microcomputers, wherein said second microcomputer is connected to a first system buss having dedicated memory address, data and control lines, dedicated system-address lines and dedicated system-buss-status lines, wherein said second set of contacts of said first microcomputer is connected to said memory address, data and control lines of said first system buss, and said third set of contacts of said first microcomputer is connected to said system-address and said system-buss-status lines of said first system buss, said third microcomputer is connected to a second system buss having dedicated memory address, data and control lines, dedicated system-address lines and dedicated system-buss-status lines, wherein said fourth set of contacts of said first microcomputer is connected to said memory address, data and control lines of said second system buss, and said fifth set of contacts is connected to said system-address and said system-buss-status lines of said second system buss.

20. A method for establishing a link between a first microcomputer data processing apparatus according to claim 19, a second microcomputer connected to said first system buss, and a third microcomputer connected to said second system buss, wherein said link is established by the process comprised of the steps of;

storing a first system-address code in said first system-address register, storing a second system-address code in said second system-address register, establishing signal-conduction through said third and fifth parts of said first switch means, monitoring said system-address lines of said first and second system busses, detecting an address on said first system-address lines corresponding to said stored first system-address, altering the state of said system-buss-status lines of said first system buss in response to said detection, preventing signal-conduction through a portion of said first part of said first switch means, preventing signal-conduction through a portion of said fourth switch means, establishing signal-conduction through said fifth switch means, and said second part of said first switch means, receiving a system operating mode of said first microcomputer, receiving a system operating mode and said system-address of said third microcomputer, altering the state of said system-buss-status lines of said first system buss, obtaining a set of instructions from said second microcomputer, monitoring said system-address and said system-buss-status lines of said first system buss, obtaining control of said system-buss-status line of said second system buss, placing the system-address code of said third microcomputer onto said system-address lines of said second system buss, monitoring said system-buss-status lines of said second system buss, receiving a signal on said second system-buss-status lines from said third microcomputer, establishing signal-conduction through said sixth switch means, and said fourth part of said first switch means, supplying the system operating mode of said third microcomputer to said third microcomputer, monitoring said system-buss-status lines, receiving a signal on said second system-buss-status lines from said third microcomputer, utilizing the memories of said second and third microcomputers.

21. A method for establishing a link between a first microcomputer data processing apparatus according to claim 19, a second microcomputer connected to said first system buss, and a third microcomputer connected to said second system buss, wherein said link is established by the process comprised of the steps of;

storing a first system-address code in said first system-address register, storing a second system-address code in said second system-address register, establishing signal-conduction through said third and fifth parts of said first switch means, monitoring said system-address lines of said first and second system busses, detecting an address on said first system-address lines corresponding to said stored first system-address, altering the state of said system-buss-status lines of said first system buss in response to said detection, preventing signal-conduction through a portion of said first part of said first switch means, preventing signal-conduction through a portion of said fourth switch means, establishing signal-conduction through said fifth switch means, and said second part of said first switch means, receiving a system operating mode of said first microcomputer, receiving a system operating mode and said system-address of said third microcomputer, altering the state of said system-buss-status lines of said first system buss, obtaining a set of instructions from said second microcomputer, monitoring said system-address and said system-buss-status lines of said first system buss, obtaining control of said system-buss-status line of said second system buss, placing the system-address code of said third microcomputer onto said system-address lines of said second system buss, monitoring said system-buss-status lines of said second system buss, receiving a signal on said second system-buss-status lines from said third microcomputer, establishing signal-conduction through a portion of said sixth switch means, and said fourth part of said first switch means, supplying the system operating mode of said third microcomputer to said third microcomputer, monitoring said system-buss-status lines, receiving a signal on said second system-buss-status lines from said third microcomputer, utilizing the memories of said second and third microcomputers.

22. A microcomputer system comprised of a plurality of microcomputers according to claim 6 or claim 19, wherein said microcomputers are interconnected by a least one system buss, said microcomputers interact in a coordinated relationship dependent upon the independent programming of each microcomputer utilizing said system buss for inter-microcomputer communications, and said microcomputer interaction program logic is retained and continued during the connection of a further microcomputer to said system buss.

23. A microcomputer system comprised of a plurality of microcomputers according to claim 6 or claim 19, wherein said microcomputers are interconnected by a least one system buss, said microcomputers interact in a coordinated relationship dependent upon the independent programming of each microcomputer utilizing said system buss for inter-microcomputer communications, and said microcomputer interaction program logic is retained and continued during the disconnection of one of said microcomputers connected to said system buss.

24. A microcomputer data processing apparatus according to claim 1, wherein said path configuring means is further comprised of, a first internal buss, a second internal buss, a third internal buss, a fourth internal buss and a fifth internal buss, a first junction connecting said first, second, third and fourth internal busses, a second junction connecting said third and fifth internal busses, and a third junction connecting said fourth and fifth internal busses, wherein said first internal buss connects said second switch means to said first junction, said second internal buss connects said first part of first switch means to said first junction.

said third internal buss connects said first junction to said second junction, said fourth internal buss connects said first junction to said third junction, and said fifth internal buss connects said second junction to said third junction, wherein a first part of said first switch means connects a first set of said contacts to said second internal buss, a second part of said first switch means connects a second set of said contacts to said second junction, a third part of said first switch means connects a third set of said contacts to said third junction, wherein each of said internal busses is comprised of a plurality of signal carrying lines, with a first group of said lines dedicated to memory address signals, a second group dedicated to data signals and a third group dedicated to control signals.

25. A microcomputer data processing apparatus according to claim 24, wherein said path configuring means is further comprised of, a third switch means for controlling the signal-conductivity of said lines of said first buss, a fourth switch means for controlling the signal-conductivity of said lines of said second buss, a fifth switch means for controlling the signal-conductivity of said lines of said third buss, a sixth switch means for controlling the signal-conductivity of said lines of said fourth buss, and a seventh switch means for controlling the signal-conductivity of said lines of said fifth buss, wherein said third, fourth, fifth, sixth and seventh switch means receive signals from said CPU for determining the signal-conductive state of each of said switch means.

26. A microcomputer data processing apparatus according to claim 24, wherein;

said third set of contacts, includes first system-address and first system-buss-status contacts, further comprising;

a fifth set of contacts, including second system-address and second system-buss-status contacts, a first system-address register for storing a first system-address code of said microcomputer, a second system-address register for storing a second system-address code of said microcomputer, first buffer means for connecting said first system-address register to a third part of said first switch means, second buffer means for connecting said second system-address register to a fifth part of said first switch means, first system-buss-status circuits connected to said third part of said first switch means, second system-buss-status circuits connected to said fifth part of said first switch means, bridging means for providing coordination between said first and second system-buss-status circuits, first system processing means for processing system-address requests, and second system processing means for processing system-address requests, wherein said third part of said first switch means connects said first buffer to said first system-address contacts and connects said first system-buss-status circuits to said first system-buss-status contacts, said fifth part of said first switch means connects said second buffer to said second system-address contacts and connects said second system-buss-status circuits to said second system-buss-status contacts, said first system processing means is connected to and controls said first buffer means, and said first system-buss-status circuits, and said second system processing means is connected to and controls said second buffer means, and said second system-buss-status circuits, and said CPU defines said first and second system-address codes and controls said first and second system processing means.

27. A first microcomputer data processing apparatus according to claim 26, for interaction with second and third microcomputer, wherein said second microcomputer is connected to a first system buss having dedicated memory address, data and control lines, dedicated system-address lines and dedicated system-buss-status lines, wherein said second set of contacts of said first microcomputer is connected to said memory address, data and control lines of said first system buss, and said third set of contacts of said first microcomputer is connected to said system-address and said system-buss-status lines of said first system buss, said third microcomputer is connected to a second system buss having dedicated memory address, data and control lines, dedicated system-address lines and dedicated system-buss-status lines, wherein said fourth set of contacts of said first microcomputer is connected to said memory address, data and control lines of said second system buss, and said fifth set of contacts of said first microcomputer is connected to said system-address and said system-buss-status lines of said second system buss.

28. A method for establishing a link between a first microcomputer data processing apparatus according to claim 26, a second microcomputer connected to said first system buss, and a third microcomputer connected to said second system buss, wherein said link is established by the process comprised of the steps of:

storing a first system-address code in said first system-address register, storing a second system-address code in said second system-address register, establishing signal-conduction through said third and fifth parts of said first switch means, monitoring said system-address lines of said first and second system busses, detecting an address on said first system-address lines corresponding to said stored first system-address, altering the state of said system-buss-status lines of said first system buss in response to said detection, preventing signal-conduction through a portion of said first part of said first switch means, preventing signal-conduction through a portion of said fourth switch means, establishing signal-conduction through said fifth switch means, and said second part of said first switch means, receiving a system operating mode of said microcomputer, altering the state of said system-buss-status lines of said first system buss, preventing signal-conduction through said fifth switch means, and said second part of said first switch means, establishing signal-conduction through said first part of said first switch means, establishing signal-conduction through said fourth switch means, altering the state of said system-buss-status lines of said first system buss, preventing signal-conduction through a portion of said first part of said first switch means, preventing signal-conduction through a portion of said fourth switch means, establishing signal-conduction through said fifth switch means, and said second part of said first switch means, receiving a system operating mode and said system address of said third microcomputer from said second microcomputer, preventing signal-conduction through said fifth switch means, and said second part of said first switch means, obtaining control of said system-buss-status line of said second system buss, placing the system-address code or said third microcomputer onto said system-address lines of said second system buss, monitoring said system-buss-status lines of said second system buss, receiving a signal on said second system-buss-status lines form said third microcomputer, establishing signal-conduction through said sixth switch, means, and said fourth part of said first switch means, supplying the system operating mode of said third microcomputer to said third microcomputer, monitoring said system-buss-status lines of said second system buss, receiving a signal on said second system-buss-status lines from said third microcomputer, altering the state of said system-buss-status lines of said first system buss, preventing signal-conduction through said sixth switch means, establishing signal-conduction through said fourth and seventh switch means, and said first and second part of said first switch means, bridging said first and second system-buss-status circuits, utilizing said addressable memory connected to said first set of contacts.

* * * * *

UNITED STATES PATENT AND TRADEMARK OFFICE
CERTIFICATE OF CORRECTION

| | | |
|---|---|---|
| PATENT NO. | : 4,875,154 | |
| APPLICATION NO. | : 07/061338 | |
| DATED | : October 17, 1989 | |
| INVENTOR(S) | : Maurice E. Mitchell | |

It is certified that error appears in the above-identified patent and that said Letters Patent is hereby corrected as shown below:

The Title page should be deleted and substitute therefore the attached Title page.

Delete drawing sheet 1 of 24 and substitute therefore the attached drawing sheet 1 of 24.

Column 14, line 22, after the second occurrence of "the", insert --data bus lines have full "three-state capability. This is necessitated by the fact that the lines are bi-directional.--

Signed and Sealed this

Tenth Day of October, 2006

JON W. DUDAS
*Director of the United States Patent and Trademark Office*

United States Patent [19]
Mitchell

[11] Patent Number: 4,875,154
[45] Date of Patent: Oct. 17, 1989

[54] MICROCOMPUTER WITH DISCONNECTED, OPEN, INDEPENDENT, BIMEMORY ARCHITECTURE, ALLOWING LARGE INTERACTING, INTERCONNECTED MULTI-MICROCOMPUTER PARALLEL SYSTEMS ACCOMODATING MULTIPLE LEVELS OF PROGRAMMER DEFINED HEIRARCHY

[76] Inventor: Maurice E. Mitchell, 601 Terra California, #4, Walnut Creek, Calif. 94595

[21] Appl. No.: 61,338

[22] Filed: Jun. 12, 1987

Related U.S. Application Data

[63] Continuation-in-part of Ser. No. 541,453, Oct. 13, 1983, abandoned.

[51] Int. Cl.[4] .............................................. G06F 13/00
[52] U.S. Cl. .................................................... 364/206
[58] Field of Search ... 364/200 MS File, 900 MS File, 364/200, 900

[56] References Cited

U.S. PATENT DOCUMENTS

| | | | |
|---|---|---|---|
| 3,566,363 | 2/1971 | Driscoll, Jr. | 364/200 |
| 3,771,137 | 11/1973 | Barner et al. | 364/200 |
| 3,970,994 | 7/1976 | Jenny | 364/200 |
| 4,123,794 | 10/1978 | Matsamoto | 364/200 X |
| 4,130,865 | 12/1978 | Heart et al. | 364/200 |
| 4,228,496 | 10/1980 | Katzman et al. | 364/200 |
| 4,434,461 | 2/1981 | Puhl | 364/200 |

OTHER PUBLICATIONS

MOS Technology Manuals-Programming and Hardware, MOS Technology, Inc., Jan. 1976.
"A Heirarchical Restructurable Multi-Microprocessor Architecture", R. G. Arnold and E. W. Page-Proc. 3rd Ann Symp. Computer Architecture, 1976, pp. 40–45.
"A Multicomputer System with Dynamic Architecture"-IEEE Trans. Computers, vol. C-28, No. 10, 10–1979, pp. 704–720, S. I. Karteshev and S. P. Karteshev.
Budzinski R., Linn J., and Thatti S., "A Restructurable Integrated Circuit for Implementing Programmable Digital Systems ", Computer, Mar. 1982, pp. 43–54.

Primary Examiner—David L. Clark
Attorney, Agent, or Firm—Joseph J. Zito; William D. Hall

[57] ABSTRACT

A Bimemory Independent CPU (BICPU) microcomputer which is comprised of a known CPU chip provided with additional circuitry to enable CPU to interact in a multi BICPU microcomputer system. Each BICPU microcomputer in a system is supplied with an assigned standard memory mechanically and logically connected to it's BICPU's "A" bus circuits. The BICPU microcomputer is also provided with connectors enabling the CPU to be connected to system buses. Any number of BICPU microcomputers can be logically chained, linked and treed in a simple logical bimemory independent pattern infinitely in as many dimensions as is reasonably desired, using one standard set of dedicated, simple, single line conductors (system buses) to mechanically interconnect any "B" or "C" bus curcuits of two different BICPU microcomputers.

28 Claims, 24 Drawing Sheets